US012001983B2

(12) United States Patent
Ikui

(10) Patent No.: US 12,001,983 B2
(45) Date of Patent: Jun. 4, 2024

(54) POWER STORAGE DEVICE MANAGEMENT SYSTEM, STORAGE DEVICE, SERVER DEVICE, POWER STORAGE DEVICE MANAGEMENT METHOD, PROGRAM, AND STORAGE MEDIUM

(71) Applicant: HONDA MOTOR CO., LTD., Tokyo (JP)

(72) Inventor: Kuniaki Ikui, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 154 days.

(21) Appl. No.: 17/702,845

(22) Filed: Mar. 24, 2022

(65) Prior Publication Data
US 2022/0230111 A1  Jul. 21, 2022

Related U.S. Application Data

(63) Continuation of application No. 17/267,817, filed as application No. PCT/JP2019/036865 on Sep. 20, 2019, now Pat. No. 11,315,057.

(30) Foreign Application Priority Data

Sep. 20, 2018 (JP) ................................. 2018-175994
Sep. 20, 2018 (JP) ................................. 2018-175995

(51) Int. Cl.
*H02J 7/00* (2006.01)
*B60L 53/30* (2019.01)
(Continued)

(52) U.S. Cl.
CPC ...... *G06Q 10/06315* (2013.01); *B60L 53/305* (2019.02); *B60L 53/65* (2019.02);
(Continued)

(58) Field of Classification Search
CPC .......... G06Q 10/06315; G06Q 10/087; G06Q 10/20; B60L 53/65; B60L 53/80;
(Continued)

(56) References Cited

U.S. PATENT DOCUMENTS

2009/0198372 A1  8/2009  Hammerslag
2010/0306829 A1  12/2010  Nishio
(Continued)

FOREIGN PATENT DOCUMENTS

CN  106960985  7/2017
DE  69933742  2/2007
(Continued)

OTHER PUBLICATIONS

European Office Action for European Patent Application No. 19863591.4 mailed Jan. 30, 2023.
(Continued)

*Primary Examiner* — Zixuan Zhou
(74) *Attorney, Agent, or Firm* — Amin, Turocy & Watson, LLP

(57) ABSTRACT

A power storage device management system includes a storage device configured to store power storage devices that are removably mounted on an electric power device using electric power and a server device communicatively connected to the storage device. The server device includes a first storage unit storing identification information of a power storage device shared by a plurality of users among the power storage devices as storage identification information. The storage device includes a second storage unit storing the storage identification information received from the server device and a determiner configured to determine whether or not reception of the power storage device is possible on the basis of the storage identification informa-
(Continued)

tion stored in the second storage unit when the power storage device has been received from a user.

18 Claims, 16 Drawing Sheets

(51) Int. Cl.
*B60L 53/65* (2019.01)
*B60L 53/80* (2019.01)
*G06Q 10/0631* (2023.01)
*G06Q 10/087* (2023.01)
*H01M 10/44* (2006.01)
*H01M 10/46* (2006.01)
*H01M 10/48* (2006.01)
*G06Q 10/20* (2023.01)

(52) U.S. Cl.
CPC ............ *B60L 53/80* (2019.02); *G06Q 10/087* (2013.01); *H01M 10/44* (2013.01); *H01M 10/46* (2013.01); *H01M 10/48* (2013.01); *H02J 7/00032* (2020.01); *H02J 7/0013* (2013.01); *B60L 2200/12* (2013.01); *B60L 2250/12* (2013.01); *G06Q 10/20* (2013.01); *H01M 2220/20* (2013.01); *Y02T 10/7072* (2013.01); *Y04S 30/14* (2013.01)

(58) Field of Classification Search
CPC .... H02J 7/0013; H02J 7/00032; H01M 10/44; H01M 10/46; H01M 10/48; H01M 2220/20; Y02T 10/7072; Y04S 30/14
USPC .................................................. 320/109, 112
See application file for complete search history.

(56) References Cited

U.S. PATENT DOCUMENTS

| 2011/0106294 | A1 | 5/2011 | Bebbington |
| 2013/0175974 | A1 | 7/2013 | Bassham et al. |
| 2015/0134142 | A1 | 5/2015 | Taylor et al. |
| 2015/0149015 | A1 | 5/2015 | Nakano et al. |
| 2015/0249353 | A1 | 9/2015 | Hamilton, IV et al. |
| 2017/0039668 | A1 | 2/2017 | Luke et al. |
| 2017/0061709 | A1 | 3/2017 | Toya |
| 2017/0201110 | A1 | 7/2017 | Toya |

FOREIGN PATENT DOCUMENTS

| EP | 0985596 | | 3/2000 |
| EP | 3357738 | | 8/2018 |
| JP | 11-259709 | | 9/1999 |
| JP | 2010-277185 | | 12/2010 |
| JP | 2011-096233 | | 5/2011 |
| JP | 2014-153884 | | 8/2014 |
| JP | 2017-134451 | | 8/2017 |
| JP | 2017134451 | A * | 8/2017 |
| JP | 2019-068552 | | 4/2019 |

OTHER PUBLICATIONS

International Search Report and Written Opinion for International Application No. PCT/JP2019/036865 mailed on Dec. 3, 2019, 8 pages.
Extended European Search Report for European Patent Application No. 19863591.4 mailed Oct. 12, 2021.
Non-Final Office Action for U.S. Appl. No. 17/267,817 mailed Sep. 7, 2021.
European Office Action for European Patent Application No. 19863591.4 dated Jun. 20, 2022.
Chinese Office Action for Chinese Patent Application No. 201980060658.2 mailed Nov. 10, 2023.

* cited by examiner

POWER STORAGE DEVICE MANAGEMENT SYSTEM, STORAGE DEVICE, SERVER DEVICE, POWER STORAGE DEVICE MANAGEMENT METHOD, PROGRAM, AND STORAGE MEDIUM

CROSS-REFERENCE TO RELATED APPLICATIONS

This application is a Continuation of application Ser. No. 17/267,817 filed on Feb. 11, 2021, which is a Section 371 National Phase of PCT International application No. PCT/JP2019/036865 filed Sep. 20, 2019, the entire contents of both of which are incorporated herein by reference.

Priority is claimed on Japanese Patent Application No. 2018-175994 and Japanese Patent Application No. 2018-175995 both filed on Sep. 20, 2018, the contents of both of which are incorporated herein by reference.

TECHNICAL FIELD

The present invention relates to a power storage device management system, a storage device, a server device, a power storage device management method, a program, and a storage medium.

BACKGROUND ART

In recent years, electric vehicles such as electric vehicles (EVs) and hybrid electric vehicles (HEVs), which travel using electric motors driven with electric power supplied from batteries, have been developed. In the electric vehicles, when a battery, which is a drive source, has run out of power, it is necessary to charge the battery to continue subsequent traveling.

Incidentally, some of recent electric vehicles adopt batteries configured to be removable (hereinafter referred to as "removable batteries"). When a currently mounted removable battery runs out of power in an electric vehicle that uses a removable battery, it is possible to continue traveling by performing replacement with another removable battery storing sufficient electric power such as a spare removable battery whose charging is completed. Thereby, a user using an electric vehicle adopting a removable battery can continue to use the electric vehicle without the need for a time period other than a time period required to replace the currently mounted removable battery with a spare removable battery, i.e., a charging time period required to charge the removable battery while the electric vehicle is in use. That is, the user using the electric vehicle adopting the removable battery can eliminate the time loss due to a time period required to charge the removable battery. Thus, the development of a so-called battery sharing service in which a removable battery is shared by a plurality of users using electric vehicles has been studied in recent years.

Thus, for example, technology of a shared battery management system for driving an automobile as in Patent Document 1 has been disclosed as a mechanism of a battery sharing service in an electric vehicle. Patent Document 1 discloses a battery replacement mechanism that eliminates the need for a time period required to charge a battery of an electric vehicle using the shared battery management system. This battery replacement mechanism is a mechanism for smoothly and reliably performing the replacement of batteries shared by a plurality of electric vehicles. In the battery replacement mechanism disclosed in Patent Document 1, a driver (a user) of the electric vehicle visits a battery replacement station when the battery needs to be replaced, removes the battery from the electric vehicle, and replaces the removed battery with a charged battery charged at a battery replacement station.

Here, in the shared battery management system disclosed in Patent Document 1, a unique IC card is attached to each battery shared by a plurality of electric vehicles. Information is written to the IC card attached to each battery in the shared battery management system disclosed in Patent Document 1 while the electric vehicle is traveling and while replacement work is being performed at the battery replacement station. Also, in the shared battery management system disclosed in Patent Document 1, the battery replacement station includes a charging facility and a station management device. Also, in the shared battery management system disclosed in Patent Document 1, the charging facility includes a charging device and a controller having an IC card reading/writing function and a charging status monitoring function. Also, in the shared battery management system disclosed in Patent Document 1, the station management device is connected to the controller wirelessly or through a wired cable so that communication is enabled and communication with the system management device via a communication network such as the Internet is further enabled. In the shared battery management system disclosed in Patent Document 1, the station management device transmits and receives information about the battery to and from the system management device at a predetermined timing. Thereby, in the shared battery management system disclosed in Patent Document 1, a system management device accesses a battery management database within the system management device and collectively manages information about batteries.

Incidentally, in the battery replacement mechanism using the shared battery management system disclosed in Patent Document 1, it is shown that a staff member performs the battery replacement work. However, the need for installing battery replacement stations in various places is conceivable to promote the battery sharing service. Thus, in order to promote the battery sharing service, it is desirable to implement a mechanism for enabling the battery replacement to be automatically performed without the intervention of a staff member waiting at the battery replacement station, i.e., a human being other than a user using an electric vehicle, such as the battery replacement mechanism using the shared battery management system disclosed in Patent Document 1. Therefore, in the battery replacement mechanism using the shared battery management system disclosed in Patent Document 1, the following processing procedure is generally conceivable as a processing procedure at the battery replacement station in consideration of a processing procedure for automatically replacing the battery without the intervention of the staff member.

(Procedure 1): A driver (a user) of an electric vehicle removes a battery that needs to be charged from the electric vehicle at a visited battery replacement station. Subsequently, the driver (the user) of the electric vehicle installs the removed battery in, for example, a battery charger provided in the battery replacement station. Thereby, a station management device provided in the battery replacement station acquires information of an IC card attached to the battery installed in the battery charger.

(Procedure 2): The station management device transmits the acquired information of the battery IC card to the system management device via the communication network.

(Procedure 3): The system management device, which has received the information of the IC card transmitted from the station management device, combines the received information of the IC card with the information of the IC card stored in the battery management database and determines whether or not a battery having the attached IC card to which the received information has been written is a battery capable of being replaced at the battery replacement station. The system management device transmits a determination result to the station management device via the communication network.

(Procedure 4): The station management device, which has received the battery determination result transmitted from the system management device, replaces the battery installed in the battery charger by the driver (the user) of the electric vehicle with a charged battery when the received determination result is a result indicating a battery capable of being replaced. Thereby, the driver (the user) of the electric vehicle can receive the charged battery after the replacement, attach (mount) the received battery to the electric vehicle, and use the electric vehicle again, i.e., can leave a battery replacement station to resume traveling.

(Procedure 5): Also, the charging facility provided in the battery replacement station starts charging of the replaced battery (a battery running out of power).

As described above, in the battery replacement mechanism using the shared battery management system disclosed in Patent Document 1, after the station management device and the system management device provided in the battery replacement station perform communication via the communication network and the system management device determines that a battery is a battery capable of being replaced on the basis of information of the IC card attached to the battery, the driver (the user) of the electric vehicle can use the charged battery.

Also, various technologies related to battery sharing services for electric vehicles have been proposed. For example, Patent Document 2 discloses technology related to a battery rental method of renting out a battery for an article that operates using a battery. The technology disclosed in Patent Document 2 is technology related to a vehicle rental system including a removable battery. In the technology disclosed in Patent Document 2, when a battery is rented out by a battery supply device placed in the same bicycle parking booth as that for an electric motorcycle, which is an example of a vehicle that is rented out in a rental system, a central processor provided in the battery supply device selects the battery to be rented out by operating a battery rental processing means incorporated as software.

In the battery rental method disclosed in Patent Document 2, thinking when the battery rental processing means incorporated as the software rents out a battery in accordance with the state of the battery in the battery supply device is shown. More specifically, in Patent Document 2, a process in which the battery rental processing means rents out a fully charged battery having a small charging count when there are a plurality of fully charged batteries in the battery supply device and rents out any fully charged battery that remains at present when a plurality of fully charged batteries are not provided in the battery supply device is disclosed. Also, in Patent Document 2, a process in which, when no fully charged battery is provided in the battery supply device, the battery rental processing means rents out a battery which is close to a fully charged battery and whose charging voltage is greater than or equal to a specified level and does not rent out a battery whose charging voltage is less than the specific level is disclosed.

As described above, a method of renting out a battery to a user of an electric vehicle in accordance with the state of a battery in the battery supply device is disclosed as the battery rental method disclosed in Patent Document 2.

Also, as another example of a movable object in which a battery can be removably loaded into a main body of the movable object, a portable charging/power supply device including a battery and a charging/power supplier formed to have an accommodation chamber for accommodating the battery is known (see, for example, Patent Document 3).

CITATION LIST

Patent Document

[Patent Document 1]
  Japanese Unexamined Patent Application, First Publication No. 2011-096233
[Patent Document 2]
  Japanese Unexamined Patent Application, First Publication No. H11-259709
[Patent Document 3]
  Japanese Unexamined Patent Application, First Publication No. 2019-068552

SUMMARY OF INVENTION

Technical Problem

However, a place where the battery replacement station is installed is not always a place where a station management device and a system management device can stably perform communication via a communication network all the time. For example, in an area where a communication network is developing, it is not always possible to ensure the communication speed and communication connection stability required for the station management device and the system management device to communicate with each other.

In the battery replacement mechanism using the shared battery management system disclosed in Patent Document 1, when the communication speed and the communication connection stability between the station management device and the system management device are lowered, it is assumed that a malfunction such as a delay of information exchange (communication) between the station management device and the system management device and non-execution of communication will occur. That is, when the state of communication (an environment of communication) between the station management device and the system management device deteriorates, it may be difficult to exchange necessary information when the battery replacement is performed such as information of an IC card attached to a battery desired to be replaced at the battery replacement station by the driver (the user) of the electric vehicle or a determination result of determining whether or not a battery is a battery capable of being replaced at the battery replacement station in the system management device. In this case, the battery replacement mechanism using the shared battery management system disclosed in Patent Document 1 may not accept the battery replacement desired by the driver (the user) of the electric vehicle. That is, if the communication speed and the communication connection stability between the station management device and the system management device are lowered, the battery replacement mechanism using the shared battery management system disclosed in Patent Document 1 may have to stop the battery replacement work in the battery sharing service.

Also, when a method of renting out a removable battery in the battery sharing service is taken into account from the viewpoint of an operator who provides the battery sharing service, the battery rental method disclosed in Patent Document 2 is not always a preferable method. This is because general power storage batteries including removable batteries rented out in the battery sharing service deteriorate due to iterations of charging and discharging. Thus, the operator who provides the battery sharing service is required to perform new removable battery replacement so that a removable battery whose available discharging capacity is less than a specified value due to a predetermined charging count or more is not rented out as part of the battery sharing service because of needed maintenance.

For example, a case in which a removable battery with a small charging count is rented out is conceivable as in the battery rental method disclosed in Patent Document 2. In this case, in the battery sharing service, deterioration states of many removable batteries can be made uniform and a frequency of maintenance for replacing the removable batteries can be reduced. However, in this case, during a period when the battery sharing service is operated, a large number of removable batteries having a large charging count, i.e., a large number of removable batteries that need to be replaced, may occur at the same time. Thus, the operator who provides the battery sharing service needs to provide a large number of new removable batteries for replacement in the maintenance work at the same time to continue the operation of the battery sharing service and maintenance of the battery sharing service requires significant costs.

On the other hand, in contrast to the battery rental method disclosed in Patent Document 2, a method of renting out a removable battery with a large charging count is also conceivable. In this case, during a period when the battery sharing service is in operation, the number of removable batteries with a large charging count will increase little by little, so that it is only necessary to perform replacement with a small number of new removable batteries in the periodic maintenance work of the battery sharing service. Thus, because significant costs for continuing the operation of the battery sharing service are not required, the operator who provides the battery sharing service can operate a stable battery sharing service with less uneven expenditure. However, in this case, the number of times of maintenance work (removable battery replacement work) of the battery sharing service will increase.

As described above, in the battery sharing service, the action of the operator who provides the battery sharing service differs according to a removable battery rental method. For this reason, it is considered desirable for the battery sharing service to change the removable battery rental method according to an operation method of the operator who provides the battery sharing service.

However, in the battery rental method disclosed in Patent Document 2, the battery rental method is controlled by the battery rental processing means incorporated as software in the central processor provided in the battery supply device. Thus, in the mechanism of the battery sharing service using the technology disclosed in Patent Document 2, it will be necessary to change the battery rental processing means itself incorporated as software when a change to the rental method of renting out removable batteries from the removable battery having a largest charging count as described above is made. That is, in the mechanism of the battery sharing service using the technology disclosed in Patent Document 2, it is necessary to provide a battery rental processing means incorporated as software (develop software) according to each operation method for the operator of the battery sharing service.

In general, the development of software corresponding to different specifications, i.e., the customization of software, becomes a burden on the developer and requires large costs. Thus, in the mechanism of the battery sharing service using the technology disclosed in Patent Document 2, a process of providing a battery rental processing means according to each operation method for the operator of the battery sharing service will become a burden on the developer who develops the battery supply device for use in the battery sharing service and large costs will be required to construct the battery sharing service.

Also, in general, it is necessary to change the software to be executed by the central processor after the device or system is stopped. Therefore, even if the battery rental processing means incorporated in the central processor provided in the battery supply device as software can be changed in the mechanism of the battery sharing service using the technology disclosed in Patent Document 2, the battery supply device is forced to be stopped (paused) or the battery sharing service is forced to stopped (suspended) during a period when the software is being changed.

Aspects of the present invention have been made on the basis of the above-described problem recognition and an objective of the present invention is to provide a power storage device management system, a storage device, a server device, a power storage device management method, a program, and a storage medium capable of constructing a battery sharing service in which reception of a battery is accepted without being affected by a communication state.

Solution to Problem (1) A power storage device management system (for example, a shared battery management system 10 or a shared battery management system 10A) according to an aspect of the present invention for achieving the above-described objective includes: a storage device (for example, a battery replacement device 100 or a battery replacement device 100A) configured to store power storage devices (for example, removable batteries 510) that are removably mounted on an electric power device (for example, an electric motorcycle 50) using electric power; and a server device (for example, an operation server 200 or an operation server 200A) communicatively connected to the storage device (for example, via a network NW), wherein the server device includes a first storage unit (for example, a server storage 210 or a server storage 210A) storing identification information (for example, a battery ID) of a power storage device shared by a plurality of users (for example, users of electric motorcycles 50) among the power storage devices as storage identification information (for example, an available battery list L or a rentable battery list B), and wherein the storage device includes a second storage unit (for example, a replacement device storage 130 or a replacement device storage 130A) storing the storage identification information received from the server device; and a determiner (for example, a replacement device controller 140 or a replacement device controller 140A) configured to determine whether or not reception of the power storage device is possible on the basis of the storage identification information stored in the second storage unit when the power storage device (for example, a used battery 510u) has been received from a user.

(2) In the above-described aspect (1), the storage device includes a provider (for example, the replacement device controller 140 or the replacement device controller 140A) configured to determine the stored power storage device (for example, a charged battery 510c) to be provided to the user when the determiner determines that the reception of the power storage device from the user is possible.

(3) In the above-described aspect (1) or (2), the determiner is configured to determine whether or not the reception of the power storage device is possible on the basis of the storage identification information stored in the second storage unit before the reception.

(4) In any one of the above-described aspects (1) to (3), the storage device is configured to ask the server device about whether or not the storage identification information has been updated at predetermined time intervals (for example, every three hours, every day, every five minutes, or the like) and receive the storage identification information from the server device and store the received storage identification information in the second storage unit only when the storage identification information has been updated.

(5) In any one of the above-described aspects (2) to (4), the storage identification information includes the order in which the stored power storage devices are provided and the provider is configured to determine the stored power storage device to be provided to the user on the basis of the order when the determiner determines that the reception of the power storage device from the user is possible.

(6) In any one of the above-described aspects (1) to (5), the server device or the storage device includes a deleter (for example, a server controller 220A or the replacement device controller 140A) configured to delete identification information of a specific power storage device from the storage identification information.

(7) In any one of the above-described aspect (5) or (6), the storage device includes a state acquirer (for example, an information acquirer 143A) configured to acquire state information of the stored power storage device; and a transmitter (for example, a replacement device communicator 150A) configured to transmit the state information (for example, a battery state list S) acquired by the state acquirer to the server device (for example, via the network NW), and the server device includes a decider (for example, the server controller 220A) configured to decide the order in which the power storage device stored in the storage device is provided to the user on the basis of the state information transmitted by the transmitter (for example, configured to create the rentable battery list B).

(8) In any one of the above-described aspects (5) to (7), the server device is configured to decide the power storage device capable of being provided to the user in the storage device and the order in which the power storage device is provided in logic according to a preset rule in correspondence with the storage device.

(9) In any one of the above-described aspect (7) or (8), the state information includes identification information (for example, the battery ID) of the stored power storage device and at least information of a charging count, information of a deterioration state, and information of a charge rate.

(10) In any one of the above-described aspects (1) to (9), the determiner is configured to determine that the reception of the power storage device received from the user is not possible when identification information of the received power storage device is not included in the storage identification information and the determiner is configured to determine that the reception of the power storage device received from the user is possible when identification information of the received power storage device is included in the storage identification information.

(11) In any one of the above-described aspects (1) to (10), the storage device includes a responder (for example, the replacement device controller 140 or the replacement device controller 140A) configured to prohibit the stored power storage device from being provided to the user or notify the user that the reception of the power storage device is not possible (for example, using a display 110) when the determiner determines that the reception of the power storage device from the user is not possible.

(12) In any one of the above-described aspects (1) to (11), the storage device includes a charger (for example, a charging controller 141 or a charging controller 141A) configured to charge the power storage device received from the user after the stored power storage device is provided to the user.

(13) According to an aspect of the present invention, there is provided a power storage device management system (for example, a shared battery management system 10A) including: a storage device (for example, a battery replacement device 100A) configured to store power storage devices (for example, removable batteries 510) that are removably mounted on an electric power device (for example, an electric motorcycle 50) using electric power; and a server device (for example, an operation server 200A) communicatively connected to the storage device (for example, via a network NW), wherein the storage device includes a first transmitter (for example, a replacement device communicator 150A) configured to transmit storage information (for example, a battery state list S) that is information including identification information (for example, a battery ID) of the power storage device stored in the storage device to the server device, and wherein the server device includes a decider (for example, a server controller 220A) configured to decide provision information (for example, a rentable battery list B) including the order in which the power storage device stored in the storage device is provided to a user (for example, a user of the electric motorcycle 50) on the basis of the storage information transmitted by the first transmitter; and a second transmitter (for example, a server communicator 230A) configured to transmit the provision information decided by the decider to the storage device.

(14) According to an aspect of the present invention, there is provided a storage device including: an accommodator (for example, a battery slot 120) configured to accommodate power storage devices that are removably mounted on an electric power device using electric power; a second storage unit storing identification information of a power storage device shared by a plurality of users among the power storage devices as storage identification information, the identification information of the power storage device being received from a server device communicatively connected to the server device; and a determiner configured to determine whether or not reception of the power storage device is possible on the basis of the storage identification information stored in the second storage unit when the power storage device has been received from a user.

(15) According to an aspect of the present invention, there is provided a server device communicatively connected to a storage device configured to store power storage devices that are removably mounted on an electric power device using electric power so that communication with the storage device is enabled, wherein the server device includes a first storage unit storing identification information of a power storage device shared by a plurality of users among the power storage devices as storage identification information, and wherein the server device is configured to manage the storage identification information including identification information of a plurality of power storage devices capable of being provided in the storage device.

(16) According to an aspect of the present invention, there is provided a power storage device management method that causes a computer of a storage device including an accommodator configured to accommodate power storage devices that are removably mounted on an electric power device using electric power to perform steps of: a step of receiving identification information of a power storage device shared by a plurality of users as storage identification information from a server device communicatively connected to the server device and storing the storage identification information; and a step of determining whether or not reception of the power storage device is possible on the basis of the storage identification information that is stored when the power storage device has been received from a user.

(17) According to an aspect of the present invention, there is provided a program for causing a computer of a storage device including an accommodator configured to accommodate power storage devices that are removably mounted on an electric power device using electric power to execute steps of: a step of receiving identification information of a power storage device shared by a plurality of users as storage identification information from a server device communicatively connected to the server device and storing the storage identification information; and a step of determining whether or not reception of the power storage device is possible on the basis of the storage identification information that is stored when the power storage device has been received from a user.

(18) According to an aspect of the present invention, there is provided a computer-readable storage medium storing a program for causing a computer of a storage device including an accommodator configured to accommodate power storage devices that are removably mounted on an electric power device using electric power to execute steps of: a step of receiving identification information of a power storage device shared by a plurality of users as storage identification information from a server device communicatively connected to the server device and storing the storage identification information; and a step of determining whether or not reception of the power storage device is possible on the basis of the storage identification information that is stored when the power storage device has been received from a user.

Advantageous Effects of Invention

According to the above-described aspects, the server device is configured to store the identification information of the power storage device shared by the plurality of users among the power storage devices as the storage identification information in the first storage unit and the storage device is configured to receive the storage identification information from the server device and store the received storage identification information in the second storage unit. When the power storage device has been received from the user, the storage device is configured to determine whether or not the reception of the power storage device is possible on the basis of the storage identification information stored in the second storage unit. Thereby, in the power storage device management system, the storage device can also independently determine the provision of the stored power storage device in a situation in which communication between the storage device and the server device is not available. Thereby, the power storage device management system can construct a battery sharing service without being affected by the state of communication between the storage device and the server device.

DESCRIPTION OF EMBODIMENTS

Hereinafter, a power storage device management system, a storage device, a server device, a power storage device management method, a program, and a storage medium according to the present invention will be described with reference to the accompanying drawings.

First Embodiment

Hereinafter, a first embodiment of the present invention will be described with reference to the drawings. In the following description, a case in which a power storage device management system of the first embodiment is a shared battery management system for managing the reception of a plurality of removable batteries shared by a plurality of saddle riding-type electric vehicles (hereinafter referred to as "electric motorcycles"), which are electric power devices using electric power of a battery (hereinafter referred to as a "removable battery") that is a power storage device configured to be removable, and managing the provision of alternative removable batteries will be described.
(Overall Configuration)

Figure 1:
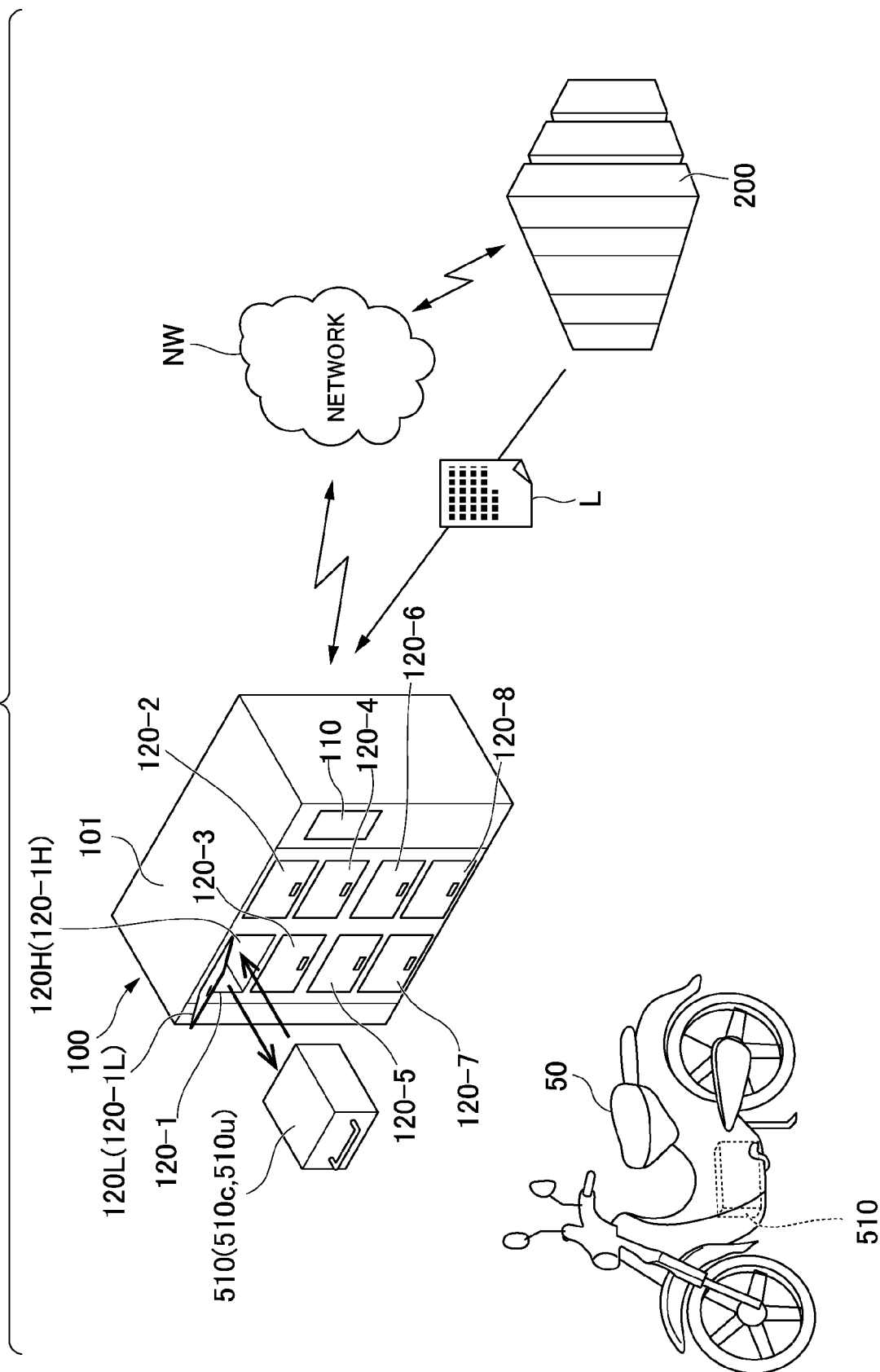
FIG. 1 is a diagram showing a concept of a battery sharing service adopting a shared battery management system according to a first embodiment of the present invention.

FIG. 1 is a diagram showing a concept of a so-called battery sharing service adopting the shared battery management system according to the first embodiment of the present invention. As shown in FIG. 1, a shared battery management system 10 of the first embodiment is configured to include a battery replacement device 100 and an operation server 200. Also, although one operation server 200 may be configured to correspond to a plurality of battery replacement devices 100 in the shared battery management system 10 of the first embodiment, only one battery replacement device 100 is shown in FIG. 1. Also, in FIG. 1, an electric motorcycle 50 using a battery sharing service adopting the shared battery management system 10 is shown.

The electric motorcycle 50 is an electric vehicle that travels using an electric motor driven with electric power supplied from a removable battery 510. Also, the electric motorcycle 50 may be a hybrid electric vehicle that travels according to driving by a combination of a removable battery 510 and an internal combustion engine such as a diesel engine or a gasoline engine. Accordingly, the electric motorcycle 50 is an example of an electric vehicle that uses the battery sharing service.

The removable battery 510 is a cassette type power storage device (a secondary battery) that is removably mounted on the electric motorcycle 50. At least one removable battery 510 is mounted on one electric motorcycle 50. In the following description, the electric motorcycle 50 will be described as an electric vehicle equipped with one removable battery 510. The removable battery 510 is a power storage device shared by a plurality of electric vehicles. It is possible to identify the removable battery 510 itself using exclusively assigned identification information (hereinafter referred to as a "battery ID"). Also, although, for example, the serial number of the removable battery 510, is conceivable as the battery ID, various types of battery IDs are conceivable in the present invention.

The battery replacement device 100 is a facility that is installed in a plurality of places and stores and charges one or more removable batteries 510. Also, the battery replacement device 100 is a facility that executes a procedure for replacing a removable battery 510 desired to be replaced by a user of the shared battery management system 10 (a user of the electric motorcycle 50 or the like) with a stored removable battery 510. The battery replacement device 100 is connected to the operation server 200 via a network NW. Here, the network NW is a communication network such as a communication network for wireless communication. Also, the network NW may be a communication network for wired communication. However, in the present invention, it is considered that a more significant effect can be obtained when the network NW is a communication network for wireless communication than when the network NW is a communication network for wired communication.

The battery replacement device 100 exchanges information with the operation server 200 using communication via the network NW and replaces the removable battery 510. More specifically, the battery replacement device 100 acquires information of the battery ID of the removable battery 510 capable of being replaced from the operation server 200 via the network NW. Also, the battery replacement device 100 previously acquires and stores an available battery list, which is created as information of battery IDs by the operation server 200 and in which battery IDs of removable batteries 510 capable of being replaced at the battery replacement device 100 are recorded. In the available battery list, battery IDs of removable batteries 510 capable of being shared by a plurality of users such as users of electric motorcycles 50 using the battery sharing service are recorded. The battery ID of the removable battery 510 recorded in the available battery list is, for example, a battery ID of a removable battery 510 approved by an operator of the battery sharing service adopting the shared battery management system 10 or a manager of the shared battery management system 10. Also, the battery IDs of the removable batteries 510 recorded in the available battery list may be arranged in the order in which the battery replacement device 100 rents out the removable batteries 510. In other words, information of the order in which the battery replacement device 100 rents out the removable batteries 510 may be recorded in the available battery list. The battery replacement device 100 can confirm a battery ID recorded in the available battery list and comprehensively ascertain whether or not a removable battery 510 to which the battery ID is assigned is a removable battery 510 provided (shared) in the battery sharing service. In FIG. 1, the state in which an available battery list L created by the operation server 200 is acquired from the operation server 200 via the network NW is shown. The battery replacement device 100 independently determines whether or not the removable battery 510 running out of power brought in by the user of the electric motorcycle 50 is a removable battery 510 capable of being replaced on the basis of information of the battery IDs of the removable batteries 510 included in the available battery list L acquired from the operation server 200. When it is determined that the removable battery 510 brought in by the user of the electric motorcycle 50 is a removable battery 510 capable of being replaced, the battery replacement device 100 replaces the removable battery 510 brought in by the user of the electric motorcycle 50 with the stored removable battery 510.

In FIG. 1, an example of the configuration of the battery replacement device 100 is shown. In the battery replacement device 100 shown in FIG. 1, a display 110 and eight battery slots 120-1 to 120-8 having a charging function are provided in a housing 101. Also, in the following description, when each of the eight battery slots 120-1 to 120-8 is not distinguished, it is simply referred to as the "battery slot 120" in a state in which the hyphen "-" and the number following the hyphen "-" are omitted.

The display 110 provided in the battery replacement device 100 is a display device that displays information of a notification to be provided to the user of the electric motorcycle 50. The display 110 is configured to include, for example, a thin film transistor (TFT) liquid crystal display (LCD), an organic electro luminescence (EL) display, an electrophoretic display device using electronic ink, and the like. The display 110 displays information about the battery sharing service such as whether the removable battery 510 can be currently replaced at the battery replacement device 100.

The battery slots 120 provided in the battery replacement device 100 include a battery slot 120 in which the removable battery 510 is accommodated (inserted) and a battery slot 120 in which no removable battery 510 is accommodated (inserted). Also, the battery slot 120 in which the removable battery 510 is accommodated includes a battery slot 120 in which the removable battery 510 is being charged and a battery slot 120 in which the charged removable battery 510 whose charging is completed and which is stored and waits for replacement (on standby). Also, the battery slot 120 in which no removable battery 510 is accommodated waits for the removable battery 510 desired to be replaced to be inserted thereinto by the user of the electric motorcycle 50.

Each battery slot 120 includes a battery accommodator 120H and an opening/closing lid 120L. The battery accommodator 120H has a structure in which an opening is provided on a front surface thereof and the removable battery 510 can be moved in and out of the battery accommodator 120H through the opening. A structure for performing a charging process or acquiring the battery ID of the removable battery 510 when a connection with the accommodated removable battery 510 is made is provided on a back side of the battery accommodator 120H. The opening/closing lid 120L is a lid for opening/closing the opening on the front surface of the battery accommodator 120H and has a structure in which the removable battery 510 can be moved in and out of the battery accommodator 120H when the opening is in an open state and the removable battery 510 cannot be moved in and out of the battery accommodator 120H when the opening is in a closed state. According to the above-described structure, each battery slot 120 can restrict the insertion and removal of the removable battery 510 accommodated in the battery accommodator 120H by locking the opening/closing lid 120L in the closed state.

The battery accommodator 120H and the opening/closing lid 120L in the battery slot 120-1 is shown in FIG. 1. Also, in the following description, when the battery accommodator 120H and the opening/closing lid 120L of each of the eight battery slots 120-1 to 120-8 are distinguished from each other, the hyphen "-" and a number following the hyphen "-" are shown. For example, the battery accommodator 120H of the battery slot 120-1 is referred to as a "battery accommodator 120-1H" and the opening/closing lid 120L of the battery slot 120-1 is referred to as an "opening/closing lid 120-1L."

Also, the state in which the removable battery 510 is moved in and out of the battery slot 120-1 is shown in FIG. 1. Also, in the following description, the removable battery 510 accommodated in the battery slot 120 by the user of the electric motorcycle 50 due to power consumption is referred to as a "used battery 510u" and the removable battery 510 whose charging is completed by the battery replacement device 100 and which can be moved out of the battery slot 120 by the user of the electric motorcycle 50 is referred to as a "charged battery 510c." Thereby, in the following description, the state of the electric power stored in the removable battery 510 is distinguished.

Also, the configuration of the battery replacement device 100 shown in FIG. 1 is an example and various configurations is conceivable as the configuration of the battery replacement device 100 in the present invention.

The operation server 200 is a server facility that manages a removable battery 510 capable of being replaced at the battery replacement device 100. The operation server 200 creates and stores at least an available battery list (an available battery list L) in which battery IDs of removable batteries 510 capable of being replaced at the battery replacement device 100 are recorded. Also, the operation server 200 updates the created available battery list L. Also, for example, the creation and update of the available battery list L and the like in the operation server 200 are performed by a manager of the shared battery management system 10 or the like operating a terminal (not shown) connected to the operation server 200. More specifically, the operation server 200 updates the available battery list L by registering the battery ID of the removable battery 510 to be added in the available battery list L when a removable battery 510 capable of being replaced at the battery replacement device 100 is newly added through an operation of the terminal (not shown) by the manager or the like. Also, the operation server 200 updates the available battery list L by deleting the battery ID of a removable battery 510 to be deregistered from the available battery list L when the removable battery 510 that cannot be replaced at the battery replacement device 100 due to deterioration or destruction of the registered removable battery 510 is deregistered according to an operation of the terminal (not shown) by the manager or the like. The operation server 200 transmits the available battery list L created or updated in response to a request from the battery replacement device 100 to the battery replacement device 100, which has transmitted the request, via the network NW.

Thereby, the battery replacement device 100 acquires the available battery list L from the operation server 200 via the network NW. The battery replacement device 100 performs a procedure for replacing the used battery 510u brought in by the user of the electric motorcycle 50 with the charged battery 510c on the basis of information of the battery ID of the removable battery 510 included in the available battery list L acquired from the operation server 200.

Also, the battery replacement device 100 acquires an available battery list L from the operation server 200 in advance, for example, at predetermined relatively long-time intervals that do not interfere with the charging of the used battery 510u, such as once every three hours or once a day and stores the acquired available battery list L. Thus, the battery replacement device 100 does not need to communicate with the operation server 200 via the network NW every time a procedure for replacing the used battery 510u with the charged battery 510c is performed. More specifically, the battery replacement device 100 does not acquire information of the battery ID of the removable battery 510 capable of being replaced by performing communication with the operation server 200 via the network NW every time it is determined whether the removable battery 510 running out of power brought in by the user of the electric motorcycle 50 is a removable battery 510 capable of being replaced. The battery replacement device 100 independently performs a procedure for replacing the used battery 510u with the charged battery 510c on the basis of the information of the battery ID of the removable battery 510 included in the available battery list L previously acquired from the operation server 200. Thus, the battery replacement device 100 does not need to stop or suspend a procedure for replacing the used battery 510u brought in by the user of the electric motorcycle 50 with the charged battery 510c even if the communication with the operation server 200 via the network NW is interrupted or stable communication cannot be performed. Thereby, the battery replacement device 100 can continue to perform the procedure for replacing the removable battery 510 independently without being affected by the state of communication (an environment of communication) with the operation server 200 via the network NW. In other words, the battery replacement device 100 can continue to provide the battery sharing service to the user of the electric motorcycle 50.

According to the above-described configuration, in the shared battery management system 10, the used battery 510*u* is replaced with the charged battery 510*c* whose charging is completed and which is stored in the battery replacement device 100 when the used battery 510*u* running out of power brought in the battery replacement device 100 by the user of the electric motorcycle 50 is a removable battery 510 capable of being replaced.

Next, each component constituting the shared battery management system 10 of the first embodiment will be described in more detail.

(Configuration of Removable Battery 510)

Figure 2:
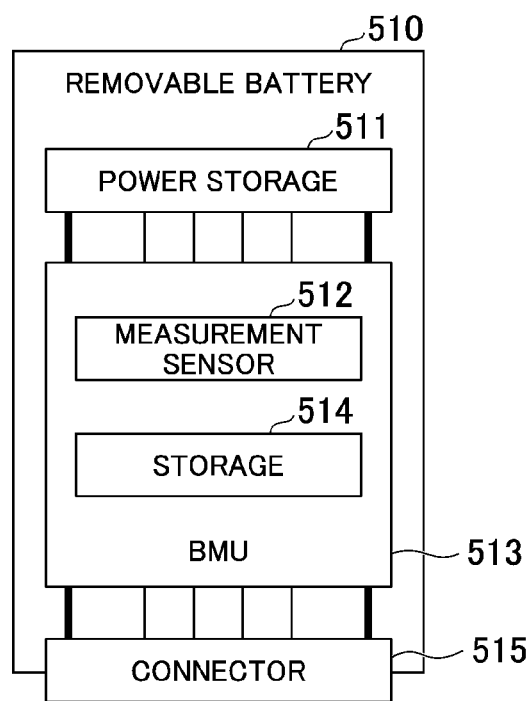
FIG. 2 is a block diagram showing an example of a configuration of a removable battery managed in the shared battery management system of the first embodiment.

First, an example of a configuration of the removable battery 510 will be described. FIG. 2 is a block diagram showing an example of the configuration of the removable battery 510 managed in the shared battery management system 10 of the first embodiment. As shown in FIG. 2, the removable battery 510 includes a power storage 511, a battery management unit (BMU) 513, and a connector 515. Also, the BMU 513 includes a measurement sensor 512 and a storage 514.

The power storage 511 is configured to include a storage battery that stores electric power through charging and is discharged with the stored power. As the storage battery included in the power storage 511, for example, a secondary battery such as a lead storage battery or a lithium-ion battery, a capacitor such as an electric double layer capacitor, a composite battery in which a secondary battery and a capacitor are combined, or the like are conceivable. Also, in the present invention, various configurations are conceivable as the configuration of the power storage 511.

The measurement sensor 512 includes various types of sensors for measuring the state of the power storage 511. The measurement sensor 512 measures the voltage stored in the power storage 511 using, for example, a voltage sensor. Also, the measurement sensor 512 measures the electric current flowing through the power storage 511 using, for example, a current sensor. Also, the measurement sensor 512 measures the temperature at which the power storage 511 is charged or the power storage 511 is discharged using, for example, a temperature sensor. The measurement sensor 512 outputs a measured value indicating a measured state of the power storage 511 to a processor on the BMU 513.

The BMU 513 is a battery management unit and controls charging and discharging of the power storage 511. The BMU 513 is configured to include a processor such as, for example, a central processing unit (CPU), and a memory such as, for example, a read only memory (ROM) or a random access memory (RAM), as the storage 514. In the BMU 513, the CPU implements a control function of the power storage 511 by reading and executing a program stored in the storage 514. The BMU 513 causes the storage 514 to store information such as content of the control performed on the power storage 511 on the basis of the measured value indicating the state of the power storage 511 output from the measurement sensor 512.

The storage 514 stores information of an abnormality or a failure detected by the BMU 513 itself, an abnormality or a failure of the power storage 511 ascertained using the measurement sensor 512, or the like. The storage 514 is configured to include, for example, a memory such as a ROM, a RAM, or a flash memory. Also, the storage 514 stores identification information (hereinafter referred to as a "battery ID") exclusively assigned to the removable battery 510. Also, the storage 514 may store identification information (for example, a "user ID") of the user of the electric motorcycle 50 currently using the removable battery 510.

The connector 515 is a connector that supplies the electric power stored in the power storage 511 to the electric motor that is the drive source of the electric motorcycle 50 when the removable battery 510 has been mounted on the electric motorcycle 50. Also, the connector 515 is connected to a structure that is connected to the removable battery 510 provided on the back side of the battery accommodator 120H when the removable battery 510 has been accommodated in the battery slot 120 provided in the battery replacement device 100 and is also a connector for performing the transmission of information such as a battery ID that is exchanged between the removable battery 510 and the battery replacement device 100 or the transmission of electric power.

(Configuration of Battery Replacement Device 100)

Figure 3:
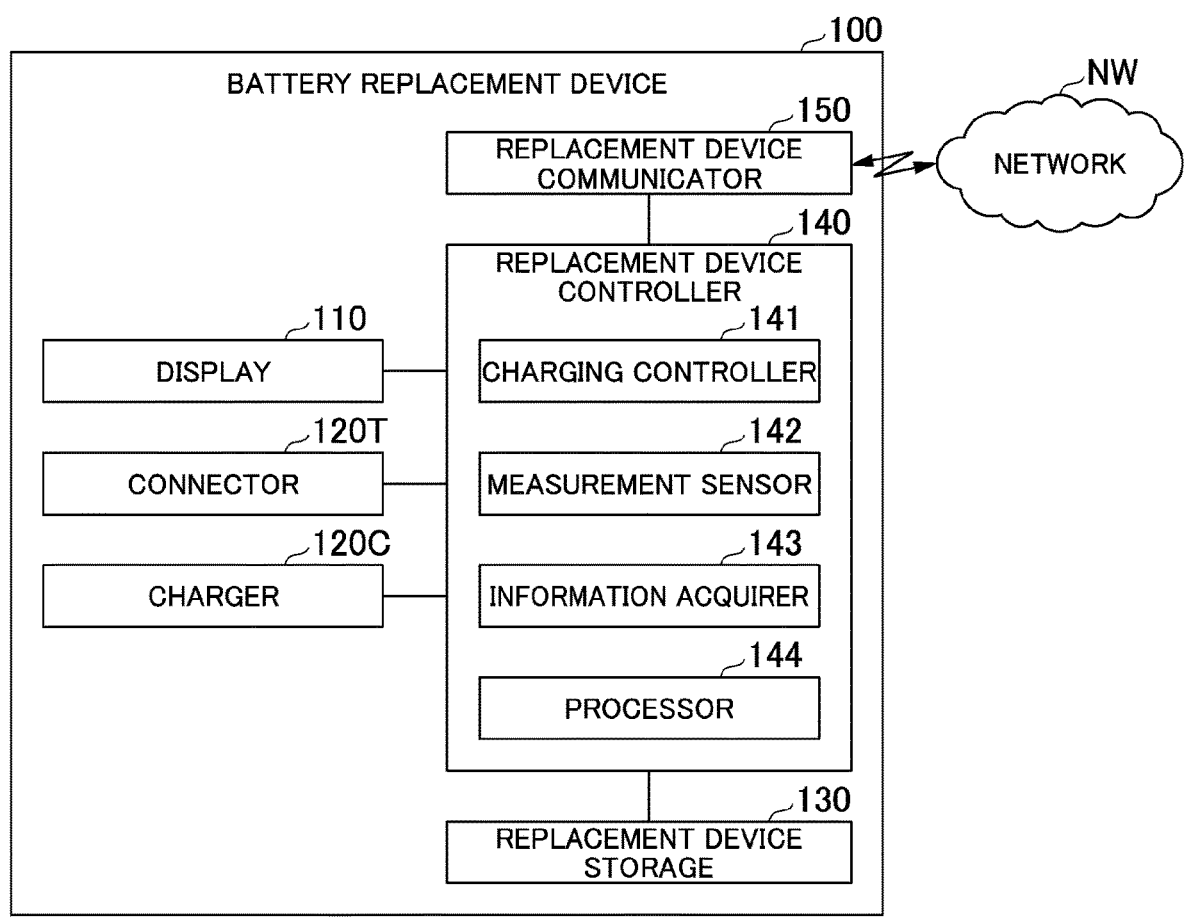
FIG. 3 is a block diagram showing a schematic configuration of a battery replacement device constituting the shared battery management system of the first embodiment.

Subsequently, an example of a configuration of the battery replacement device 100 will be described. FIG. 3 is a block diagram showing a schematic configuration of a battery replacement device 100 constituting the shared battery management system 10 of the first embodiment. As shown in FIG. 3, the battery replacement device 100 includes a display 110, a connector 120T, a charger 120C, a replacement device storage 130, a replacement device controller 140, and a replacement device communicator 150. Also, the replacement device controller 140 includes a charging controller 141, a measurement sensor 142, an information acquirer 143, and a processor 144.

The connector 120T is a connector having a structure that is electrically connected to the connector 515 provided in the accommodated removable battery 510 in the battery slot 120 provided in the battery replacement device 100. In the battery replacement device 100, the connector 120T is provided on the back side of the battery accommodator 120H for each battery slot 120. Each connector 120T transmits information such as a battery ID that is exchanged between the removable battery 510 accommodated in the corresponding battery slot 120 and the replacement device controller 140. Also, the connector 120T transmits electric power to and from the removable battery 510. That is, the connector 120T supplies electric power for charging to the power storage 511 provided in the removable battery 510.

The charger 120C is a charger that charges the removable battery 510 in accordance with control from the replacement device controller 140 when the removable battery 510 is accommodated in the battery slot 120 and the connector 515 of the accommodated removable battery 510 and the connector 120T are connected. The charger 120C charges the removable battery 510 by supplying electric power to the power storage 511 of the removable battery 510 via the connector 120T. In the battery replacement device 100, the charger 120C is provided for each battery slot 120. Also, the charger 120C may be configured to be connected to a power supply (not shown) for supplying electric power to the removable battery 510.

The eight battery slots 120-1 to 120-8 are provided in the battery replacement device 100 shown in FIG. 1. Accordingly, eight connector s 120T and eight chargers 120C are also provided in correspondence with the battery slots 120. Also, in the following description, when the connector 120T and the charger 120C corresponding to each of the eight battery slots 120-1 to 120-8 are distinguished and represented, the hyphen "-" and the number following the hyphen "-" are shown. For example, the connector 120T corresponding to the battery slot 120-1 is referred to as a "connector 120-1T" and the charger 120C corresponding to the battery slot 120-1 is referred to as a "charger 120-IC."

The replacement device storage 130 stores various information in the battery replacement device 100. The replacement device storage 130 stores at least the available battery list L previously acquired from the operation server 200 via the network NW. The replacement device storage 130 is configured to include, for example, a memory such as a ROM, a RAM, an electrically erasable programmable read only memory (EEPROM), a hard disk drive (HDD), or a flash memory. Also, the replacement device storage 130 stores a program for the replacement device controller 140 to execute the function of the battery replacement device 100. Also, the replacement device storage 130 may store information of whether or not the removable battery 510 has been accommodated in each battery slot 120 provided in the battery replacement device 100 and the state of the removable battery 510 accommodated in each battery slot 120, i.e., information indicating whether the removable battery 510 is being charged or charging of the removable battery 510 has been completed (hereinafter referred to as "battery state information"). Also, the replacement device storage 130 may store identification information (hereinafter referred to as a "battery replacement device ID") exclusively assigned to the battery replacement device 100.

The replacement device controller 140 controls the entire battery replacement device 100. The replacement device controller 140 is configured to include, for example, a processor such as a CPU. The replacement device controller 140 implements the function of the battery replacement device 100 by reading and executing the program stored in the replacement device storage 130. More specifically, the replacement device controller 140 outputs an instruction for acquiring the available battery list L to the replacement device communicator 150 at predetermined relatively long-time intervals (for example, every three hours or every day). Thereby, the replacement device communicator 150 communicates with the operation server 200 via the network NW and causes the replacement device storage 130 to store the available battery list L acquired from the operation server 200. The replacement device controller 140 performs a procedure for replacing the used battery 510u brought in by the user of the electric motorcycle 50 with the charged battery 510c on the basis of information of the battery IDs of the removable batteries 510 included in the available battery list L stored in the replacement device storage 130. At this time, the replacement device controller 140 notifies the user of the electric motorcycle 50 of the battery slot 120 (for example, a battery slot 120-1) in which the used battery 510u will be accommodated through the display 110. Thereby, the user of the electric motorcycle 50 accommodates the used battery 510u brought in by him or her in the battery accommodator 120-1H of the battery slot 120-1 in a state in which no removable battery 510 is accommodated. Subsequently, the replacement device controller 140 may determine whether or not the used battery 510u accommodated in the battery accommodator 120-1H is a removable battery 510 capable of being replaced on the basis of the information of the battery IDs of the removable batteries 510 included in the available battery list L. When it is determined that the used battery 510u accommodated in the battery accommodator 120-1H is a removable battery 510 capable of being replaced, the replacement device controller 140 notifies the user of the electric motorcycle 50 of the battery slot 120 (for example, a battery slot 120-2) in which the charged battery 510c is accommodated through the display 110. Thereby, the user of the electric motorcycle 50 extracts the charged battery 510c from the battery accommodator 120-2H of the battery slot 120-2 and replaces the removable battery 510 with the charged battery 510c. Subsequently, the replacement device controller 140 charges the used battery 510u accommodated in the battery accommodator 120-1H. On the other hand, when it is determined that that the used battery 510u accommodated in the battery accommodator 120-1H is a removable battery 510 that cannot be replaced, the replacement device controller 140 prohibits the used battery 510u from being replaced with the charged battery 510c accommodated in the battery slot 120 (for example, the battery slot 120-2). The replacement device controller 140 notifies the user of the electric motorcycle 50 that the used battery 510u accommodated in the battery accommodator 120-1H is a removable battery 510 that cannot be replaced through the display 110.

The information acquirer 143 acquires information of the removable battery 510 accommodated in the battery slot 120. More specifically, the information acquirer 143 acquires the battery ID of the used battery 510u via the connector 120T when the used battery 510u is accommodated in the battery accommodator 120H of the battery slot 120 and the connector 515 and the connector 120T are connected. The information acquirer 143 outputs the acquired battery ID information to the processor 144. Also, the information acquirer 143 may cause the replacement device storage 130 to store the acquired battery ID information.

The measurement sensor 142 is configured to include various types of sensors that measure the state when the charger 120C is charging the removable battery 510. The measurement sensor 142 is configured to include, for example, a voltage sensor, an electric current sensor, and a temperature sensor. When the removable battery 510 is being charged, the measurement sensor 142 measures the voltage applied to the power storage 511 using the voltage sensor and measures the electric current flowing through the power storage 511 using the electric current sensor. Also, the measurement sensor 142 measures the temperature of the power storage 511 when the removable battery 510 is being charged using the temperature sensor. The measurement sensor 142 outputs a measured value indicating a measured state of the removable battery 510 to the charging controller 141.

Also, the measurement sensor 142 may be configured to acquire the state of the power storage 511 measured by the measurement sensor 512 provided in the removable battery 510 via the connector 120T. In this case, the measurement sensor 142 outputs the measured value indicating the state of the power storage 511 acquired from the measurement sensor 512 to the charging controller 141.

The charging controller 141 also controls the charging of the removable battery 510 by controlling the charger 120C in consideration of the measured value of the removable battery 510 output from the measurement sensor 142. When the charging of the removable battery 510 has been completed, the charging controller 141 outputs information indicating that the charging has been completed to the processor 144. Also, the charging controller 141 may output information indicating the current state in which the removable battery 510 is being charged to the processor 144. At this time, when the battery state information is stored in the replacement device storage 130, the charging controller 141 may output information indicating the current state in which the removable battery 510 is being charged to the replacement device storage 130 and update the battery state information stored in the replacement device storage 130.

Also, the battery replacement device 100 may cause the removable battery 510 to be temporarily discharged with the remaining power before the removable battery 510 is charged. In this case, the charging controller 141 also controls the discharging of the removable battery 510.

The processor 144 performs a procedure for replacing the removable battery 510 in the battery replacement device 100. More specifically, the processor 144 combines the battery ID output from the information acquirer 143 with the battery ID of the removable battery 510 included in the available battery list L stored in the replacement device storage 130 and determines whether or not the used battery 510$u$ accommodated in the battery slot 120 is a removable battery 510 capable of being replaced at the battery replacement device 100.

When a result of the above-described determination indicates that the used battery 510$u$ is a removable battery 510 capable of being replaced at the battery replacement device 100, the processor 144 performs a process of replacing the used battery 510$u$ with the charged battery 510$c$ and a process of charging the used battery 510$u$. In the process of replacing the used battery 510$u$ with the charged battery 510$c$ in the processor 144, the charged battery 510$c$ to be replaced is selected and the notification of the battery slot 120 in which the selected charged battery 510$c$ is accommodated for the user of the electric motorcycle 50 is provided. At this time, when the battery state information is stored in the replacement device storage 130, the processor 144 may be configured to output information about whether or not the removable battery 510 is accommodated in the battery slot 120 to the replacement device storage 130 and update the battery state information stored in the replacement device storage 130. Also, in the process of charging the used battery 510$u$ in the processor 144, an instruction indicating that the used battery 510$u$ is to be charged is output to the charging controller 141. Thereby, the charging controller 141 controls the charger 120C in consideration of the measured value of the removable battery 510 output from the measurement sensor 142, so that the charger 120C charges the used battery 510$u$.

On the other hand, when a result of the above-described determination indicates that the used battery 510$u$ is a removable battery 510 that cannot be replaced at the battery replacement device 100, the processor 144 notifies the user of the electric motorcycle 50 that the used battery 510$u$ cannot be replaced.

The replacement device communicator 150 performs wireless communication with the operation server 200 via the network NW in response to an instruction from the replacement device controller 140 and acquires the available battery list L from the operation server 200. The replacement device communicator 150 outputs the available battery list L acquired from the operation server 200 to the replacement device storage 130 and causes the replacement device storage 130 to store the available battery list L.

Also, the available battery list L is not always updated every time the replacement device communicator 150 accesses the operation server 200. Thus, when an instruction for acquiring the available battery list L from the replacement device controller 140 is input, the replacement device communicator 150 first asks the operation server 200 about whether or not the available battery list L has been updated. The replacement device communicator 150 may acquire the current available battery list L as a new available battery list L only when the available battery list L has been updated in the operation server 200, and cause the replacement device storage 130 to store the new available battery list L, i.e., may update the available battery list L stored in the replacement device storage 130.

Also, the replacement device communicator 150 may notify the replacement device controller 140 (more specifically, the processor 144) of information indicating that the available battery list L stored in the replacement device storage 130 has been updated. However, the processor 144 determines whether or not the used battery 510$u$ is a removable battery 510 capable of being replaced on the basis of the battery IDs of the removable batteries 510 included in the available battery list L previously stored in the replacement device storage 130. Therefore, whether or not the available battery list L stored in the replacement device storage 130 has been updated does not affect the determination of whether or not the used battery 510$u$ is a removable battery 510 capable of being replaced in the processor 144. Accordingly, the replacement device communicator 150 may not necessarily output the information indicating that the available battery list L has been updated to the processor 144.

(Configuration of Operation Server 200)

Figure 4:
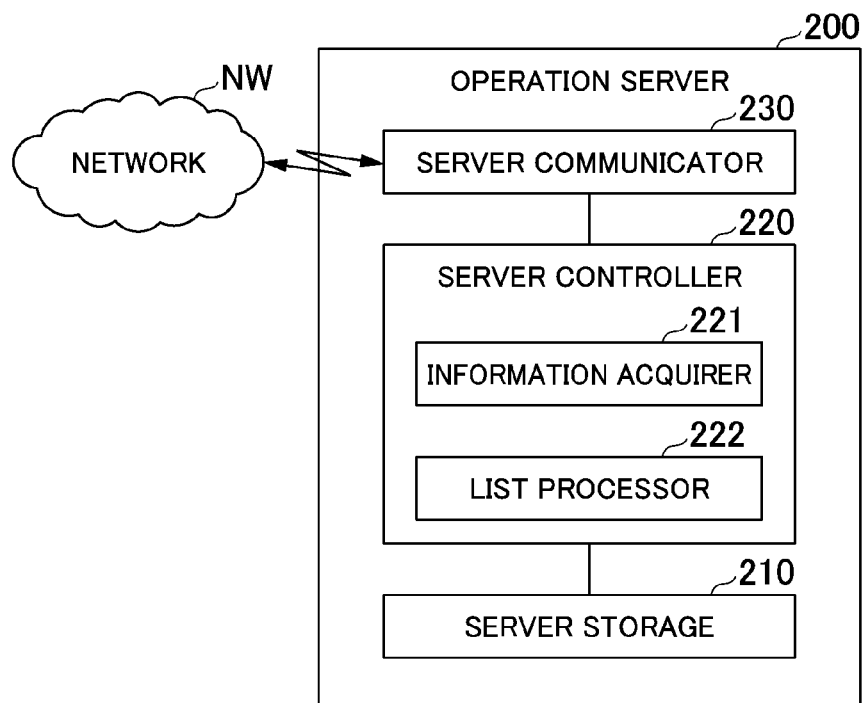
FIG. 4 is a block diagram showing a schematic configuration of an operation server constituting the shared battery management system of the first embodiment.

Next, an example of a configuration of the operation server 200 will be described. FIG. 4 is a block diagram showing a schematic configuration of the operation server 200 constituting the shared battery management system 10 of the first embodiment. As shown in FIG. 4, the operation server 200 includes a server storage 210, a server controller 220, and a server communicator 230. Also, the server controller 220 includes an information acquirer 221 and a list processor 222.

The server storage 210 stores various information in the operation server 200. The server storage 210 stores at least the available battery list L to be transmitted to the battery replacement device 100 via the network NW. The server storage 210 is configured to include, for example, a memory such as a ROM, a RAM, an EEPROM, an HDD, or a flash memory. Also, the server storage 210 stores a program for the server controller 220 to execute the function of the operation server 200. Also, the server storage 210 may store information in which the battery replacement device ID exclusively assigned to the battery replacement device 100 is associated with a version of the available battery list L transmitted to the battery replacement device 100.

The server controller 220 controls the entire operation server 200. The server controller 220 is configured to include, for example, a processor such as a CPU. The server controller 220 implements the function of the operation server 200 by reading and executing the program stored in the server storage 210. More specifically, the server controller 220 creates or updates the available battery list L recording the battery ID of the removable battery 510 capable of being replaced at the battery replacement device 100 and outputs the created or updated available battery list L to the server storage 210 so that the server storage 210 stores the created or updated available battery list L. Also, as described above, for example, the creation and update of the available battery list L in the server controller 220 and the like are performed by the manager of the shared battery management system 10 operating an input device (for example, a keyboard or a mouse) (not shown) on the basis of information displayed on a display device (for example, a liquid crystal display) (not shown) of a terminal (not shown) connected to the operation server 200. Also, the server controller 220 reads the available battery list L stored in the server storage 210 in response to a request from the battery replacement device 100 and outputs the available battery list L to the server communicator 230, so that the available battery list L is transmitted to the battery replacement device 100 via the network NW.

For example, the information acquirer 221 acquires information of a battery ID of the removable battery 510 to be included in the available battery list L for addition or deletion (deregistration) in response to an operation on the input device (not shown) of the terminal (not shown) connected to the operation server 200 by the manager of the shared battery management system 10 or the like. More specifically, the information acquirer 221 acquire the battery ID of the removable battery 510 to be added when a removable battery 510 capable of being replaced at the battery replacement device 100 is newly added according to an operation on the terminal (not shown) by the manager or the like. Also, the information acquirer 221 acquires the battery ID of the removable battery 510 that cannot be replaced at the battery replacement device 100 due to deterioration or destruction when the deregistration from the available battery list L is performed according to the operation of the terminal (not shown) by the manager or the like. Also, the information acquirer 221 may acquire the battery ID of the removable battery 510 to be deregistered from the available battery list L from the battery replacement device 100. In this case, the information acquirer 221 acquires information of the battery ID of the removable battery 510 (the removable battery 510 that has deteriorated or destructed) to be deregistered from the available battery list L transmitted by the battery replacement device 100 via the network NW. The information acquirer 221 outputs the acquired information of the battery ID to the list processor 222. Also, the information acquirer 221 may cause the server storage 210 to store the acquired information of the battery ID.

The list processor 222 processes the creation and update of the available battery list L. More specifically, when the battery ID of the removable battery 510 to be added to the available battery list L has been output from the information acquirer 221, the list processor 222 updates the available battery list L by performing a process of creating a new available battery list L in which the battery ID is registered and a process of adding (registering) a battery ID to the current available battery list L. Also, when the battery ID of the removable battery 510 to be deregistered from the available battery list L has been output from the information acquirer 221, the list processor 222 updates the available battery list L by performing a process of deleting the battery ID included (registered) in the current available battery list L. The list processor 222 outputs the created or updated available battery list L in the server storage 210 and causes the server storage 210 to store the output available battery list L. Also, the battery replacement device 100 may be configured to perform a process of deleting the battery ID included (registered) in the current available battery list L. In this case, the battery replacement device 100 transmits the updated available battery list L to the operation server 200 via the network NW. The information acquirer 221 acquires the updated available battery list L transmitted by the battery replacement device 100 and outputs the updated available battery list L to the list processor 222. The list processor 222 outputs the updated available battery list L (which may be in the state of the available battery list L output by the information acquirer 221 as it is or may be further processed) output by the information acquirer 221 to the server storage 210 and causes the server storage 210 to store the updated available battery list L.

The server communicator 230 performs wireless communication with the replacement device communicator 150 provided in the battery replacement device 100 via the network NW. The server communicator 230 transmits the available battery list L created or updated by the list processor 222 and stored in the server storage 210 to the battery replacement device 100 in response to the request of the available battery list L transmitted from the battery replacement device 100.

As described above, the available battery list L is not always updated every time there is a request from the battery replacement device 100. Thus, the battery replacement device 100 first transmits an inquiry about whether or not the available battery list L has been updated. When the battery replacement device 100 has transmitted an inquiry about whether or not the available battery list L has been updated, the server communicator 230 notifies the server controller 220 that the inquiry has been transmitted. Thereby, the server controller 220 outputs information indicating whether or not the list processor 222 has updated the available battery list L to the server communicator 230 after the available battery list L was previously transmitted. Also, the determination of whether or not the available battery list L in the server controller 220 has been updated may be performed for each operation server 200 on the basis of information in which the battery replacement device ID of the battery replacement device 100 and a version of the transmitted available battery list L stored in the server storage 210 are associated. The server communicator 230 transmits information indicating whether or not the available battery list L output from the server controller 220 has been updated to the battery replacement device 100 via the network NW. Subsequently, when the information indicating that the available battery list L has been updated has been transmitted to the battery replacement device 100, a request of the available battery list L is transmitted from the battery replacement device 100. When the request of the available battery list L has been transmitted from the battery replacement device 100, the server communicator 230 notifies the server controller 220 that the transmission of the available battery list L has been requested. Thereby, the server controller 220 reads the available battery list L stored in the server storage 210 and outputs the available battery list L to the server communicator 230. The server communicator 230 transmits the available battery list L output from the server controller 220 to the battery replacement device 100 via the network NW. Thereby, the battery replacement device 100 can independently perform a procedure for acquiring the latest available battery list L and replacing the used battery 510$u$ with the charged battery 510$c$ on the basis of the acquired latest available battery list L.

Figure 5:
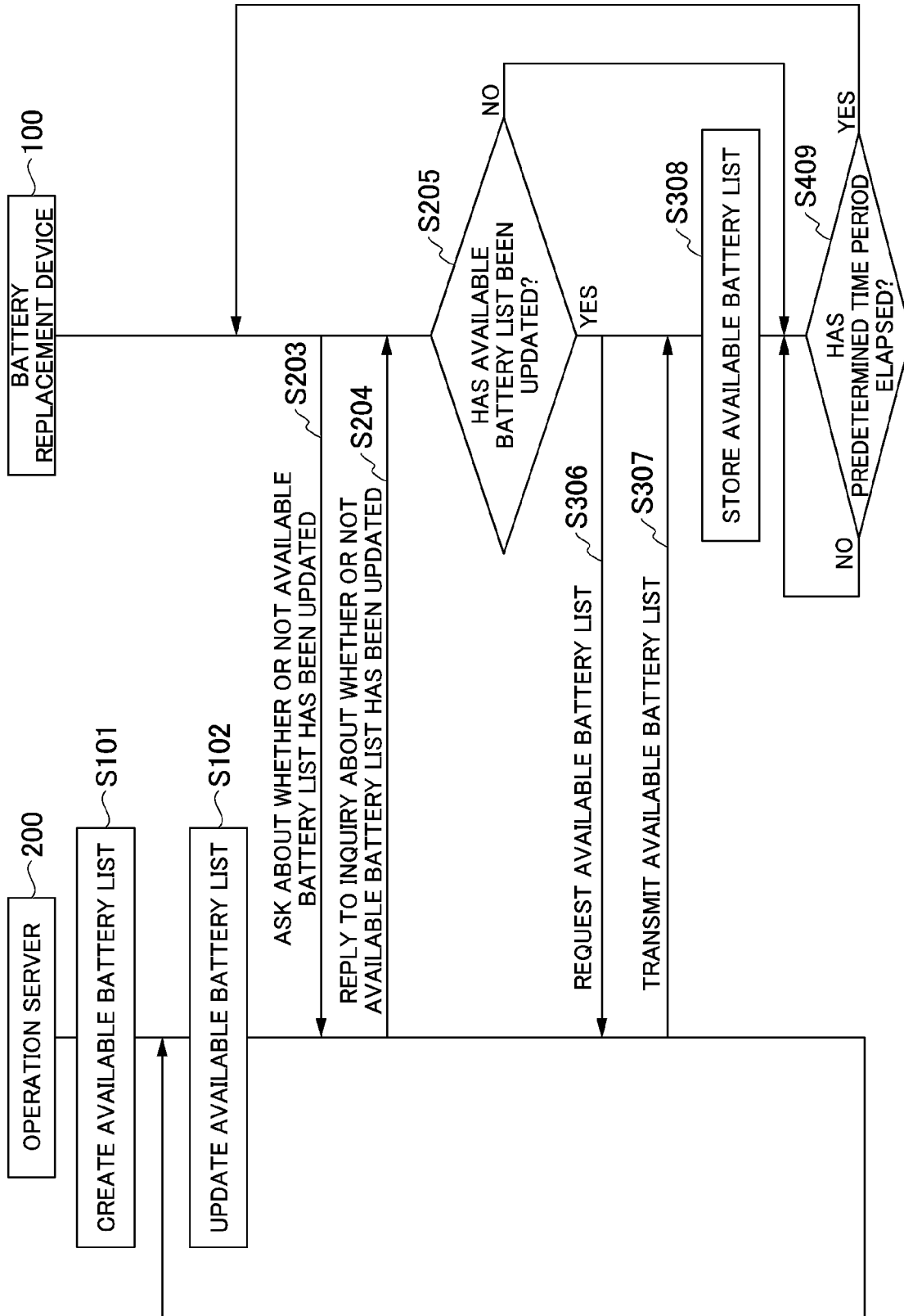
FIG. 5 is a sequence diagram showing a flow of a process of acquiring information of a removable battery capable of being replaced in a battery sharing service adopting the shared battery management system of the first embodiment.
Figure 6:
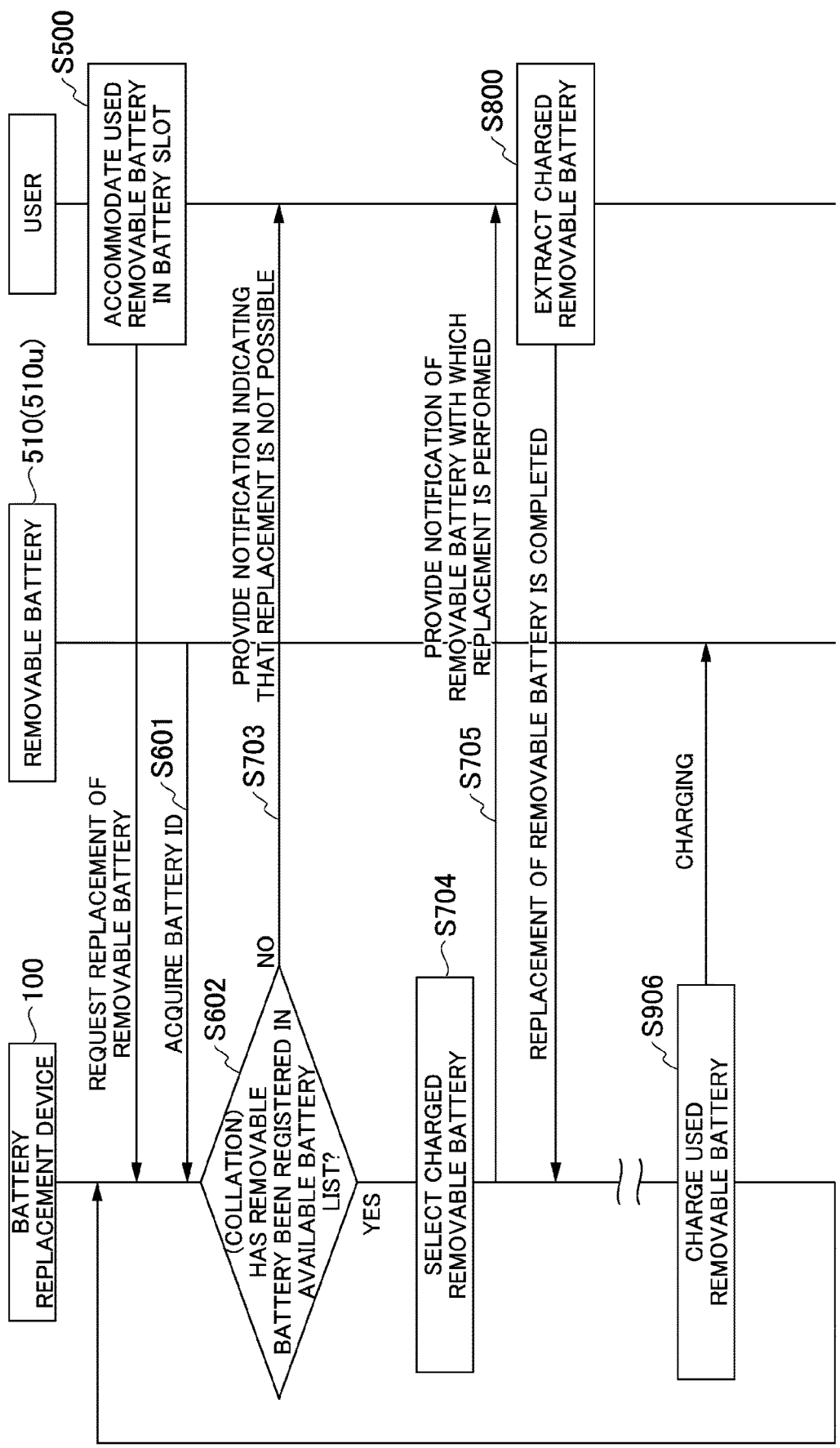
FIG. 6 is a sequence diagram showing a flow of a process of replacing a removable battery in the battery sharing service adopting the shared battery management system of the first embodiment.

Next, an example of a flow of a process in the shared battery management system 10 of the first embodiment will be described. FIG. 5 is a sequence diagram showing a flow of a process of acquiring information (an available battery list L) of the removable battery 510 capable of being replaced in the battery sharing service adopting the shared battery management system 10 of the first embodiment. In FIG. 5, an example of processes of the battery replacement device 100 and the operation server 200 constituting the shared battery management system 10 that provides the battery sharing service is shown. Also, FIG. 6 is a sequence diagram showing a flow of a process of replacing the removable battery 510 in the battery sharing service adopting the shared battery management system 10 of the first embodiment. In FIG. 6, an example of a process of the battery replacement device 100 constituting the shared battery management system 10 that provides the battery sharing service is shown in association with the removable battery 510 (the used battery 510u) to be replaced and the user of the electric motorcycle 50.

First, a process in which the operation server 200 creates or updates the available battery list L and a process in which the battery replacement device 100 acquires the available battery list L will be described with reference to FIG. 5. Also, in the following description, because a process from the stage before the operation of the battery sharing service is started is described, it is assumed that the shared battery management system 10 has not created the available battery list L at present. Also, for example, although the manager of the shared battery management system 10 or the like creates or updates an available battery list L by operating the terminal (not shown) connected to the operation server 200 in the shared battery management system 10 as described above, the creation or update of the available battery list L according to the operation of the manager or the like is also shown as a process of the operation server 200 for ease of description in the sequence diagram shown in FIG. 5.

In the stage before the operation of the battery sharing service starts, in the shared battery management system 10, the manager first operates the terminal (not shown) connected to the operation server 200 and creates an available battery list L in which the removable battery 510 to be rented out to the user of the electric motorcycle 50 is registered (step S101). At this time, the operation server 200 accesses the information acquirer 221 provided in the server controller 220 when the manager operates the terminal (not shown) and causes the information acquirer 221 to acquire information of a battery ID of the removable battery 510 included in the available battery list L and the list processor 222 provided in the server controller 220 creates a new available battery list L in which the battery ID of the removable battery 510 acquired by the information acquirer 221 is registered. The operation server 200 stores the created available battery list L in the server storage 210. Here, the battery IDs of a plurality of removable batteries 510 capable of being rented out to the user of the electric motorcycle 50 in the battery sharing service are registered in the available battery list L created by the list processor 222 and stored in the server storage 210. When this available battery list L is created, the operation of the battery sharing service can be started.

Subsequently, in the operation server 200, the removable battery 510 to be rented out to the user of the electric motorcycle 50 is added or deregistered according to the operation of the manager on the terminal (not shown) and the available battery list L is updated (step S102). At this time, in the operation server 200, the information acquirer 221 acquires information of the battery ID of the removable battery 510 to be included in the available battery list L or deleted from the available battery list L according to the operation of the manager on the terminal (not shown) and the list processor 222 updates the available battery list L by registering or deregistering the battery ID of the removable battery 510 acquired by the information acquirer 221. The operation server 200 stores the updated available battery list L in the server storage 210. Thereby, the removable battery 510 capable of being rented out to the user of the electric motorcycle 50 in the battery sharing service is changed.

Also, the process of updating the available battery list L in the operation server 200 is performed at any timing after the removable battery 510 to be rented out to the user of the electric motorcycle 50 is added or deregistered according to the operation of the manager. Thus, the operation server 200 iterates a process of updating the available battery list L in step S102 at any timing.

Because the update of the available battery list L in the operation server 200 is performed when a removable battery 510 capable of being replaced at the battery replacement device 100 has been newly added or when a registered removable battery 510 cannot be replaced at the battery replacement device 100 due to deterioration or destruction thereof, it is considered that the update is not frequently performed.

On the other hand, in the shared battery management system 10, the battery replacement device 100 asks the operation server 200 about whether or not the available battery list L has been updated (step S203). At this time, in the battery replacement device 100, the processor 144 provided in the replacement device controller 140 outputs an instruction for acquiring the available battery list L to the replacement device communicator 150. Thereby, in the battery replacement device 100, the replacement device communicator 150 transmits an inquiry about whether or not the available battery list L has been updated to the operation server 200 via the network NW.

In response to this inquiry, the operation server 200 replies to the inquiry about whether or not the available battery list L has been updated (step S204). At this time, in the operation server 200, the list processor 222 outputs information indicating whether or not the available battery list L has been updated to the server communicator 230. Thereby, in the operation server 200, the server communicator 230 transmits the information indicating whether or not the available battery list L has been updated output from the list processor 222 as a response to the inquiry to the battery replacement device 100 via the network NW.

In response to this response, the battery replacement device 100 determines whether or not the available battery list L has been updated (step S205). When a result of the determination of step S205 indicates that the available battery list L has not been updated ("NO" in step S205), the battery replacement device 100 moves the process to step S409. On the other hand, when a result of the determination of step S205 indicates that the available battery list L has been updated ("YES" in step S205), the battery replacement device 100 requests the operation server 200 to provide the updated available battery list L (step S306). At this time, in the battery replacement device 100, the replacement device communicator 150 transmits the request of the available battery list L to the operation server 200 via the network NW.

In response to this request, the operation server 200 transmits the available battery list L stored in the server storage 210 to the battery replacement device 100 (step S307). At this time, in the operation server 200, the server controller 220 reads the available battery list L stored in the server storage 210 and outputs the read available battery list L to the server communicator 230. Thereby, in the operation server 200, the server communicator 230 transmits the available battery list L output from the server controller 220 as the latest available battery list L to the battery replacement device 100 via the network NW.

The battery replacement device 100 stores the available battery list L transmitted from the operation server 200 in the replacement device storage 130 (step S308). At this time, in the battery replacement device 100, the replacement device communicator 150 outputs the available battery list L transmitted from the operation server 200 to the replacement device storage 130 and causes the replacement device storage 130 to store the available battery list L. Thereby, the battery replacement device 100 can independently perform a procedure for replacing the removable battery 510 on the basis of the latest available battery list L transmitted from the operation server 200.

Subsequently, the battery replacement device 100 determines whether or not a predetermined time period (for example, three hours or one day) has elapsed (step S409). When a result of the determination of step S409 indicates that the predetermined time period has not elapsed ("NO" in step S409), the battery replacement device 100 iterates the determination of step S409 in the process. That is, the battery replacement device 100 waits for the process of acquiring the available battery list L from the operation server 200 before the predetermined time period elapses. On the other hand, when a result of the determination of step S409 indicates that the predetermined time period has elapsed ("YES" in step S409), the battery replacement device 100 returns to step S203 and again asks the operation server 200 about whether or not the available battery list L has been updated. That is, the battery replacement device 100 iterates the process of acquiring the latest available battery list L from the operation server 200 (steps S203 to S308).

Next, a process in which the battery replacement device 100 replaces the removable battery 510 will be described with reference to FIG. 6. Also, a case in which a used battery 510u brought in by the user of the electric motorcycle 50 is replaced with a charged battery 510c will be described in the following description. Also, a case in which the available battery list L previously acquired from the operation server 200 in the flow of the process shown in FIG. 5 is stored in the replacement device storage 130 provided in the battery replacement device 100 will be described in the following description. Also, although a case in which a procedure for replacing the removable battery 510 is started, for example, when the user of the electric motorcycle 50 operates an input means (not shown) provided in the battery replacement device 100 in the shared battery management system 10 is considered, a detailed description of the operation of the user of the electric motorcycle 50 on the battery replacement device 100 will be omitted for ease of description in the following description.

The user of the electric motorcycle 50 brings the used battery 510u running out of power and accommodates the used battery 510u in the battery accommodator 120H of the battery slot 120 (step S500). Thereby, the connector 120T within the battery accommodator 120H of any battery slot 120 provided in the battery replacement device 100 is electrically connected to the connector 515 of the used battery 510u accommodated by the user of the electric motorcycle 50. At this time, in the battery replacement device 100, the replacement device controller 140 starts a process of replacing the used battery 510u with the charged battery 510c under an assumption that the replacement of the used battery 510u accommodated in the battery accommodator 120H has been requested by the user of the electric motorcycle 50.

When the process of replacing the used battery 510u with the charged battery 510c is started at the battery replacement device 100, information of a battery ID of the used battery 510u is first acquired (step S601). At this time, at the battery replacement device 100, the information acquirer 143 provided in the replacement device controller 140 acquires the information of the battery ID from the storage 514 provided in the used battery 510u via the connector 120T of the battery accommodator 120H and the connector 515. The information acquirer 143 outputs the acquired information of the battery ID to the processor 144 provided in the replacement device controller 140.

When the information of the battery ID is output from the information acquirer 143, the processor 144 provided in the replacement device controller 140 determines whether or not the used battery 510u accommodated in the battery accommodator 120H is a removable battery 510 capable of being replaced (step S602). At this time, the processor 144 combines the battery ID included in the available battery list L stored in the replacement device storage 130 with the battery ID output from the information acquirer 143. More specifically, the processor 144 reads the available battery list L from the replacement device storage 130 and sequentially compares battery IDs included in the read available battery list L with the battery ID output from the information acquirer 143.

When the battery ID output from the information acquirer 143 is not included in the available battery list L, the processor 144 determines that the used battery 510u accommodated in the battery accommodator 120H is a removable battery 510 that cannot be replaced at the battery replacement device 100 in step S602 ("NO" in step S602). In this case, the processor 144 notifies the user of the electric motorcycle 50 that the used battery 510u cannot be replaced (step S703). Also, although a method of displaying a message indicating that the used battery 510u cannot be replaced on the display 110 is conceivable as a method of notifying the user of the electric motorcycle 50 that the used battery 510u cannot be replaced, various methods are conceivable as a method of providing a notification to the user of the electric motorcycle 50 in the present invention.

On the other hand, when the battery ID output from the information acquirer 143 is included in the available battery list L, the processor 144 determines that the used battery 510u accommodated in the battery accommodator 120H is a removable battery 510 capable of being replaced at the battery replacement device 100 in step S602 ("YES" in step S602). In this case, the processor 144 selects a charged battery 510c for replacement from among the charged batteries 510c accommodated in the battery slots 120 different from the battery slot 120 in which the used battery 510u is accommodated (step S704). Also, although a case in which the charged battery 510c that has been charged at the earliest time is selected in the process of selecting the charged battery 510c in the processor 144 when a plurality of charged batteries 510c are accommodated is conceivable, various methods are conceivable as a method of selecting the charged battery 510c in the processor 144. Also, the processor 144 may cause the replacement device storage 130 to store information of a battery ID of the selected charged battery 510c.

The processor 144 notifies the user of the electric motorcycle 50 of information of the selected charged battery 510c, i.e., the battery slot 120 in which the charged battery 510c for replacement is accommodated (step S705). Thereby, the user of the electric motorcycle 50 extracts the charged battery 510c accommodated in the battery accommodator 120H of the battery slot 120 indicated in the notification (step S800). That is, the user of the electric motorcycle 50 completes the replacement of the removable battery 510. Thereby, the user of the electric motorcycle 50 can mount the charged battery 510c on the electric motorcycle 50 and continue traveling.

At this time, the electrical connection between the connector 120T within the battery accommodator 120H of the battery slot 120 that is selected and indicated in the notification and the connector 515 of the charged battery 510c that is accommodated is disconnected. Thereby, at the battery replacement device 100, the replacement device controller 140 starts a process of charging the used battery 510u under an assumption that the replacement of the used battery 510u with the charged battery 510c by the user of the electric motorcycle 50 has been completed (step S906). At this time, at the battery replacement device 100, the processor 144 outputs an instruction indicating that the used battery 510u is to be charged to the information acquirer 143 provided in the replacement device controller 140. Thereby, the charging controller 141 controls the charger 120C on the basis of a measured value of the removable battery 510 output from the measurement sensor 142, so that the charger 120C charges the used battery 510u.

Also, in the present invention, various timings are conceivable as the timing for starting charging of the used battery 510u at the battery replacement device 100. For example, when a plurality of charged batteries 510c are accommodated, the processor 144 may output an instruction to the charging controller 141 so that charging is started immediately after the replacement of the used battery 510u is completed or may output an instruction to the charging controller 141 so that charging is started when the number of charged batteries 510c becomes less than or equal to a predetermined number.

Also, in the present invention, various methods are conceivable as a method of controlling the charger 120C when the used battery 510u is charged.

Subsequently, the battery replacement device 100 is on standby in a state in which a request for replacement of the used battery 510u from the user of the electric motorcycle 50 can be accepted. The battery replacement device 100 iterates a process of replacing the used battery 510u with the charged battery 510c and a process of charging the used battery 510u every time the user of the electric motorcycle 50 brings the used battery 510u running out of power and the replacement of the used battery 510u is requested (steps S601 to S906).

(Comparison of Operation Between Shared Battery Management System 10 and Conventional Shared Battery Management System)

Figure 7:
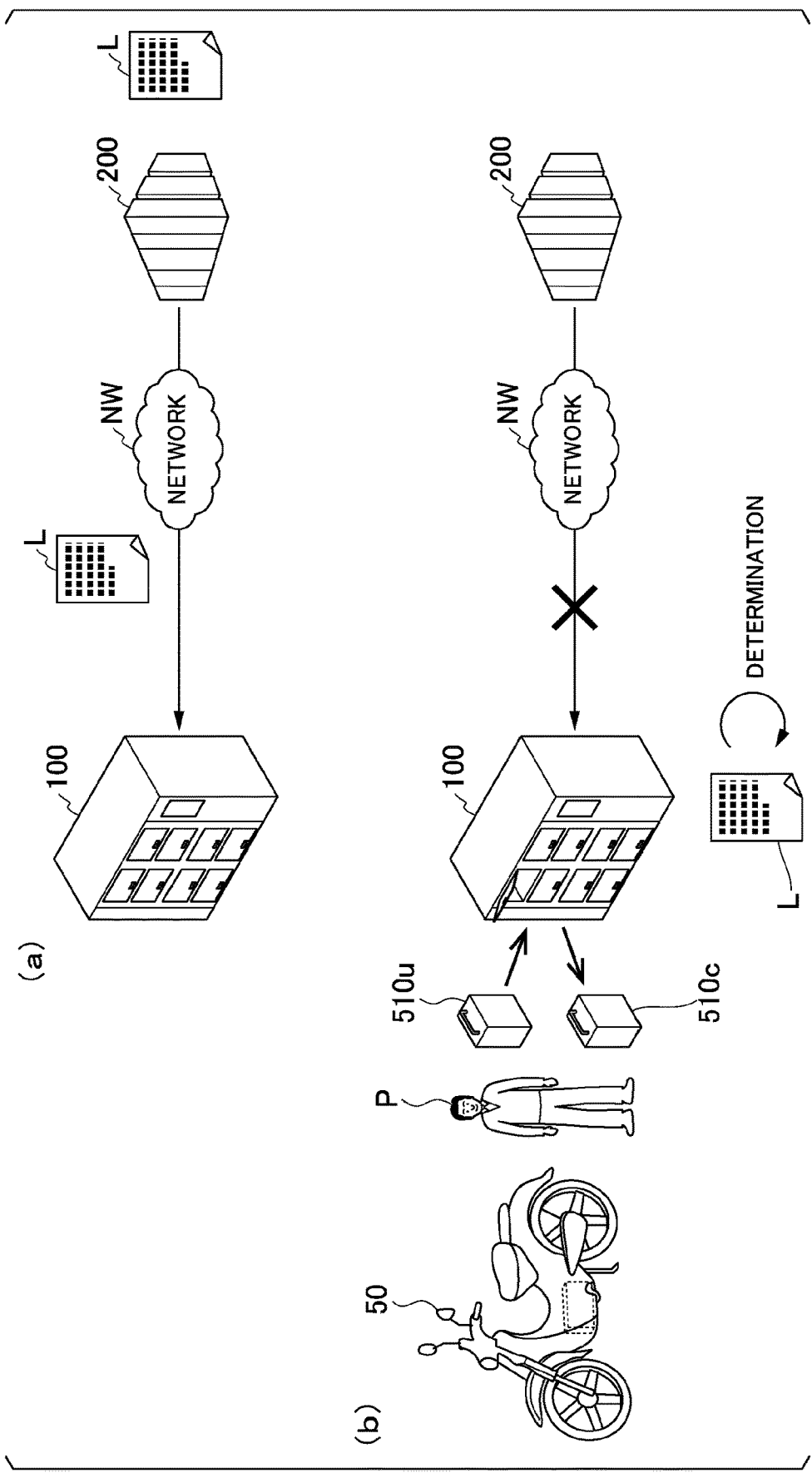
FIG. 7 is a diagram schematically showing a flow of a procedure for replacing a removable battery in the battery sharing service adopting the shared battery management system of the first embodiment.
Figure 8:
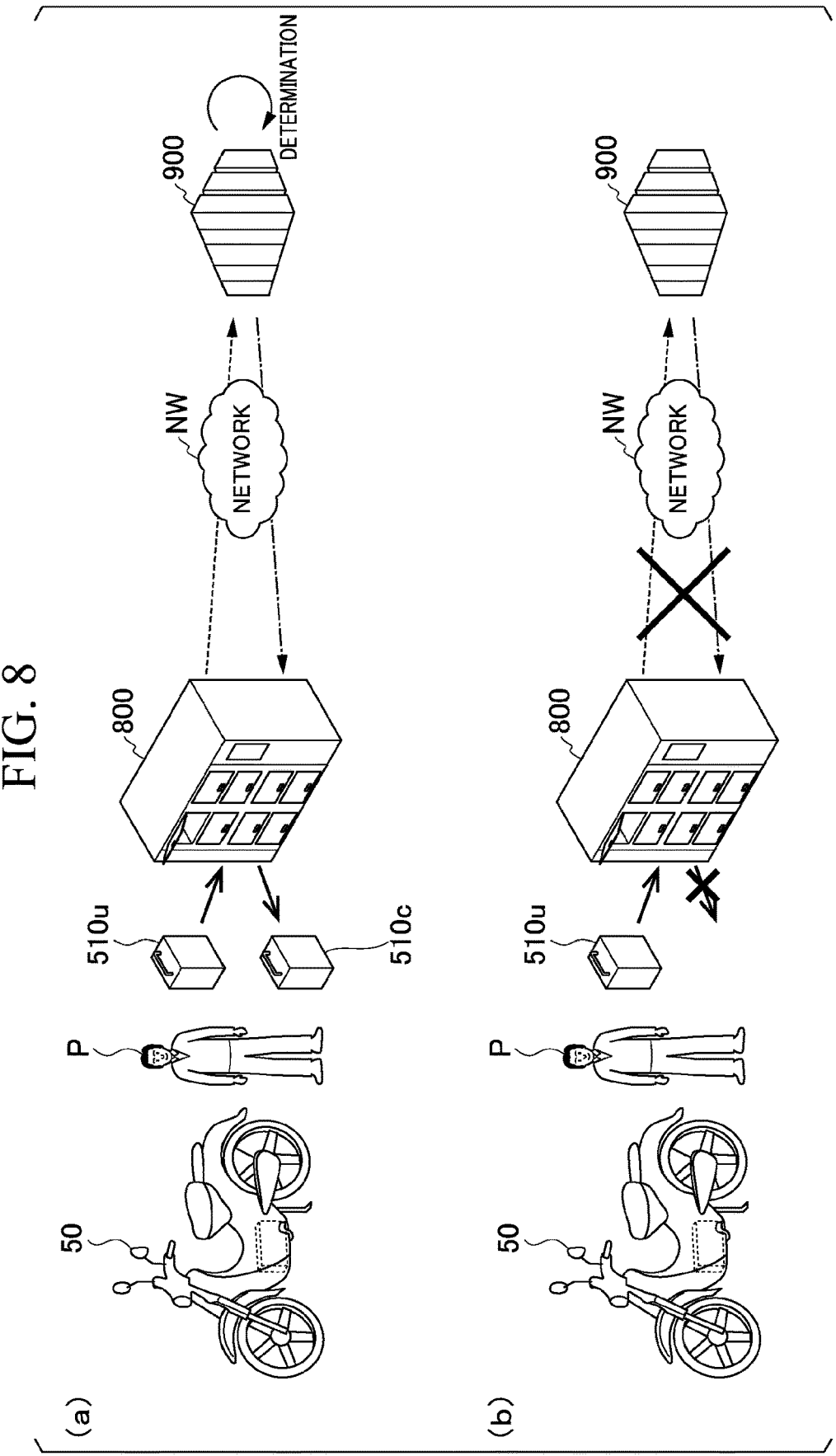
FIG. 8 is a diagram schematically showing a flow of a procedure for replacing a removable battery in a battery sharing service adopting a conventional shared battery management system.

Here, operations of a battery sharing service adopting the shared battery management system 10 and a battery sharing service adopting the conventional shared battery management system will be compared. FIG. 7 is a diagram schematically showing a flow of a procedure for replacing the removable battery 510 in the battery sharing service adopting the shared battery management system 10 of the first embodiment. Also, FIG. 8 is a diagram schematically showing a flow of a procedure for replacing the removable battery 510 in the battery sharing service adopting the conventional shared battery management system.

As described above, in the shared battery management system 10, the battery replacement device 100 performs a procedure for previously acquiring the available battery list L from the operation server 200 connected via the network NW and replacing the used battery 510u brought in by the user of the electric motorcycle 50 with the charged battery 510c on the basis of information of a battery ID of the removable battery 510 included in the acquired available battery list L. (a) of FIG. 7 schematically shows the state in which the shared battery management system 10 acquires the available battery list L created or updated by the operation server 200 via the network NW. Also, in (b) of FIG. 7, a state in which the battery replacement device 100 replaces the used battery 510u brought in by the user P of the electric motorcycle 50 with the charged battery 510c on the basis of the acquired available battery list L is schematically shown.

As shown in (a) of FIG. 7, the battery replacement device 100 acquires an available battery list L, which is used by the battery replacement device 100 when it is determined whether or not the used battery 510u is a removable battery 510 capable of being replaced, in advance, for example, at predetermined relatively long-time intervals that do not interfere with the charging of the used battery 510u, such as once every three hours or once a day, without acquiring the available battery list L from the operation server 200 every time the determination is performed. Thus, the battery replacement device 100 can independently perform a procedure for replacing the removable battery 510 without being affected by the state of wireless communication (an environment of communication) between the battery replacement device 100 and the operation server 200 via the network NW. That is, as shown in (b) of FIG. 7, the battery replacement device 100 can independently perform the procedure for replacing the removable battery 510 without having to stop or suspend the procedure for replacing the used battery 510u brought in by the user P of the electric motorcycle 50 with the charged battery 510c even if wireless communication with the operation server 200 via the network NW is interrupted or stable wireless communication cannot be performed. Thus, in the battery sharing service adopting the shared battery management system 10, it is possible to replace the used battery 510u with the charged battery 510c when the user P of the electric motorcycle 50 wants to replace the used battery 510u. Considering that the user P of the electric motorcycle 50 uses the battery sharing service at a timing when it is expected that the removable battery 510 will run out of power and traveling of the electric motorcycle 50 will be difficult, the shared battery management system 10 is considered to be significantly effective for promoting the battery sharing service.

On the other hand, in the conventional shared battery management system, communication via the network NW is performed between a station management device corresponding to the battery replacement device 100 and a system management device corresponding to the operation server 200 every time the user P of the electric motorcycle 50 brings the used battery 510u. In (a) of FIG. 8, the state of a process in the battery replacement device 800, which is the station management device, and the system management device 900 via the network NW in the conventional shared battery management system is schematically shown. More specifically, in the conventional shared battery management system, as shown in (a) of FIG. 8, the battery replacement device 800 transmits information of an IC card of the used battery 510u to the system management device 900 connected via the network NW at a timing when the used battery 510u is replaced with the charged battery 510c. In the conventional shared battery management system, as shown in (a) of FIG. 8, the system management device 900 determines whether or not the used battery 510u is a removable battery 510 capable of being replaced with the charged battery 510c at the battery replacement device 800 on the basis of the information of the IC card of the used battery 510u transmitted from the battery replacement device 800 and transmits a determination result to the battery replacement device 800 via the network NW. In the conventional shared battery management system, the battery replacement device 800 performs the procedure for replacing the used battery 510u with the charged battery 510c in accordance with the determination result transmitted from the system management device 900.

Thus, in the conventional shared battery management system, as shown in (b) of FIG. 8, it is not possible to perform the procedure for replacing the used battery 510u with the charged battery 510c when wireless communication via the network NW between the battery replacement device 800 and the system management device 900 is interrupted or stable wireless communication cannot be performed at a timing when the user P of the electric motorcycle 50 has brought the used battery 510u. That is, in the conventional shared battery management system, the procedure for replacing the used battery 510u brought in by the user P of the electric motorcycle 50 with the charged battery 510c has to be stopped or suspended due to an influence of the state of a wireless communication (an environment of communication) via the network NW between the battery replacement device 800 and the system management device 900. In this case, the user P of the electric motorcycle 50 has to wait for the wireless communication between the battery replacement device 800 and the system management device 900 via the network NW to be restored. This is because, considering that the user P of the electric motorcycle 50 arrives at the current battery replacement device 800 at a timing when it is expected that the removable battery 510 will run out of power and traveling of the electric motorcycle 50 will be difficult, it is considered difficult to go to another battery replacement device 800. Thus, considering that the user P of the electric motorcycle 50 uses the battery sharing service for the purpose of shortening a time period required to charge the removable battery 510 when the removable battery 510 runs out of power and traveling of the electric motorcycle 50 becomes difficult, the conventional shared battery management system is considered to be significantly disadvantageous for promoting the battery sharing service.

As described above, according to the first embodiment, the shared battery management system 10 includes the battery replacement device 100 installed in a plurality of places and configured to store and charge one or more removable batteries 510 and the operation server 200 configured to manage removable batteries 510 capable of being replaced at the battery replacement device 100. In the first embodiment, the operation server 200 creates or updates and stores the available battery list L recording battery IDs of removable batteries 510 with which replacement can be performed at the battery replacement device 100. Also, in the first embodiment, the battery replacement device 100 acquires the available battery list L from the operation server 200 via the network NW at predetermined relatively long-time intervals such as once a day and stores the acquired available battery list L. In the first embodiment, the battery replacement device 100 determines whether or not the used battery 510u desired to be replaced by the user of the electric motorcycle 50 is a removable battery 510 capable of being replaced with a charged battery 510c whose charging is completed and which is stored on the basis of the stored available battery list L. In the first embodiment, when it is determined that the used battery 510u is a removable battery 510 capable of being replaced, the battery replacement device 100 performs the procedure for replacing the used battery 510u with the charged battery 510c. Thereby, in the first embodiment, the battery replacement device 100 is not affected by the state of communication (an environment of communication) via the network NW between the battery replacement device 100 and the operation server 200 and can independently perform a procedure for replacing the removable battery 510. Thereby, in the first embodiment, when the user of the electric motorcycle 50 using the battery sharing service adopting the shared battery management system 10 wants to replace the used battery 510u, the used battery 510u can be replaced with the charged battery 510c.

Moreover, according to the first embodiment, the available battery list L used in determining whether or not the used battery 510u is a removable battery 510 capable of being replaced at the battery replacement device 100 is considered not to be frequently updated. Thus, in the first embodiment, for example, even if a period during which the communication between the battery replacement device 100 and the operation server 200 via the network NW is interrupted or stable communication cannot be performed is a long period such as several days, the battery replacement device 100 can independently continue to perform the procedure for replacing the removable battery 510 based on the stored available battery list L. Thereby, in the first embodiment, it is possible to continue to provide the battery sharing service to the user of the electric motorcycle 50.

Thereby, the first embodiment can contribute to the promotion of the automated battery sharing service.

Also, in the first embodiment, an example in which the battery replacement device 100 and the operation server 200 constituting the shared battery management system 10 communicate with each other via the network NW, which is a communication network for wireless communication, has been described. However, the communication between the battery replacement device 100 and the operation server 200 in the shared battery management system 10 is not limited to wireless communication. Even if the communication between the battery replacement device 100 and the operation server 200 in the shared battery management system 10 is wired communication, i.e., the network NW is a communication network of wired communication, a case in which the wired communication is interrupted or that stable wired communication cannot be performed when maintenance of the operation server 200 is performed or the like is also considered. However, in the shared battery management system 10, even if the communication between the battery replacement device 100 and the operation server 200 is wired communication, it is possible to similarly consider the above-described case by replacing the network NW with the wired communication. Accordingly, a detailed description of the procedure for replacing the removable battery 510 in the shared battery management system 10 when the communication between the battery replacement device 100 and the operation server 200 is wired communication will be omitted.

Also, an example in which one used battery 510u is brought in by the user of the electric motorcycle 50 and replaced at the battery replacement device 100 has been described in the first embodiment. However, the number of removable batteries 510 mounted for the electric motorcycle 50 to travel is not limited to one. That is, a case in which the electric motorcycle 50 is an electric vehicle that travels with electric power supplied from a plurality of removable batteries 510 is also conceivable. However, even if the electric motorcycle 50 is an electric vehicle that travels in a state in which a plurality of removable batteries 510 are mounted thereon, it is possible to similarly consider a procedure for replacing the removable batteries 510. For example, when the electric motorcycle 50 is an electric vehicle that travels with electric power supplied from two removable batteries 510, the user of the electric motorcycle 50 performs the operation of steps S500 and S800 shown in FIG. 6 on each removable battery 510, i.e., performs the operation twice, and the operation is the iteration of the same operation. Accordingly, a detailed description of the procedure for replacing the removable battery 510 in the electric vehicle that travels with the electric power supplied from the plurality of removable batteries 510 will be omitted.

Second Embodiment

Hereinafter, a second embodiment of the present invention will be described with reference to the drawings. A power storage device management system of the second embodiment is a power storage device management system for the purpose of constructing a battery sharing service in which a method of renting out a power storage device (a removable battery) can be easily changed. Also, in the following description, a case in which the power storage device management system of the second embodiment is a shared battery management system for managing the reception of a plurality of removable batteries shared by electric power devices (electric motorcycles) using electric power of a removable battery and managing the provision of alternative removable batteries will be described. Also, the same reference signs are given to components that are the same as those of the first embodiment described above and a detailed description thereof will be omitted.

(Overall Configuration)

Figure 9:
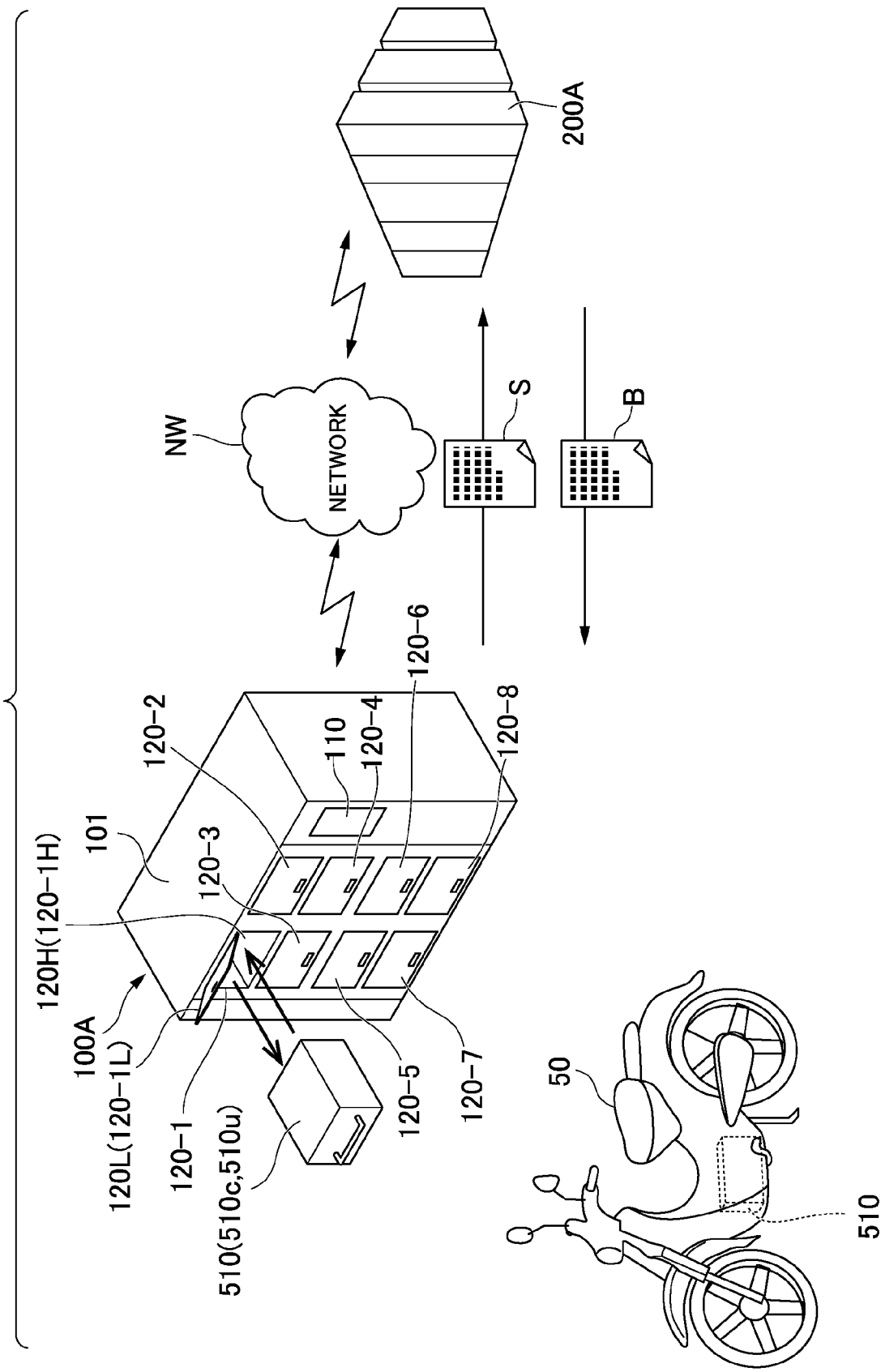
FIG. 9 is a diagram showing a concept of a battery sharing service adopting a shared battery management system according to a second embodiment of the present invention.

FIG. 9 is a diagram showing a concept of a battery sharing service adopting the shared battery management system according to the second embodiment of the present invention. As shown in FIG. 9, the shared battery management system 10A of the second embodiment is configured to include a battery replacement device 100A and an operation server 200A. Also, although one operation server 200A can be configured to correspond to a plurality of battery replacement devices 100A in the shared battery management system 10A of the second embodiment, only one battery replacement device 100A is shown in FIG. 9. Also, an electric motorcycle 50, which uses a battery sharing service adopting the shared battery management system 10A, is shown in FIG. 9.

Like the battery replacement device 100 of the first embodiment, the battery replacement device 100A is a facility that is installed in a plurality of places and stores and charges one or more removable batteries 510. Also, like the battery replacement device 100 of the first embodiment, the battery replacement device 100A is a facility that executes a procedure for replacing a removable battery 510 desired to be replaced by a user of the shared battery management system 10A (a user of an electric motorcycle 50 or the like) with a stored removable battery 510. Like the battery replacement device 100 of the first embodiment, the battery replacement device 100A is also connected to the operation server 200A via a network NW. Here, the network NW is a communication network such as a communication network for wireless communication. Also, the network NW may be a communication network for wired communication. However, in the present invention, it is considered that a more remarkable effect can be obtained when the network NW is a communication network for wireless communication than when the network NW is a communication network for wired communication.

The battery replacement device 100A exchanges information with the operation server 200A using communication via the network NW and replaces the removable battery 510. More specifically, the battery replacement device 100A transmits a battery state list recording information about removable batteries 510 that are stored and charged to the operation server 200A via the network NW periodically at predetermined time intervals (for example, every 5 minutes). Also, the battery replacement device 100A acquires (receives) a rentable battery list recording information of removable batteries 510 capable of being rented out and the order of rental from the operation server 200A via the network NW periodically at predetermined time intervals (for example, every 5 minutes).

Here, in the battery state list transmitted by the battery replacement device 100A to the operation server 200A, at least information of a charging count and a deterioration state of a removable battery 510 that is stored, a charging count, a deterioration state, and the state of charge (for example, a proportion at which charging is completed: a charge rate) of a removable battery 510 that is charged, and the like is recorded as information about the removable battery 510 in addition to battery IDs of the removable batteries 510 that are stored and charged. Also, the battery state list may record identification information (a battery replacement device ID) exclusively assigned to the battery replacement device 100A, information of the presence or absence of a failure in the battery replacement device 100A, and the like. Also, in the rentable battery list acquired by the battery replacement device 100A from the operation server 200A, at least information of the removable battery 510 with which rental (replacement) can be performed at the battery replacement device 100A, the order in which rental (replacement) is performed, and the like determined by the operation server 200A on the basis of the battery state list transmitted from the battery replacement device 100A is recorded as information of the removable battery 510 capable of being rented out.

The battery replacement device 100A acquires a rentable battery list recording the removable battery 510 with which rental (replacement) can be performed at the battery replacement device 100A and the order thereof from the operation server 200A and stores the rentable battery list. Also, the battery replacement device 100A replaces the currently stored rentable battery list with a newly acquired rentable battery list every time a new rentable battery list is acquired from the operation server 200A. That is, the battery replacement device 100A updates the stored rentable battery list at predetermined time intervals. In FIG. 9, the state in which the battery replacement device 100A transmits a battery state list S to the operation server 200A via the network NW and the operation server 200A acquires (receives) a rentable battery list B from the operation server 200A via the network NW is shown.

The battery replacement device 100A replaces a removable battery 510 running out of power brought in by the user of the electric motorcycle 50 with the stored removable battery 510 in accordance with information of the removable battery 510 with which rental (replacement) can be performed at the battery replacement device 100A and the order thereof indicated in the rentable battery list B acquired from the operation server 200A. Also, after replacement is performed with the stored removable battery 510, the battery replacement device 100A deletes information about the removable battery 510 with which replacement has been performed from the stored rentable battery list B. Thereby, the battery replacement device 100A can replace the removable battery 510 running out of power brought in by the user of the electric motorcycle 50 only with the removable battery 510 with which rental (replacement) can be performed included in the rentable battery list B.

An example of a configuration of the battery replacement device 100A is shown in FIG. 9. Because the components of the battery replacement device 100A shown in FIG. 9 are similar to the components of the battery replacement device 100 of the first embodiment, the same reference signs are given thereto and a detailed description thereof will be omitted.

Also, in FIG. 9, as in FIG. 1, the state in which the removable battery 510 is moved in and out of the battery slot 120-1 is shown.

Also, the configuration of the battery replacement device 100A shown in FIG. 9 is also an example and various configurations are conceivable as the configuration of the battery replacement device 100A in the present invention.

The operation server 200A is a server facility that manages the removable battery 510 capable of being replaced at the battery replacement device 100A as at the battery replacement device 100 of the first embodiment. The operation server 200A determines a removable battery 510 with which rental (replacement) can be performed at the battery replacement device 100A and the order in which rental (replacement) is performed with the removable battery 510 on the basis of the battery ID, the charging count, and the deterioration state of a removable battery 510 that is stored in the battery replacement device 100A and the battery ID, the charging count, the deterioration state, and the charge rate of a charged removable battery 510 included in the battery state list S transmitted from the battery replacement device 100A. The operation server 200A creates the rentable battery list B including information of a removable battery 510 with which rental (replacement) can be performed at the battery replacement device 100A, the order in which rental (replacement) is performed with the removable battery 510, and the like.

Also, although a case in which the battery state list S transmitted by the battery replacement device 100A to the operation server 200A is a list formatted such that information of a battery ID, a charging count, a deterioration state, and a charge rate of a removable battery 510 that is stored is associated for each battery slot 120 provided in the battery replacement device 100A is considered, various formats are conceivable as the format of the battery state list S in the present invention. Also, although a case in which the rentable battery list B created by the operation server 200A and transmitted to the battery replacement device 100A is, for example, a list formatted such that battery IDs of removable batteries 510 with which rental (replacement) can be performed at the battery replacement device 100A are arranged in the order in which rental (replacement) is performed or the like is considered, various formats are conceivable as the format of the rentable battery list B in the present invention.

In the following description, the battery state list S transmitted by the battery replacement device 100A to the operation server 200A will be described as a list formatted such that information of the battery ID, the charging count, the deterioration state, and the charge rate of a removable battery 510 that is stored is associated and stored for each battery slot 120 provided in the battery replacement device 100A. Also, the rentable battery list B created by the operation server 200A and transmitted to the battery replacement device 100A will be described as a list formatted such that battery IDs of the removable batteries 510 with which rental (replacement) can be performed at the battery replacement device 100A are arranged in the order in which rental (replacement) is performed.

Here, an example of thinking when the removable battery 510 with which rental (replacement) can be performed at the battery replacement device 100A and the order thereof included in the rentable battery list B are determined will be described. The removable battery 510 with which rental (replacement) can be performed at the battery replacement device 100A and the order in which rental (replacement) is performed with the removable battery 510 determined by the operation server 200A can be determined on the basis of rules determined in various types of thinking. That is, the logic when the battery replacement device 100A performs a procedure for replacing the removable battery 510 can be arbitrarily changed in the shared battery management system 10A. Also, for example, a case in which the state of the removable battery 510 stored in the battery replacement device 100A and the like are taken into account as a condition for determining the logic when the battery replacement device 100A performs a procedure for replacing the removable battery 510, i.e., a condition for determining a removable battery 510 with which rental (replacement) is performed and the order thereof in the operation server 200A, is conceivable. Also, for example, various external factors such as a place where the battery replacement device 100A is installed, a date and time (a date, a day of the week, a time period, and the like), weather, and the like are conceivable as a condition for determining a removable battery 510 with which rental (replacement) is performed and the order thereof in the operation server 200A. These conditions can be changed in accordance with rules preset in the operation server 200A. For example, the rules preset in the operation server 200A can be sequentially changed on the basis of thinking, an intention, or the like when the management or operation for the removable batteries 510 is performed by the manager of the shared battery management system 10A or the operator of the battery sharing service. At this time, the manager of the shared battery management system 10A or the operator of the battery sharing service sets rules for determining a removable battery 510 with which rental (replacement) can be performed at the battery replacement device 100A and the order thereof in the operation server 200A by operating a terminal (not shown) connected to the operation server 200A.

For example, a case in which the battery replacement device 100A does not perform rental (replacement) with a removable battery 510 that is insufficiently charged is conceivable in a battery sharing service adopting the shared battery management system 10A. In this case, the manager of the shared battery management system 10A or the like sets a rule of the operation server 200A so that only a charged battery 510c whose charging is completed and which is stored in the battery replacement device 100A is set as a removable battery 510 with which rental (replacement) can be performed by operating the terminal (not shown) connected to the operation server 200A. Also, for example, the manager of the shared battery management system 10A or the like sets a rule in the operation server 200A so that the order in which charging is completed, the order in which deterioration is small, or the order in which deterioration is large is determined to be the order in which rental (replacement) is performed with a charged battery 510c in the battery replacement device 100A by operating the terminal (not shown). Here, when the manager of the shared battery management system 10A or the like sets a rule in the operation server 200A so that the order in which charging is completed is determined to be the order in which rental (replacement) is performed with a charged battery 510c in the battery replacement device 100A, the charged batteries 510c are rented out to the users of the electric motorcycles 50 sequentially from a charged battery 510c whose charging is completed at the earliest time in the battery sharing service adopting the shared battery management system 10A.

Thereby, in the battery sharing service adopting the shared battery management system 10A, it is possible to stably perform rental (replacement) only with the charged battery 510c. Also, when the manager of the shared battery management system 10A or the like sets a rule in the operation server 200A so that the order in which deterioration is small is determined to be the order in which rental (replacement) is performed with a charged battery 510c in the battery replacement device 100A, deterioration states of many removable batteries 510 with which rental (replacement) is performed can be made uniform in the battery sharing service adopting the shared battery management system 10A. Thereby, in the battery sharing service adopting the shared battery management system 10A, a frequency of maintenance of the battery sharing service for replacing the deteriorated removable battery 510 can be reduced and the manager of the shared battery management system 10A or the operator of the battery sharing service can easily perform maintenance work such as simultaneous replacement of all the removable batteries 510. Also, when the manager of the shared battery management system 10A or the like sets a rule in the operation server 200A so that the order in which deterioration is large is determined to be the order in which rental (replacement) is performed with a charged battery 510c in the battery replacement device 100A, it is possible to prevent many removable batteries 510 to be rented out (replaced) from deteriorating at the same time in the battery sharing service adopting the shared battery management system 10A. Thereby, in the battery sharing service adopting the shared battery management system 10A, a frequency of maintenance of the battery sharing service for replacing the deteriorated removable battery 510 can be averaged and the manager of the shared battery management system 10A or the operator of the battery sharing service can reduce the number of removable batteries 510 to be replaced in maintenance work at one time.

Also, for example, in the battery sharing service adopting the shared battery management system 10A, a case in which the battery replacement device 100A can rent out (replace) the removable batteries 510 for more users (users) of the electric motorcycle 50 is also conceivable. In this case, for example, the manager of the shared battery management system 10A or the like predetermines a threshold value of the charge rate as a rental criterion for determining (considering the removable battery 510 with which rental (replacement) can be performed at the battery replacement device 100A. The manager of the shared battery management system 10A or the like sets a rule of the operation server 200A so that a removable battery 510 whose charge rate is greater than or equal to a predetermined proportion (whose charge rate is greater than or equal to 90%) is considered to be a charged battery 510c and is set as a removable battery 510 with which rental (replacement) can be performed by operating the terminal (not shown) connected to the operation server 200A. Also, for example, the manager of the shared battery management system 10A or the like sets a rule in the operation server 200A so that descending order of charge rates is determined to be the order in which rental (replacement) is performed with a removable battery 510 considered to be the charged battery 510c in the battery replacement device 100A by operating the terminal (not shown). Thereby, in the battery sharing service adopting the shared battery management system 10A, it is possible to rent out (replace) the removable batteries 510 for more users of the electric motorcycles 50, for example, when it is expected that the removable batteries 510 will be frequently rented out (replaced) such as when a place where the battery replacement device 100A is installed is a tourist spot, when the weather is sunny, when a day of the week is a weekend, or when a time period is the morning.

As described above, in the shared battery management system 10A, the manager of the shared battery management system 10A or the like can also arbitrarily change the logic when a procedure for replacing the removable battery 510 is performed in the same battery replacement device 100A by operating the terminal (not shown) and setting a rule in the operation server 200A. Also, although a method in which the manager of the shared battery management system 10A or the like sets rules in the operation server 200A by operating the terminal (not shown) has been described above, the server controller 220A within the operation server 200A may be configured to automatically perform the setting of the rule of the operation server 200A based on a condition in which a determination can be mechanically performed, for example, when the day of the week is the weekend, when the time period is the morning, or the like. Also, in the following description, for ease of description, the removable battery 510 charged at a predetermined proportion (charge rate) or more to be considered to be the charged battery 510c will also be referred to as a "charged battery 510c."

The operation server 200A transmits the created rentable battery list B to the battery replacement device 100A that has transmitted the battery state list S via the network NW. Thereby, the battery replacement device 100A acquires the rentable battery list B from the operation server 200A via the network NW. The battery replacement device 100A performs a procedure for replacing removable batteries 510 in the order of battery IDs included in the rentable battery list B acquired from the operation server 200A, i.e., in the order of charged batteries 510c indicated in the rentable battery list B.

Also, the rentable battery list B transmitted by the operation server 200A to the battery replacement device 100A may not necessarily include the battery IDs of all the removable batteries 510 included in the battery state list S transmitted from the battery replacement device 100A. That is, in the shared battery management system 10A, a removable battery 510 whose battery ID is not included in the rentable battery list B is a removable battery 510 that cannot be rented out at the battery replacement device 100A. Therefore, when a removable battery 510, which has been charged a predetermined number of times or more (which has a predetermined charging count or more), i.e., which has deteriorated, included in the battery state list S transmitted from the battery replacement device 100A has been found, the operation server 200A may not include the removable battery 510 as a removable battery 510 with which rental (replacement) is not performed in the battery sharing service in the rentable battery list B. That is, the operation server 200A may not intentionally include a deteriorated removable battery 510 as a removable battery 510 with which replacement is performed in the maintenance of the battery sharing service in the rentable battery list B. In this case, the operation server 200A may be configured to notify the manager of the shared battery management system 10A, the operator of the battery sharing service, or the like that there is a removable battery 510 that is intentionally not included in the rentable battery list B.

Also, for example, a case in which the management of the deterioration of each removable battery 510 in the operation server 200A can be performed by counting the charging count of the removable battery 510 from the time when the new removable battery 510 for rental (replacement) is added in the battery sharing service is conceivable. Here, if information about the charging count is output from the removable battery 510, the operation server 200A may manage the deterioration of the removable battery 510 on the basis of the charging count counted by the removable battery 510 itself. Also, if the operation server 200A registers and manages the removable battery 510 for the operation in the battery sharing service, the operation server 200A may count the charging count of the removable battery 510 and manage the deterioration of the removable battery 510 on the basis of information about a battery ID and the state of charge of the removable battery 510 included in the battery state list S transmitted from the battery replacement device 100A. However, in the present invention, various methods are conceivable as a method of counting the charging count of the removable battery 510 and a method of managing the deterioration of the removable battery 510 in the operation server 200A.

According to the above-described configuration, the shared battery management system 10A performs rental (replacement) with a charged battery 510c to be used instead of a used battery 510u running out of power brought in the battery replacement device 100A by the user of the electric motorcycle 50 in the logic according to the rules set in the operation server 200A by the manager of the shared battery management system 10A, the operator of the battery sharing service, or the like. At this time, the battery replacement device 100A performs a procedure for replacing the used battery 510u brought in by the user of the electric motorcycle 50 with the charged battery 510c in the order of the battery IDs included in the rentable battery list B acquired from the operation server 200A previously (for example, a maximum of 5 minutes ago).

Also, in the case of a configuration in which one operation server 200A corresponds to a plurality of battery replacement devices 100A in the shared battery management system 10A, the manager of the shared battery management system 10A or the like can set a rule when a removable battery 510 with which rental (replacement) can be performed at the battery replacement device 100A and the order thereof are determined in the operation server 200A for each battery replacement device 100A. That is, in the shared battery management system 10A including the plurality of battery replacement devices 100A, the manager of the shared battery management system 10A or the like can set a rule for creating a rentable battery list B in the operation server 200A for each battery replacement device 100A. Thereby, in the shared battery management system 10A including the plurality of battery replacement devices 100A, the operation server 200A creates the rentable battery list B corresponding to each battery replacement device 100A and transmits the created rentable battery list B. In the shared battery management system 10A including the plurality of battery replacement devices 100A, each battery replacement device 100A previously acquires the corresponding rentable battery list B from the operation server 200A and performs a procedure for renting out a stored charged battery 510c (replacing the used battery 510u with the charged battery 510c) on the basis of the acquired rentable battery list B. Also, in the shared battery management system 10A including a plurality of battery replacement devices 100A, the rule when a removable battery 510 with which rental (replacement) can be performed at the battery replacement device 100A and the order thereof are determined set in the operation server 200A by the manager of the shared battery management system 10A or the like may be the same or different with respect to all battery replacement devices 100A. That is, in the shared battery management system 10A including a plurality of battery replacement devices 100A, the logic when the procedure for replacing the used battery 510u with the charged battery 510c can be made different for each battery replacement device 100A. For example, a certain battery replacement device 100A can perform rental (replacement) with only a charged battery 510c whose charging is completed at a charge rate of 100% and which is stored and another battery replacement device 100A can perform rental (replacement) with a charged battery 510c having a charge rate of 90% or more.

Also, as described above, the battery replacement device 100A acquires the rentable battery list B from the operation server 200A in advance at predetermined time intervals such as every 5 minutes and stores the acquired rentable battery list B. Thus, the battery replacement device 100A does not need to communicate with the operation server 200A via the network NW every time a procedure for replacing the used battery 510u with the charged battery 510c is performed. More specifically, the battery replacement device 100A does not acquire information indicating a charged battery 510c with which rental (replacement) is performed by performing communication with the operation server 200A via the network NW every time rental (replacement) is performed with the charged battery 510c to be used instead of the used battery 510u running out of power brought in by the user of the electric motorcycle 50. The battery replacement device 100A performs rental (replacement) with the charged batteries 510c in the order indicated in the rentable battery list B previously acquired from the operation server 200A. That is, the battery replacement device 100A independently performs the procedure for replacing the used battery 510u with the charged battery 510c on the basis of the rentable battery list B previously acquired from the operation server 200A. Therefore, in the battery replacement device 100A, for example, even if the communication with the operation server 200A via the network NW is interrupted or stable communication cannot be performed, it is possible to replace at least the used battery 510u brought in by the user of the electric motorcycle 50 with the charged battery 510c whose battery ID is included in the rentable battery list B. That is, even if the state of communication (an environment of communication) with the operation server 200A via the network NW deteriorates, the battery replacement device 100A can independently continue to perform a procedure for replacing the removable battery 510 without stopping or suspending the procedure for replacing the removable battery 510 due to the influence of the communication state (the communication environment) for a while. In other words, the battery replacement device 100A can continue to provide the battery sharing service to the user of the electric motorcycle 50 without being affected by short-time deterioration of the state of communication (the environment of communication) between the battery replacement device 100A and the operation server 200A.

According to the above-described configuration, in the shared battery management system 10A, rental (replacement) is performed with a charged battery 510c to be used instead of the used battery 510u running out of power brought in the battery replacement device 100A by the user of the electric motorcycle 50 in the order determined in the logic according to a predetermined rule.

Next, each component constituting the shared battery management system 10A of the second embodiment will be described in more detail.

(Configuration of Removable Battery 510)

Figure 10:
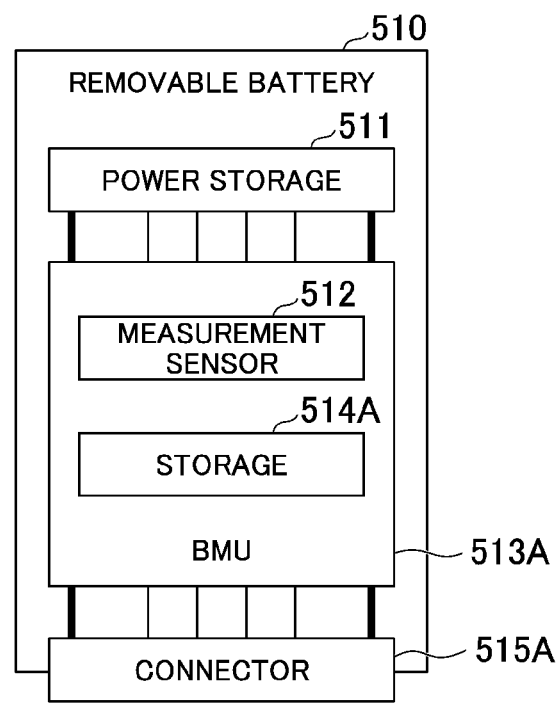
FIG. 10 is a block diagram showing an example of a configuration of a removable battery managed in the shared battery management system of the second embodiment.

First, an example of a configuration of the removable battery 510 will be described. FIG. 10 is a block diagram showing the example of the configuration of the removable battery 510 managed in the shared battery management system 10A of the second embodiment. As shown in FIG. 10, the removable battery 510 has a battery management unit (BMU) 513A instead of the BMU 513 in the removable battery 510 that is rented out (replaced) at the battery replacement device 100 in the shared battery management system 10 of the first embodiment, a connector 515A instead of the connector 515, and a storage 514A instead of the storage 514.

The measurement sensor 512 outputs a measured value indicating a measured state of the power storage 511 to the processor on the BMU 513A.

The BMU 513A is a battery management unit similar to the BMU 513 provided in the removable battery 510 in the shared battery management system 10 of the first embodiment and controls charging and discharging of the power storage 511. The BMU 513A is configured to include a processor such as, for example, a central processing unit (CPU), and a memory such as, for example, a read only memory (ROM) or a random access memory (RAM), as the storage 514A. In the BMU 513A, the CPU implements a control function of the power storage 511 by reading and executing a program stored in the storage 514A. The BMU 513A causes the storage 514A to store information such as content of the control performed on the power storage 511 on the basis of the measured value indicating the state of the power storage 511 output from the measurement sensor 512. Also, the BMU 513A may count a charging count of the power storage 511 and cause the storage 514A to store the counted charging count in addition to the function of the BMU 513 provided in the removable battery 510 in the shared battery management system 10 of the first embodiment. Further, the BMU 513A may calculate the charge rate of the power storage 511 on the basis of a measured value indicating the state of the power storage 511 output from the measurement sensor 512.

Like the storage 514 provided in the removable battery 510 in the shared battery management system 10 of the first embodiment, the storage 514A stores information of an abnormality or a failure detected by the BMU 513A itself, an abnormality or a failure of the power storage 511 ascertained using the measurement sensor 512, or the like. The storage 514A is configured to include, for example, a memory such as a ROM, a RAM, or a flash memory. Also, the storage 514A stores information of a battery ID exclusively assigned to the removable battery 510, a charging count of the power storage 511, and the like. Here, information of the charging count stored in the storage 514A is updated (i.e., incremented) when the BMU 513A adds "1" to the charging count when the charging of the power storage 511 is started or when the charging of the power storage 511 is completed. Also, the storage 514A may store identification information (for example, a "user ID") of the user of the electric motorcycle 50 currently using the removable battery 510.

Like the connector 515 provided in the removable battery 510 in the shared battery management system 10 of the first embodiment, the connector 515A is a connector that supplies the electric power stored in the power storage 511 to the electric motor that is the drive source of the electric motorcycle 50 when the removable battery 510 has been mounted on the electric motorcycle 50. Also, the connector 515A is connected to a structure that is connected to the removable battery 510 provided on the back side of the battery accommodator 120H when the removable battery 510 has been accommodated in the battery slot 120 provided in the battery replacement device 100A and is also a connector for performing the transmission of information such as a battery ID, a charging count, and a measured value indicating the state of the power storage 511 that are exchanged between the removable battery 510 and the battery replacement device 100A or the transmission of electric power.

(Configuration of Battery Replacement Device 100A)

Figure 11:
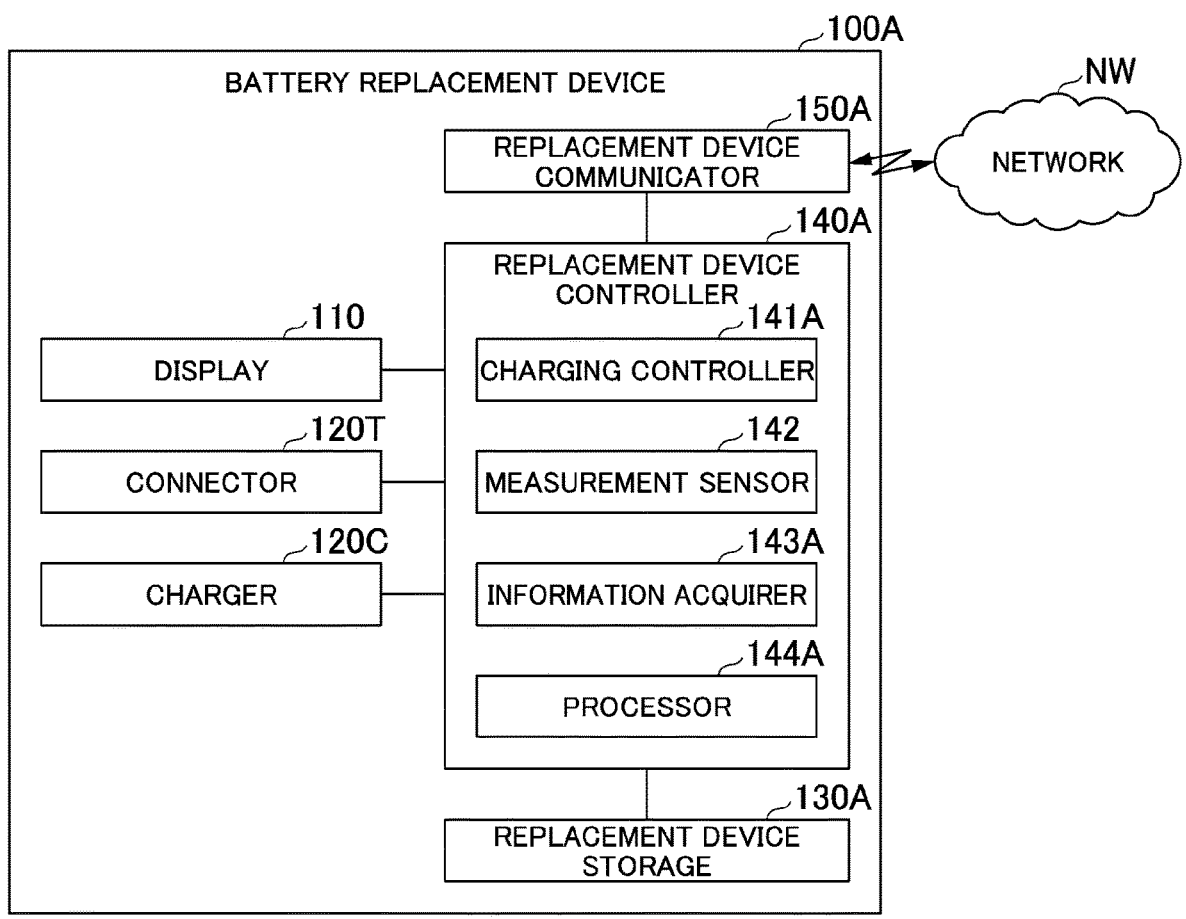
FIG. 11 is a block diagram showing a schematic configuration of a battery replacement device constituting the shared battery management system of the second embodiment.

Subsequently, an example of a configuration of the battery replacement device 100A will be described. FIG. 11 is a block diagram showing a schematic configuration of the battery replacement device 100A constituting the shared battery management system 10A of the second embodiment. As shown in FIG. 11, the battery replacement device 100A includes a display 110, a connector 120T, a charger 120C, a replacement device storage 130A, a replacement device controller 140A, and a replacement device communicator 150A. Also, the replacement device controller 140A includes a charging controller 141A, a measurement sensor 142, an information acquirer 143A, and a processor 144A.

The replacement device storage 130A stores various information in the battery replacement device 100A like the replacement device storage 130 provided in the battery replacement device 100A in the shared battery management system 10 of the first embodiment. The replacement device storage 130A stores at least the rentable battery list B previously acquired from the operation server 200A via the network NW. The replacement device storage 130A is configured to include, for example, a memory such as a ROM, a RAM, an electrically erasable programmable read only memory (EEPROM), a hard disk drive (HDD), or a flash memory. Also, the replacement device storage 130A stores a program for the replacement device controller 140A to execute the function of the battery replacement device 100A. Also, the replacement device storage 130A may store information of whether or not the removable battery 510 has been accommodated in each battery slot 120 provided in the battery replacement device 100A or information (hereinafter referred to as "battery state information") of a battery ID, a charging count, a deterioration state of the removable battery 510 accommodated in each battery slot 120, a measured value indicating the state of the power storage 511, and the like. Also, the replacement device storage 130A may also store information indicating the state of charge such as a charge rate of each removable battery 510 as the battery state information. Also, the replacement device storage 130A may store identification information (a battery replacement device ID) exclusively assigned to the battery replacement device 100A.

The replacement device controller 140A controls the entire battery replacement device 100A like the replacement device controller 140 provided in the battery replacement device 100A in the shared battery management system 10 of the first embodiment. The replacement device controller 140A is configured to include, for example, a processor such as a CPU. The replacement device controller 140A implements the function of the battery replacement device 100A by reading and executing the program stored in the replacement device storage 130A. More specifically, the replacement device controller 140A acquires information (battery state information) of a battery ID, a charging count, and a deterioration state of the removable battery 510 accommodated in each battery slot 120, a measured value indicating the state of the power storage 511, and the like periodically at predetermined time intervals (for example, every 5 minutes). The replacement device controller 140A calculates the charge rate of the power storage 511, i.e., the charge rate of the removable battery 510, on the basis of the acquired measured value representing the state of the power storage 511. When the removable battery 510 itself calculates the charge rate, the replacement device controller 140A may acquire information indicating the state of charge such as a charge rate of the removable battery 510 accommodated in each battery slot 120 as the battery state information periodically at predetermined time intervals (for example, every 5 minutes). The replacement device controller 140A outputs the acquired battery state information of each removable battery 510 and the calculated (or acquired) information of the charge rate to the replacement device communicator 150A and outputs an instruction for transmitting the output information as the battery state list S to the replacement device communicator 150A. Thereby, the replacement device communicator 150A communicates with the operation server 200A via the network NW and transmits the battery state list S including the battery state information output by the replacement device controller 140A to the operation server 200A.

Also, when the rentable battery list B transmitted from the operation server 200A is output from the replacement device communicator 150A, the replacement device controller 140A causes the replacement device storage 130A to store the rentable battery list B acquired from the operation server 200A. Subsequently, the replacement device controller 140A performs a procedure for replacing the used battery 510u brought in by the user of the electric motorcycle 50 with the charged battery 510c on the basis of the order of the battery IDs included in the rentable battery list B stored in the replacement device storage 130A. At this time, the replacement device controller 140A notifies the user of the electric motorcycle 50 of the battery slot 120 (for example, a battery slot 120-1) in which the used battery 510u will be accommodated through the display 110. Thereby, the user of the electric motorcycle 50 accommodates the used battery 510u that has been brought in by the user of the electric motorcycle 50 in the battery accommodator 120-1H of the battery slot 120-1 in a state in which the removable battery 510 is not accommodated. Subsequently, the replacement device controller 140A determines whether or not the used battery 510u accommodated in the battery accommodator 120-1H is a removable battery 510 capable of being replaced on the basis of the information of the battery IDs of the removable batteries 510 included in the rentable battery list B. When it is determined that the used battery 510u accommodated in the battery accommodator 120-1H is a removable battery 510 capable of being replaced, the replacement device controller 140A selects a charged battery 510c on the basis of the order of the battery IDs of the removable batteries 510 included in the rentable battery list B and notifies the user of the electric motorcycle 50 of the battery slot 120 (for example, a battery slot 120-2) in which the selected charged battery 510c is accommodated through the display 110. Thereby, the user of the electric motorcycle 50 extracts the charged battery 510c from the battery accommodator 120-2H of the battery slot 120-2 and replaces the removable battery 510. Subsequently, the replacement device controller 140A charges the used battery 510u accommodated in the battery accommodator 120-1H. On the other hand, when it is determined that the used battery 510u accommodated in the battery accommodator 120-1H is a removable battery 510 that cannot be replaced, the replacement device controller 140A prohibits replacement from being performed with the charged battery 510c accommodated in the battery slot 120 (for example, the battery slot 120-2). The replacement device controller 140A notifies the user of the electric motorcycle 50 that the used battery 510u accommodated in the battery accommodator 120-1H is a removable battery 510 that cannot be replaced through the display 110.

Like the information acquirer 143 provided in the battery replacement device 100A in the shared battery management system 10 of the first embodiment, the information acquirer 143A acquires information of the removable battery 510 accommodated in the battery slot 120, i.e., the removable battery 510 stored in the battery replacement device 100A. More specifically, the information acquirer 143A acquires battery state information (information of a battery ID, a charging count, a measured value indicating the state of the power storage 511, and the like) of the removable battery 510 which is accommodated in the battery accommodator 120H of the battery slot 120 and in which the connector 515A and the connector 120T are connected via the connector 120T periodically at predetermined time intervals (for example, every 5 minutes). The information acquirer 143A outputs the acquired battery state information to the processor 144A. Also, the information acquirer 143A may cause the replacement device storage 130A to store the acquired battery state information.

The measurement sensor 142 outputs the measured value indicating the measured state of the removable battery 510 to the charging controller 141A.

Also, in the replacement device controller 140A, the information acquirer 143A acquires the measured value indicating the state of the power storage 511 measured by the measurement sensor 512 provided in the removable battery 510 as the battery state information via the connector 120T. Thus, the measurement sensor 142 may be configured to output the measured value indicating the state of the power storage 511 acquired by the information acquirer 143A to the charging controller 141A.

Like the charging controller 141 provided in the battery replacement device 100A in the shared battery management system 10 of the first embodiment, the charging controller 141A controls the charging of the removable battery 510 by controlling the charger 120C in consideration of the measured value of the removable battery 510 output from the measurement sensor 142. Also, the charging controller 141A calculates a current charge rate of the removable battery 510 that is charged, i.e., a current charge rate of the power storage 511 provided in the removable battery 510, on the basis of the measured value of the removable battery 510 output from the measurement sensor 142. The charging controller 141A outputs the calculated charge rate of the removable battery 510 to the processor 144A. Also, like the charging controller 141 provided in the battery replacement device 100A in the shared battery management system 10 of the first embodiment, the charging controller 141A outputs information indicating that the charging has been completed to the processor 144A when the charging of the removable battery 510 has been completed. When information of the charge rate of each removable battery 510 is stored as the battery state information in the replacement device storage 130A, the charging controller 141A may be configured to output information of the calculated current charge rate of the removable battery 510 (including the completion of charging) to the replacement device storage 130A and update the battery state information stored in the replacement device storage 130A.

Also, in the battery replacement device 100A, the removable battery 510 may be configured to be temporarily discharged with the remaining electric power before the removable battery 510 is charged. In this case, the charging controller 141A also controls the discharging of the removable battery 510.

Like the processor 144 provided in the battery replacement device 100A in the shared battery management system 10 of the first embodiment, the processor 144A performs a procedure for replacing the removable battery 510 in the battery replacement device 100A. More specifically, the processor 144A selects a charged battery 510c to be used instead of the used battery 510u brought in by the user of the electric motorcycle 50 and accommodated in the battery slot 120 from among charged batteries 510c with which rental (replacement) can be performed included in the rentable battery list B stored in the replacement device storage 130A. At this time, the processor 144A selects the charged battery 510c with which replacement is performed in the order of the battery IDs included in the rentable battery list B. The processor 144A performs a process of replacing the used battery 510u with the selected charged battery 510c and a process of charging the used battery 510u. In the process of replacing the used battery 510u with the charged battery 510c in the processor 144A, the user of the electric motorcycle 50 is notified of a battery slot 120 in which the selected charged battery 510c is accommodated. The processor 144A extracts the charged battery 510c accommodated in the battery slot 120 of which the user of the electric motorcycle 50 is notified, performs the replacement of the removable battery 510, and then updates the rentable battery list B. That is, the processor 144A deletes the battery state information about the selected charged battery 510c included in the rentable battery list B stored in the replacement device storage 130A. Also, in the process of charging the used battery 510u in the processor 144A, an instruction indicating that the used battery 510u is to be charged is output to the charging controller 141A. Thereby, the charging controller 141A controls the charger 120C in consideration of the measured value of the removable battery 510 output from the measurement sensor 142, so that the charger 120C charges the used battery 510u.

The replacement device communicator 150A performs wireless communication with the operation server 200A via the network NW in response to an instruction from the replacement device controller 140A and transmits the battery state list S to the operation server 200A. Also, the replacement device communicator 150A acquires the rentable battery list B from the operation server 200A. The replacement device communicator 150A outputs the rentable battery list B acquired from the operation server 200A to the replacement device storage 130A and causes the replacement device storage 130A to store the rentable battery list B.

Also, the rentable battery list B cannot always be acquired from the operation server 200A immediately after the replacement device communicator 150A transmits the battery state list S to the operation server 200A. This is because the operation server 200A determines a removable battery 510 with which rental (replacement) can be performed at the battery replacement device 100A and the order thereof on the basis of the battery state list S transmitted from the battery replacement device 100A and then creates the rentable battery list B. Thus, when the rentable battery list B is transmitted from the operation server 200A, the replacement device communicator 150A receives the transmitted rentable battery list B, outputs the rentable battery list B to the replacement device storage 130A, and causes the replacement device storage 130A to store the rentable battery list B. That is, the rentable battery list B stored in the replacement device storage 130A may be updated. Also, after the battery state list S is transmitted to the operation server 200A, the replacement device communicator 150A may be configured to ask the operation server 200A about whether or not the rentable battery list B has been updated, acquire the updated rentable battery list B when the rentable battery list B has been updated in the operation server 200A, and cause the replacement device storage 130A to store (update) the rentable battery list B.

Also, the replacement device communicator 150A may notify the replacement device controller 140A (more specifically, the processor 144A) of information indicating that the rentable battery list B stored in the replacement device storage 130A has been updated. However, the processor 144A selects the charged battery 510c with which replacement is performed in the order of the battery IDs included in the rentable battery list B previously stored in the replacement device storage 130A and updates the rentable battery list B by deleting the battery state information about the selected charged battery 510c included in the rentable battery list B after the removable battery 510 is replaced. That is, the rentable battery list B stored in the replacement device storage 130A is in a state in which only the battery state information about charged batteries 510c with which replacement can be performed at the battery replacement device 100A is included. Therefore, whether or not the rentable battery list B stored in the replacement device storage 130A has been updated does not affect the selection of the charged battery 510c with which rental (replacement) is performed in the processor 144A. Accordingly, the replacement device communicator 150A does not need to output the information indicating that the rentable battery list B has been updated to the processor 144A.

(Configuration of Operation Server 200A)

Figure 12:
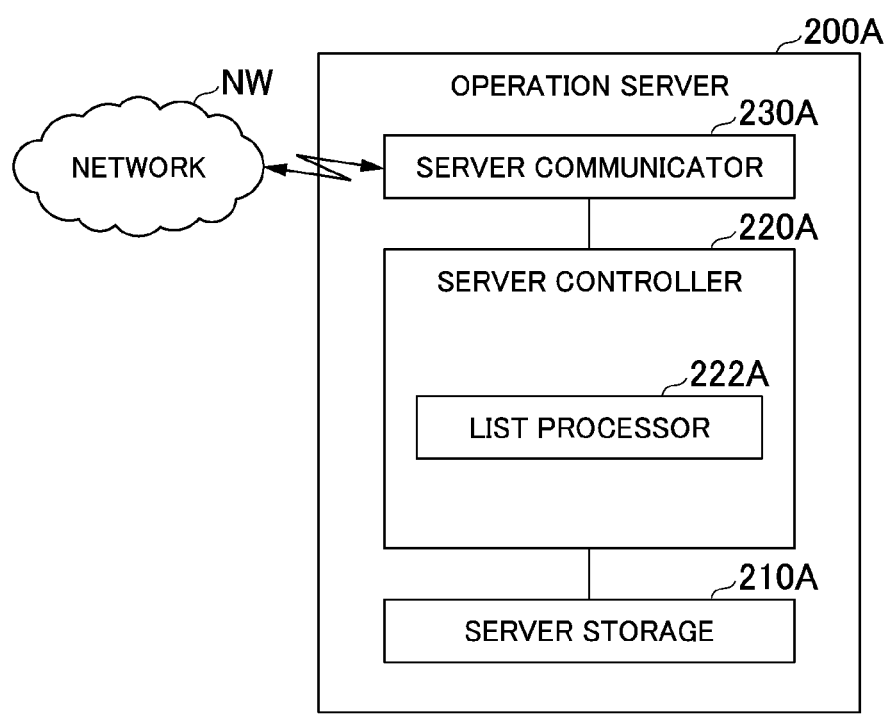
FIG. 12 is a block diagram showing a schematic configuration of an operation server constituting the shared battery management system of the second embodiment.

Next, an example of a configuration of the operation server 200A will be described. FIG. 12 is a block diagram showing a schematic configuration of the operation server 200A constituting the shared battery management system 10A of the second embodiment. As shown in FIG. 12, the operation server 200A includes a server storage 210A, a server controller 220A, and a server communicator 230A. Also, the server controller 220A includes a list processor 222A.

The server storage 210A stores various information in the operation server 200A. The server storage 210A stores at least the battery state list S transmitted from the battery replacement device 100A via the network NW and the rentable battery list B transmitted to the battery replacement device 100A via the network NW. For example, the server storage 210A is configured to include a memory such as a ROM, a RAM, an EEPROM, an HDD, or a flash memory. Also, the server storage 210A stores a program for the server controller 220A to execute the function of the operation server 200A. Also, the server storage 210A may store the information of a battery replacement device ID exclusively assigned to the battery replacement device 100A.

The server controller 220A controls the entire operation server 200A. For example, the server controller 220A is configured to include a processor such as a CPU. The server controller 220A implements the function of the operation server 200A by reading and executing the program stored in the server storage 210A. More specifically, the server controller 220A determines a removable battery 510 with which rental (replacement) can be performed at the battery replacement device 100A and the order thereof on the basis of the battery state list S transmitted from the battery replacement device 100A. Also, in the operation server 200A, for example, the manager of the shared battery management system 10A, the operator of the shared battery use service, or the like may sequentially change logics when the battery replacement device 100A performs a procedure for replacing the removable battery 510 on the basis of thinking, an intention, or the like of the management and operation for the removable battery 510 in the shared battery management system 10A. At this time, the manager of the shared battery management system 10A or the like may sequentially change settings of rules for determining a removable battery 510 with which rental (replacement) can be performed at the battery replacement device 100A and the order thereof by operating an input device (for example, a keyboard or a mouse) (not shown) on the basis of information displayed on a display device (for example, a liquid crystal display) (not shown) of a terminal (not shown) connected to the operation server 200A.

The server controller 220A creates the rentable battery list B including information of the determined removable battery 510 with which rental (replacement) can be performed at the battery replacement device 100A, the determined order in which rental (replacement) is performed with the removable battery 510, and the like, outputs the created rentable battery list B to the server storage 210A, and causes the server storage 210A to store the created rentable battery list B. Also, the server controller 220A outputs the created rentable battery list B to the server communicator 230A, so that the rentable battery list B is transmitted to the battery replacement device 100A that has transmitted the battery state list S via the network NW.

The list processor 222A performs a process of creating the rentable battery list B based on the battery state list S. More specifically, the list processor 222A determines a removable battery 510 with which rental (replacement) can be performed at the battery replacement device 100A and the order thereof on the basis of information of a battery ID and a charging count of the removable battery 510 that is stored in the battery replacement device 100A and a battery ID, a charging count, and a charge rate of a charged removable battery 510 included in the battery state list S transmitted from the battery replacement device 100A. Further, the list processor 222A creates the rentable battery list B including information of the determined removable battery 510 with which rental (replacement) can be performed at the battery replacement device 100A, the determined order in which rental (replacement) can be performed with the removable battery 510, and the like. The list processor 222A associates the created rentable battery list B with the information of the battery replacement device ID of the battery replacement device 100A, outputs an association result to the server storage 210A, and causes the server storage 210A to store association result. Also, the list processor 222A outputs the created rentable battery list B to the server communicator 230A and outputs an instruction for transmitting the output rentable battery list B to the battery replacement device 100A that has transmitted the battery state list S to the server communicator 230A. Thereby, the server communicator 230A communicates with the battery replacement device 100A via the network NW and transmits the rentable battery list B output by the server controller 220A to the battery replacement device 100A.

The server communicator 230A performs wireless communication with the replacement device communicator 150A provided in the battery replacement device 100A via the network NW. The server communicator 230A receives the battery state list S transmitted from the battery replacement device 100A via the network NW, and causes the server storage 210A to store the received battery state list S. Also, the server communicator 230A transmits the rentable battery list B to the battery replacement device 100A via the network NW in response to the instruction from the list processor 222A.

Also, as described above, the rentable battery list B cannot be always transmitted to the battery replacement device 100A immediately after the battery state list S transmitted from the battery replacement device 100A is received. In this case, an inquiry about whether or not the rentable battery list B has been updated is transmitted from the battery replacement device 100A. When an inquiry about whether or not the rentable battery list B has been updated has been transmitted from the battery replacement device 100A, the server communicator 230A transmits the rentable battery list B created by the list processor 222A and stored in the server storage 210A to the battery replacement device 100A. At this time, the server communicator 230A reads a rentable battery list B corresponding to the battery replacement device 100A that has transmitted the inquiry, i.e., a rentable battery list B associated with the battery replacement device ID of the battery replacement device 100A that has transmitted the inquiry from the server storage 210A and transmits the read rentable battery list B to the battery replacement device 100A via the network NW. Thereby, the battery replacement device 100A can acquire the rentable battery list B via the network NW and independently perform a procedure for performing rental (replacement) with the charged battery 510c to be used instead of the used battery 510u running out of power brought in by the user of the electric motorcycle 50 on the basis of the acquired rentable battery list B.

Figure 13:
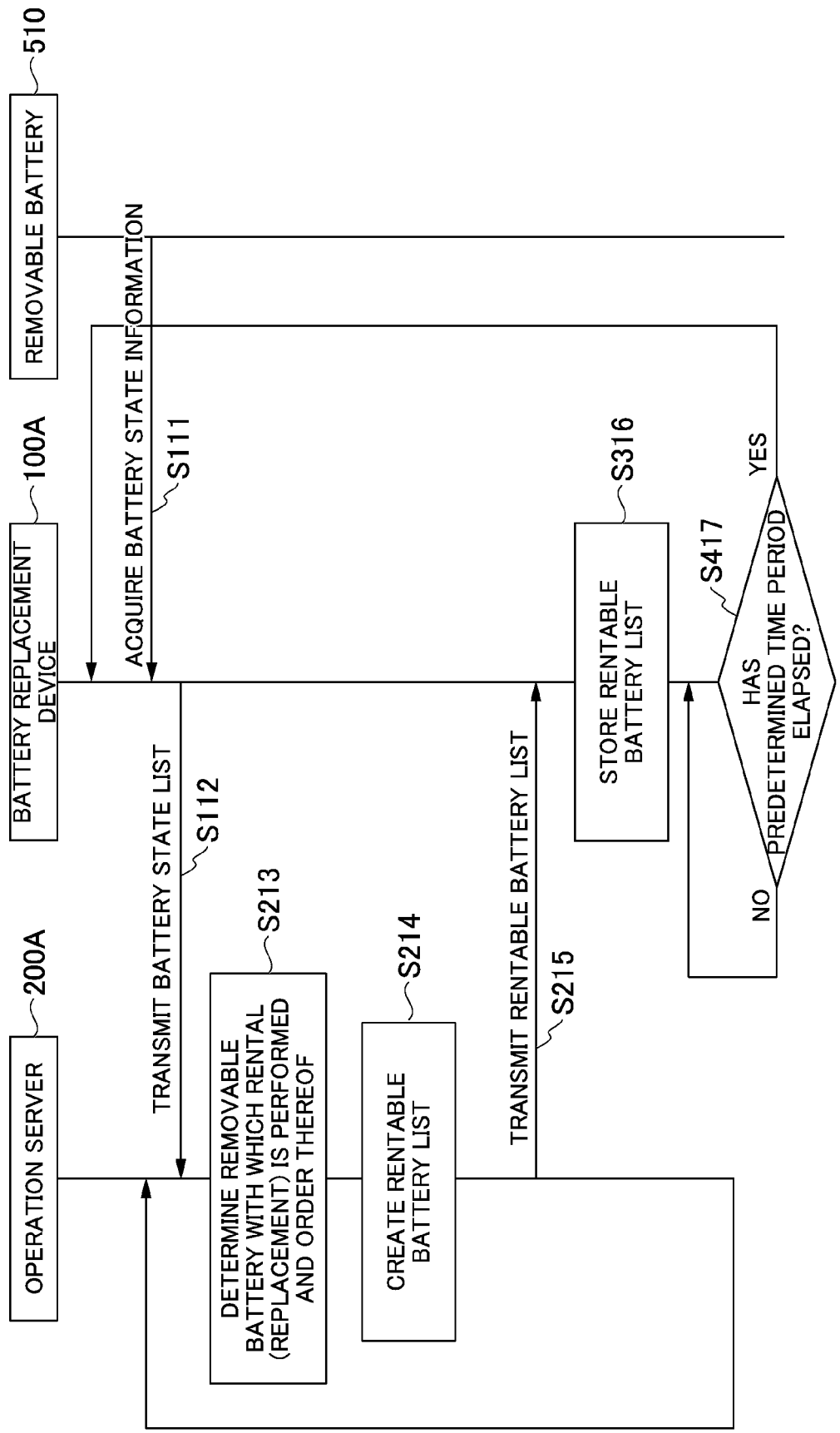
FIG. 13 is a sequence diagram showing a flow of a process of acquiring information of a removable battery capable of being rented out in a battery sharing service adopting the shared battery management system of the second embodiment
Figure 14:
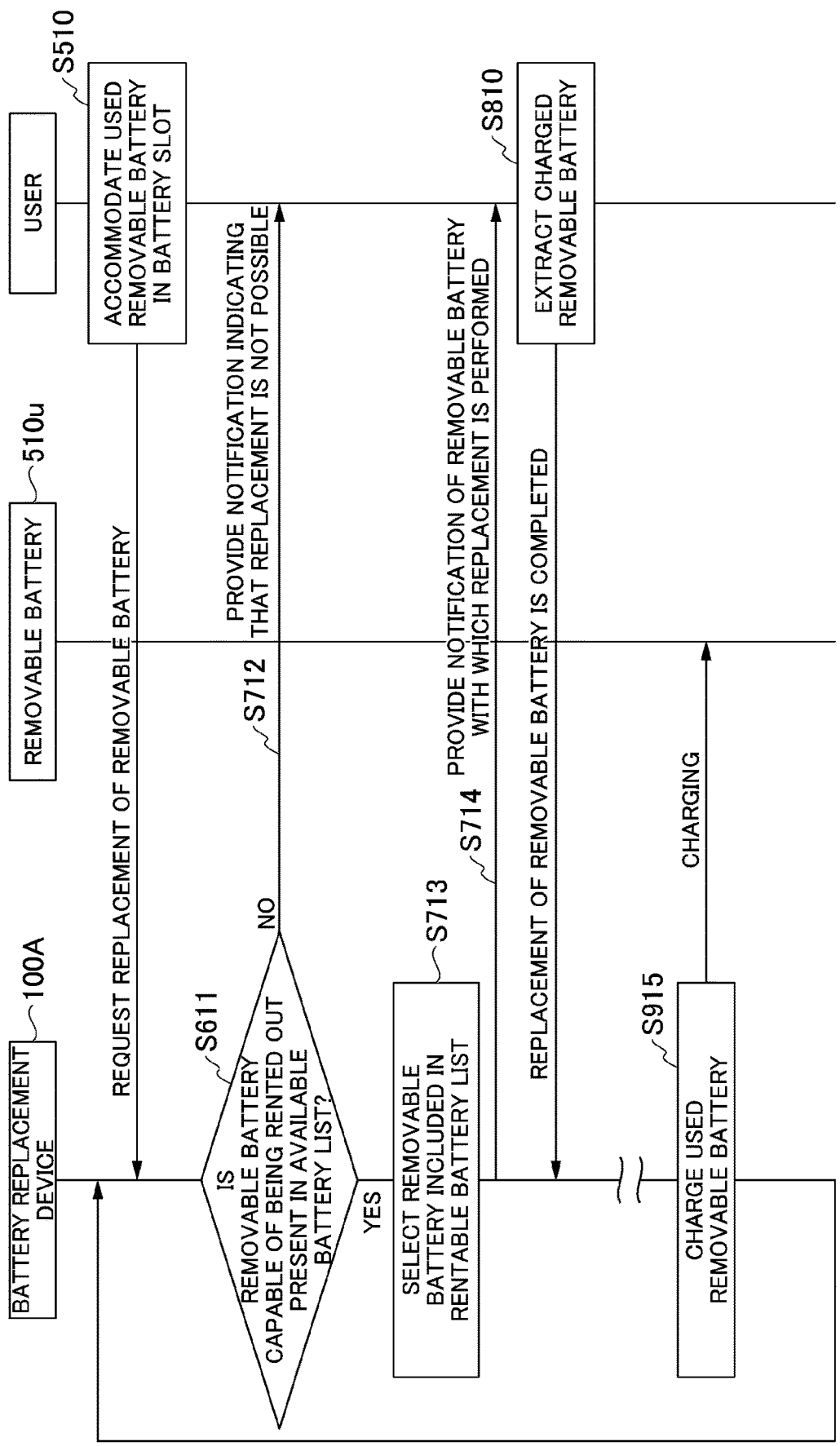
FIG. 14 is a sequence diagram showing a flow of a process of renting out a removable battery in the battery sharing service adopting the shared battery management system of the second embodiment.

Next, an example of a flow of a process in the shared battery management system 10A of the second embodiment will be described. FIG. 13 is a sequence diagram showing a flow of a process of acquiring information (a rentable battery list B) of removable batteries 510 with which rental (replacement) can be performed in the battery sharing service adopting the shared battery management system 10A of the second embodiment. In FIG. 13, an example of a process of the battery replacement device 100A and the operation server 200A constituting the shared battery management system 10A that provides the battery sharing service is shown in association with the removable battery 510 stored in the battery replacement device 100A. Also, FIG. 14 is a sequence diagram showing a flow of a process of renting out (replacing) the removable battery 510 in the battery sharing service adopting the shared battery management system 10A of the second embodiment. In FIG. 14, an example of a process of the battery replacement device 100A constituting the shared battery management system 10A, which provides the battery sharing service, is shown in association with the removable battery 510 (the used battery 510u), which is a replacement target, and the user of the electric motorcycle 50.

First, a process in which the battery replacement device 100A transmits the battery state list S to the operation server 200A and the operation server 200A creates a rentable battery list B on the basis of the battery state list S and transmits the created rentable battery list B to the battery replacement device 100A (the battery replacement device 100A acquires the rentable battery list B) will be described with reference to FIG. 13. Also, in the following description, it is assumed that the logic when the battery replacement device 100A performs a procedure for replacing the removable battery 510, i.e., the rule for the operation server 200A to determine a removable battery 510 with which rental (replacement) can be performed at the battery replacement device 100A and the order thereof, has already been set in the operation server 200A by, for example, the manager of the shared battery management system 10A or the like. Also, although, for example, the manager of the shared battery management system 10A or the like, may create a rentable battery list B by operating the operation server 200A in the shared battery management system 10A, a case in which the operation of the manager or the like is omitted and the operation server 200A creates the rentable battery list B will be described for ease of description in the following description.

In the shared battery management system 10A, the battery replacement device 100A first acquires battery state information from each removable battery 510, which is stored and charged, periodically at predetermined time intervals (for example, every 5 minutes) (step S111). At this time, in the battery replacement device 100A, the information acquirer 143A provided in the replacement device controller 140A acquires information from components provided in the removable battery 510 via the connector 120T of each battery accommodator 120H and the connector 515A. More specifically, the information acquirer 143A acquires information of a battery ID, a charging count, and a deteriorated state from the storage 514A provided in the removable battery 510. Also, the information acquirer 143A acquires information of a measured value indicating the state of the power storage 511 from the measurement sensor 512 or the BMU 513A provided in the removable battery 510. Also, the information acquirer 143A may acquire information of a charge rate from the BMU 513A provided in the removable battery 510.

Subsequently, the battery replacement device 100A transmits the battery state list S recording the battery state information acquired from each removable battery 510, which is stored and charged, to the operation server 200A (step S112). At this time, in the battery replacement device 100A, the processor 144A provided in the replacement device controller 140A outputs an instruction for transmitting the battery state information as the battery state list S to the replacement device communicator 150A. Thereby, in the battery replacement device 100A, the replacement device communicator 150A transmits the battery state list S including the battery state information to the operation server 200A via the network NW. Also, when the information acquirer 143A has acquired information of a charge rate from the removable battery 510, the battery replacement device 100A transmits the battery state list S having the acquired information of the charge rate as charge rate information in the battery state information to the operation server 200A.

When the battery state list S is transmitted from the battery replacement device 100A, the operation server 200A determines a removable battery 510 with which rental (replacement) can be performed at the battery replacement device 100A and the order thereof on the basis of the transmitted battery state list S (step S213). At this time, in the operation server 200A, the list processor 222A provided in the server controller 220A determines a removable battery 510 with which rental (replacement) can be performed at the battery replacement device 100A and the order thereof on the basis of information of a battery ID, a charging count, and a deterioration state of each removable battery 510 that is stored in the battery replacement device 100A and a battery ID, a charging count, a deterioration state, and a charge rate of each removable battery 510 that is charged in the battery replacement device 100A included in the battery state list S.

Subsequently, the operation server 200A creates a rentable battery list B (step S214). At this time, in the operation server 200A, the list processor 222A creates the rentable battery list B including information of a removable battery 510 with which rental (replacement) can be performed at the battery replacement device 100A, the order in which rental (replacement) can be performed with the removable battery 510, and the like.

The operation server 200A transmits the created rentable battery list B to the battery replacement device 100A (step S215). At this time, in the operation server 200A, the list processor 222A outputs an instruction for transmitting the rentable battery list B created for the battery replacement device 100A that has transmitted the battery state list S to the server communicator 230A. Thereby, in the operation server 200A, the server communicator 230A transmits the rentable battery list B created by the list processor 222A to the battery replacement device 100A via the network NW. Also, when an inquiry about whether or not the rentable battery list B has been updated has been transmitted from the battery replacement device 100A, the operation server 200A transmits a corresponding rentable battery list B to the battery replacement device 100A that has transmitted the inquiry.

Subsequently, the operation server 200A causes the process to return to step S213. That is, the operation server 200A waits for a process of creating the rentable battery list B in the operation server 200A to be performed until the next battery state list S is transmitted from the battery replacement device 100A. When the next battery state list S is transmitted from the battery replacement device 100A, the operation server 200A iterates a process of creating a rentable battery list B, i.e., a process (steps S213 to S215) of determining a removable battery 510 with which rental (replacement) can be performed at the battery replacement device 100A and the order thereof, creating a rentable battery list B, and transmitting the rentable battery list B to the battery replacement device 100A.

On the other hand, the battery replacement device 100A stores the rentable battery list B transmitted from the operation server 200A in the replacement device storage 130A (step S316). At this time, in the battery replacement device 100A, the replacement device communicator 150A outputs the rentable battery list B transmitted from the operation server 200A to the replacement device storage 130A and causes the replacement device storage 130A to store the rentable battery list B. Thereby, the battery replacement device 100A can independently perform a procedure for replacing the used battery 510$u$ with the charged battery 510$c$ on the basis of the rentable battery list B transmitted from the operation server 200A.

Subsequently, the battery replacement device 100A determines whether or not a predetermined time period (for example, 5 minutes) has elapsed (step S417). When a result of the determination of step S417 indicates that the predetermined time period has not elapsed ("NO" in step S417), the battery replacement device 100A iterates the determination of step S417 in the process. That is, the battery replacement device 100A waits for the acquisition of battery state information from each removable battery 510 and the transmission of the battery state list S to the operation server 200A before the predetermined time period elapses. On the other hand, when a result of the determination of step S417 indicates that the predetermined time period has elapsed ("YES" in step S417), the battery replacement device 100A returns to step S111 and acquires the battery state information from each removable battery 510 again. That is, the battery replacement device 100A iterates a process (steps S111 to S316) of acquiring the battery state information from each removable battery 510 that is stored and charged, transmitting the battery state information as the battery state list S to the operation server 200A, and acquiring the rentable battery list B from the operation server 200A. Thereby, in the battery replacement device 100A, the rentable battery list B stored in the replacement device storage 130A is updated to the latest state periodically at predetermined time intervals (for example, every 5 minutes).

In this manner, in the shared battery management system 10A, the battery replacement device 100A and the operation server 200A communicate with each other via the network NW periodically at predetermined time intervals (for example, every 5 minutes) to update the rentable battery list B including information of a removable battery 510 with which rental (replacement) can be performed at the battery replacement device 100A and the order in which rental (replacement) is performed with the removable battery 510. Thereby, in the shared battery management system 10A, the battery replacement device 100A can independently perform a procedure for replacing a used battery 510u running out of power brought in by the user of the electric motorcycle 50 with the stored charged battery 510c on the basis of the latest rentable battery list B reflecting a current power storage state in the power storage 511 provided in the removable battery 510.

Subsequently, a process in which the battery replacement device 100A rents out (replaces) the removable battery 510 will be described with reference to FIG. 14. Also, in the following description, it is assumed that a used battery 510u brought in by the user of the electric motorcycle 50 is replaced with a charged battery 510c. Also, in the following description, it is assumed that the rentable battery list B previously acquired from the operation server 200A in the flow of the process shown in FIG. 13 is stored in the replacement device storage 130A provided in the battery replacement device 100A. Also, although a case in which the user of the electric motorcycle 50 starts a procedure for replacing the removable battery 510 by, for example, operating an input means (not shown) provided in the battery replacement device 100A, is conceivable in the shared battery management system 10A, a detailed description of the operation of the battery replacement device 100A by the user of the electric motorcycle 50 will be omitted for ease of description in the following description.

The user of the electric motorcycle 50 brings the used battery 510u running out of power and accommodates the used battery 510u in the battery accommodator 120H of the battery slot 120 (step S510). Thereby, the connector 120T within the battery accommodator 120H of any battery slot 120 provided in the battery replacement device 100A is electrically connected to the connector 515A of the used battery 510u accommodated by the user of the electric motorcycle 50. At this time, in the battery replacement device 100A, the replacement device controller 140A starts a process of replacing the used battery 510u with the charged battery 510c under an assumption that the user of the electric motorcycle 50 has requested the replacement of the used battery 510u accommodated in the battery accommodator 120H.

When the process of replacing the used battery 510u with the charged battery 510c is started in the battery replacement device 100A, it is first determined whether or not information of a removable battery 510 with which rental (replacement) can be performed has been recorded in the rentable battery list B (step S611). That is, the battery replacement device 100A determines whether or not the charged battery 510c with which rental (replacement) can be performed has been stored in any battery slot 120. At this time, in the battery replacement device 100A, the processor 144A provided in the replacement device controller 140A confirms whether or not information about any removable battery 510 has been included in the rentable battery list B stored in the replacement device storage 130A.

When the information of the removable battery 510 has not been recorded in the rentable battery list B, the processor 144A determines that rental (replacement) cannot be performed with a charged battery 510c to be used instead of the used battery 510u accommodated in the battery accommodator 120H in step S611 ("NO" in step S611). In this case, the processor 144A notifies the user of the electric motorcycle 50 that the used battery 510u cannot be replaced (step S712). Also, although a method of displaying a message indicating that the used battery 510u cannot be replaced on the display 110 is conceivable as a method of notifying the user of the electric motorcycle 50 that the used battery 510u cannot be replaced, various methods are conceivable as a method of providing a notification to the user of the electric motorcycle 50 in the present invention.

On the other hand, when the information of the removable battery 510 has been recorded in the rentable battery list B, the processor 144A determines that rental (replacement) can be performed with the charged battery 510c to be used instead of the used battery 510u accommodated in the battery accommodator 120H in step S611 ("YES" in step S611). In this case, the processor 144A selects the charged battery 510c with which rental (replacement) is performed from the charged batteries 510c stored in the rentable battery list B (step S713). Also, when information of a plurality of charged batteries 510c has been recorded within the rentable battery list B, a charged battery 510c having the earliest turn in order is selected as a charged battery 510c with which rental (replacement) is performed in a process of selecting the charged batteries 510c in the processor 144A.

The processor 144A notifies the user of the electric motorcycle 50 of information of the selected charged battery 510c, i.e., the battery slot 120 in which the charged battery 510c with which rental (replacement) is performed is accommodated (step S714). At this time, the processor 144A provides a notification of information of the battery slot 120 in which the charged battery 510c with which rental (replacement) is performed is accommodated on the basis of information of the selected charged battery 510c stored in the rentable battery list B. Thereby, the user of the electric motorcycle 50 extracts the charged battery 510c accommodated in the battery accommodator 120H of the battery slot 120 indicated in the notification (step S810). That is, the user of the electric motorcycle 50 completes the replacement of the removable battery 510. Thereby, the user of the electric motorcycle 50 can mount the charged battery 510c on the electric motorcycle 50 and continue traveling.

At this time, an electrical connection between the connector 120T within the battery accommodator 120H of the battery slot 120 that is selected and indicated in the notification and the connector 515A of the charged battery 510c that is accommodated is disconnected. Thereby, in the battery replacement device 100A, the replacement device controller 140A updates the rentable battery list B under an assumption that the replacement of the used battery 510u with the charged battery 510c by the user of the electric motorcycle 50 has been completed. More specifically, the processor 144A deletes the battery state information about the selected charged battery 510c from the rentable battery list B.

Subsequently, in the battery replacement device 100A, a process of charging the used battery 510u accommodated in the battery slot 120 by the user of the electric motorcycle 50 is started (step S915). At this time, in the battery replacement device 100A, the processor 144A outputs an instruction indicating that the used battery 510u is to be charged to the information acquirer 143A provided in the replacement device controller 140A. Thereby, the charging controller 141A controls the charger 120C on the basis of a measured value of the removable battery 510 output from the measurement sensor 142, so that the charger 120C charges the used battery 510u.

Also, in the present invention, various timings are conceivable as the timing for starting charging of the used battery 510u in the battery replacement device 100A. For example, when a plurality of charged batteries 510c are accommodated, the processor 144A may output an instruction to the charging controller 141A so that charging is started immediately after the replacement of the used battery 510u is completed or may output an instruction to the charging controller 141A so that charging is started when the number of charged batteries 510c becomes less than or equal to a predetermined number.

Also, in the present invention, various methods are conceivable as a method of controlling the charger 120C when the used battery 510u is charged.

Subsequently, the battery replacement device 100A is on standby in a state in which a request for replacement of the used battery 510u from the user of the electric motorcycle 50 can be accepted. The battery replacement device 100A iterates a process of replacing the used battery 510u with the charged battery 510c and a process of charging the used battery 510u (steps S611 to S915) every time the user of the electric motorcycle 50 brings the used battery 510u running out of power and the replacement of the used battery 510u is requested.

Also, the battery replacement device 100A can perform a process of replacing the used battery 510u with the charged battery 510c as much as information of removable batteries 510 with which rental (replacement) can be performed at the battery replacement device 100A is recorded in the rentable battery list B. However, in the shared battery management system 10A, if the communication between the battery replacement device 100A and the operation server 200A via the network NW is not interrupted, a new rentable battery list B is created, for example, at predetermined time intervals such as every 5 minutes, and the rentable battery list stored in the replacement device storage 130A is updated as described above. Accordingly, when the used battery 510u brought in by the user of the electric motorcycle 50 is charged and serves as a charged battery 510c, the battery replacement device 100A can perform rental (replacement) with this charged battery 510c serving as a charged battery 510c to be used instead of another used battery 510u. That is, the shared battery management system 10A can continue to perform a procedure for replacing the removable battery 510 while the communication between the battery replacement device 100A and the operation server 200A is normally performed via the network NW.

Further, in the shared battery management system 10A, the rentable battery list B is stored in the battery replacement device 100A, so that the battery replacement device 100A can independently perform a procedure for replacing the used battery 510u with the charged battery 510c on the basis of the rentable battery list B. Thus, in the shared battery management system 10A, for example, even if the communication between the battery replacement device 100A and the operation server 200A via the network NW is interrupted or stable communication cannot be performed, it is possible to perform a process of replacing the used battery 510u with the charged battery 510c as much as information of removable batteries 510 with which rental (replacement) can be performed is recorded in the rentable battery list B. That is, in the shared battery management system 10A, it is possible to avoid the stop or suspension of replacement of the removable battery 510 due to the deterioration of the state of communication (the environment of communication) between the shared battery management system 10A and the operation server 200A and continue to provide the battery sharing service to the users of the electric motorcycles 50 until the replacement of removable batteries 510, which are as many as the number of removable batteries 510 recorded in the current rentable battery list B, is completed. The shared battery management system 10A is considered to be significantly effective as compared with the conventional shared battery management system in which rental (replacement) is performed with a charged battery 510c using communication performed between the operation server and the battery replacement device via the network NW every time the user of the electric motorcycle 50 brings a used battery 510u running out of power.

(Comparison of Operation Between Shared Battery Management System 10A and Conventional Shared Battery Management System)

Figure 15:
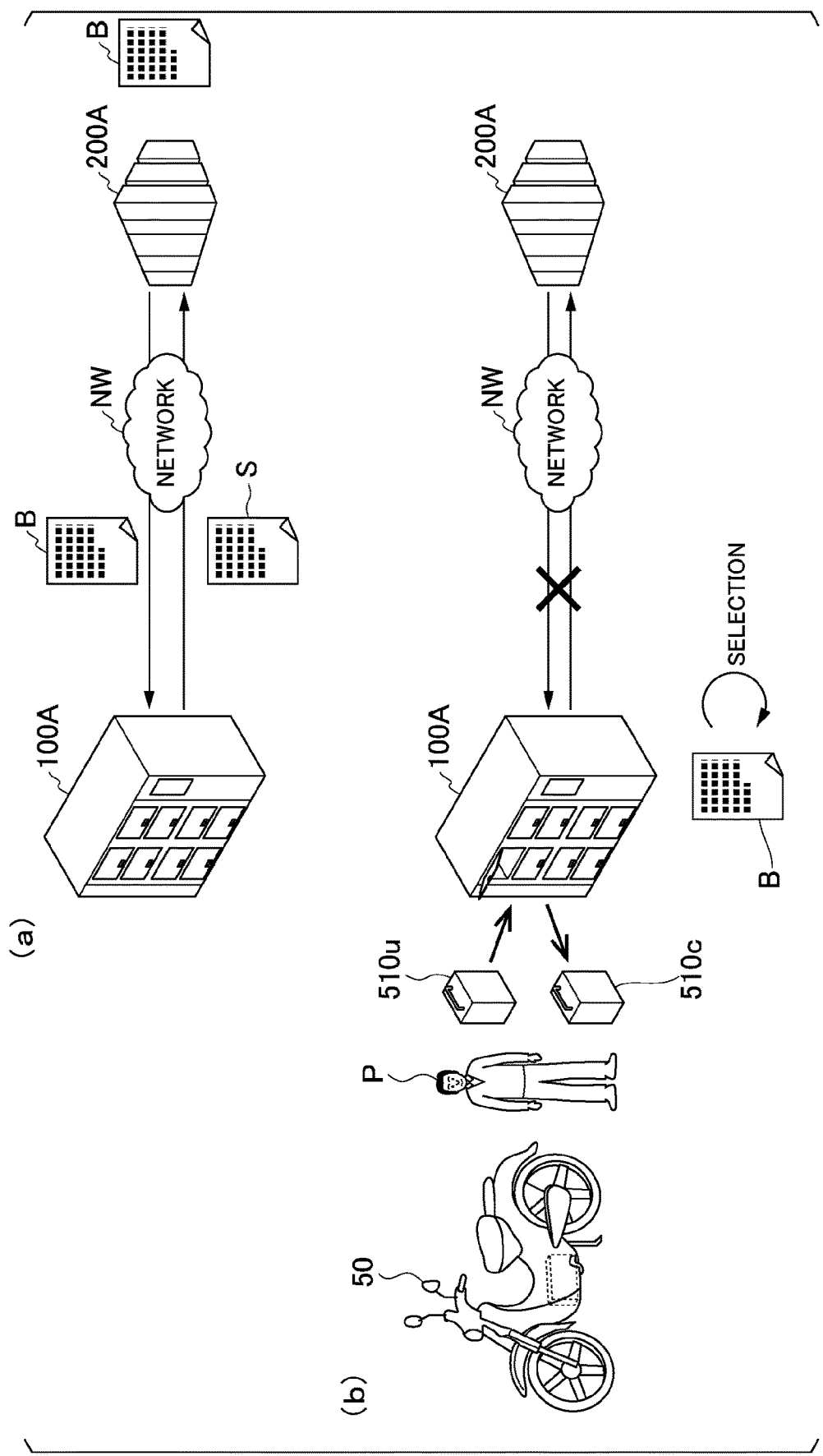
FIG. 15 is a diagram schematically showing a flow of a procedure for renting out a removable battery in the battery sharing service adopting the shared battery management system of the second embodiment.
Figure 16:
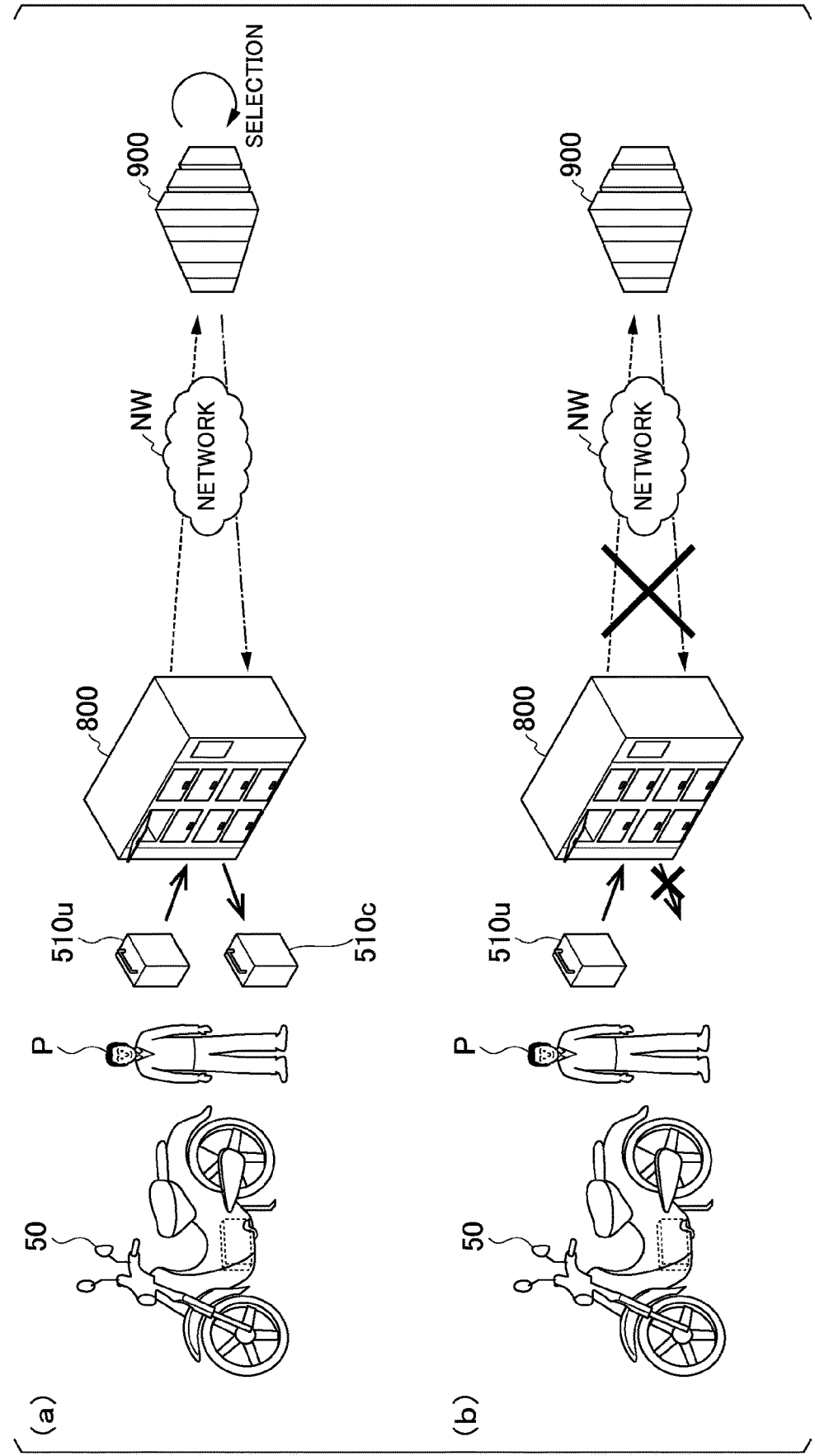
FIG. 16 is a diagram schematically showing a flow of a procedure for renting out a removable battery in a battery sharing service adopting a conventional shared battery management system.

Here, operations of a battery sharing service adopting the shared battery management system 10A and a battery sharing service adopting the conventional shared battery management system will be compared. FIG. 15 is a diagram schematically showing a flow of a procedure for renting out the removable battery 510 in the battery sharing service adopting the shared battery management system 10A of the second embodiment. Also, FIG. 16 is a diagram schematically showing a flow of a procedure for renting out the removable battery 510 in the battery sharing service adopting the conventional shared battery management system.

As described above, in the shared battery management system 10A, the battery replacement device 100A transmits the battery state list S to the operation server 200A via the network NW and previously acquires the rentable battery list B created by the operation server 200A. In the shared battery management system 10A, the battery replacement device 100A independently performs a procedure for replacing the used battery 510u brought in by the user of the electric motorcycle 50 with the charged battery 510c in accordance with information of a removable battery 510 with which rental (replacement) can be performed at the battery replacement device 100A and the order thereof included in the acquired rentable battery list B. In (a) of FIG. 15, a state in which the shared battery management system 10A exchanges the battery state list S and the rentable battery list B between the battery replacement device 100A and the operation server 200A via the network NW is schematically shown. Also, in (b) of FIG. 15, a state in which the battery replacement device 100A replaces the used battery 510u brought in by the user P of the electric motorcycle 50 with the charged battery 510c on the basis of the acquired rentable battery list B is schematically shown.

In the shared battery management system 10A, the rentable battery list B for use in the battery replacement device 100A is not acquired from the operation server 200A every time selection is performed when the charged battery 510c with which rental (replacement) can be performed is selected instead of the used battery 510u and is previously acquired periodically, for example, at predetermined regular time intervals, for example, every 5 minutes. Thus, in the shared battery management system 10A, as shown in (a) of FIG. 15, the battery replacement device 100A transmits the battery state information of each removable battery 510 that is stored and charged as the battery state list S to the operation server 200A, acquires the rentable battery list B created on the basis of the battery state list S transmitted by the operation server 200A, and stores the rentable battery list B. Thereby, the battery replacement device 100A can independently perform a process of replacing the removable battery 510 on the basis of the stored rentable battery list B without being affected by the state of wireless communication (the environment of communication) via the network NW between the battery replacement device 100A and the operation server 200A. That is, as shown in (b) of FIG. 15, the battery replacement device 100A does not need to immediately stop or suspend a procedure for replacing a used battery 510u brought in by a user P of the electric motorcycle 50 with the charged battery 510c even if wireless communication with the operation server 200A via the network NW is interrupted or stable wireless communication cannot be performed. The battery replacement device 100A can continue to independently perform a procedure for replacing removable batteries 510, which are as many as the number of removable batteries 510 recorded in the rentable battery list B. Thus, in the battery sharing service adopting the shared battery management system 10A, it is possible to perform replacement with the charged battery 510c when the user P of the electric motorcycle 50 wants to replace the used battery 510u. Considering that the user P of the electric motorcycle 50 uses the battery sharing service at a timing when it is expected that the removable battery 510 will run out of power and traveling of the electric motorcycle 50 will be difficult, the shared battery management system 10A is considered to be significantly effective for maintaining the provision of the battery sharing service.

Moreover, in the shared battery management system 10A, the number of removable batteries 510 capable of being replaced at the battery replacement device 100A in a situation in which the state of wireless communication state (an environment of communication) between the shared battery management system 10A and the operation server 200A deteriorates is the number of removable batteries 510 recorded in the rentable battery list B. Thus, in the shared battery management system 10A, for example, considering that the operation server 200A manages which removable battery 510 is rented out to the user P of which electric motorcycle 50, unnecessary replacement of the removable battery 510 is not performed, so that it is also considered possible to avoid a situation in which the restoration of management information becomes difficult after the wireless communication state (the communication environment) is restored.

On the other hand, in the conventional shared battery management system, communication via the network NW is performed between the battery supply device corresponding to the battery replacement device 100A and the system management device corresponding to the operation server 200A every time the user P of the electric motorcycle 50 brings the used battery 510u. In (a) of FIG. 16, the state of a process in the battery replacement device 800, which is the battery supply device, and the system management device 900 via the network NW in the conventional shared battery management system is schematically shown. More specifically, in the conventional shared battery management system, as shown in (a) of FIG. 16, the battery replacement device 800 transmits information of the used battery 510u to the system management device 900 connected via the network NW at a timing when the used battery 510u is replaced with the charged battery 510c. In the conventional shared battery management system, as shown in (a) of FIG. 16, the system management device 900 selects a charged battery 510c with which rental (replacement) is performed at the battery replacement device 800 instead of the used battery 510u on the basis of information of the used battery 510u transmitted from the battery replacement device 800 and transmits a selection result to the battery replacement device 800 via the network NW. In the conventional shared battery management system, the battery replacement device 800 performs a procedure for replacing the used battery 510u with the charged battery 510c in accordance with the selection result transmitted from the system management device 900.

Thus, in the conventional shared battery management system, as shown in (b) of FIG. 16, it is not possible to perform the procedure for replacing the used battery 510u with the charged battery 510c when wireless communication via the network NW between the battery replacement device 800 and the system management device 900 is interrupted or stable wireless communication cannot be performed at a timing when the user P of the electric motorcycle 50 has brought the used battery 510u. That is, in the conventional shared battery management system, the procedure for replacing the used battery 510u brought in by the user P of the electric motorcycle 50 with the charged battery 510c has to be stopped or suspended due to the state of a wireless communication (an environment of communication) via the network NW between the battery replacement device 800 and the system management device 900. In this case, the user P of the electric motorcycle 50 has to wait for the wireless communication between the battery replacement device 800 and the system management device 900 via the network NW to be restored. This is because, considering that the user P of the electric motorcycle 50 arrives at the current battery replacement device 800 at a timing when it is expected that the removable battery 510 will run out of power and traveling of the electric motorcycle 50 will be difficult, it is considered difficult to go to another battery replacement device 800. Thus, considering that the user P of the electric motorcycle 50 uses the battery sharing service for the purpose of shortening a time period required to charge the removable battery 510 when the removable battery 510 runs out of power and traveling of the electric motorcycle 50 becomes difficult, the conventional shared battery management system is considered to be significantly disadvantageous for maintaining the provision of the battery sharing service.

Here, for example, a case in which the battery rental processing means incorporated as software in the battery replacement device 800 performs a procedure for replacing the used battery 510u with the charged battery 510c without using the selection result of the system management device 900 is conceivable. More specifically, a case in which the battery replacement device 800 performs a procedure for replacing the used battery 510u with a fully charged battery 510c stored in the battery replacement device 800 in accordance with a process of the battery rental processing means incorporated as software is conceivable. In this case, the conventional shared battery management system can also perform a procedure for replacing the used battery 510u with the charged battery 510c in a situation in which the state of wireless communication (an environment of communication) between the battery replacement device 800 and the system management device 900 via the network NW deteriorates. However, for example, when the state of wireless communication (the environment of communication) via the network NW between the battery replacement device 800 and the system management device 900 continues to deteriorate for a long time, the conventional shared battery management system is configured so that the battery replacement device 800 endlessly performs replacement with fully charged batteries 510c. This is because, for example, considering that the system management device 900 manages which removable battery 510 is rented out to the user P of which electric motorcycle 50, the endless replacement is considered to be a factor that causes a situation in which restoration of the management information becomes difficult after the wireless communication state (the communication environment) is restored in the conventional shared battery management system. For example, this is because a case in which, if the wireless communication state (the communication environment) continues to deteriorate for a long time, a charged battery 510c, which has been rented out, will run out of power and will be further replaced with another charged battery and the charged battery 510c running out of power will be charged and will be further rented out to a user P of another electric motorcycle 50 when charging is completed is also conceivable. Also, this is because the battery replacement device 800, which rents out the removable battery 510, is not always the same as a battery replacement device 800, which initially rented out the removable battery 510. In this case, in the conventional shared battery management system, it is necessary for the system management device 900 to restore management information by tracing back in time series how many removable batteries 510 have been replaced until the wireless communication state (the communication environment) is restored and the restoration of the management information may be significantly difficult.

In this regard, in the shared battery management system 10A, the number of removable batteries 510 capable of being replaced at the battery replacement device 100A is limited to the number of removable batteries 510 recorded in the rentable battery list B even if the state of wireless communication (the environment of communication) between the shared battery management system 10A and the operation server 200A continues to deteriorate for a long time. That is, in the shared battery management system 10A, the number of times the removable battery 510 is rented out (replaced) by the battery replacement device 100A can be limited to a finite number in a situation in which the state of wireless communication (the environment of communication) between the shared battery management system 10A and the operation server 200A deteriorates. In other words, in the shared battery management system 10A, in a situation in which the state of wireless communication (the environment of communication) between the shared battery management system 10A and the operation server 200A deteriorates, the number of times the removable battery 510 is rented out (replaced) is finitely allowed and endless rental (replacement) of the removable battery 510 can be avoided. Thereby, in the shared battery management system 10A, a time period for the operation server 200A to go back in time series for restoring the management information is shortened and the management information can be restored more easily than in the conventional shared battery management system.

As described above, according to the second embodiment, the shared battery management system 10A is configured to include the battery replacement device 100A installed in a plurality of places and configured to store and charge one or more removable batteries 510 and the operation server 200A configured to manage removable batteries 510 capable of being replaced at the battery replacement device 100A. In the second embodiment, the battery replacement device 100A transmits the battery state information of the removable batteries 510 that are stored and charged as the battery state list S to the operation server 200A via the network NW periodically at predetermined time intervals such as, for example, every five minutes. Also, in the second embodiment, the battery replacement device 100A acquires a rentable battery list B recording removable batteries 510 with which rental (replacement) can be performed and the order of rental (replacement) created by the operation server 200A on the basis of the transmitted battery state list S via the network NW and stores the rentable battery list B. In the second embodiment, the battery replacement device 100A performs a procedure for replacing a used battery 510u desired to be replaced by the user of the electric motorcycle 50 with a removable battery 510 that is stored on the basis of the stored rentable battery list B.

Here, in the second embodiment, the operation server 200A determines a removable battery 510 with which rental (replacement) can be performed at the battery replacement device 100A and the order in which rental (replacement) can be performed with the removable battery 510 on the basis of the battery state list S transmitted from the battery replacement device 100A and creates a rentable battery list B. At this time, in the second embodiment, the operation server 200A determines a removable battery 510 with which rental (replacement) can be performed at the battery replacement device 100A and the order thereof on the basis of logic when a procedure for replacing the removable battery 510 according to a preset rule is performed and creates the rentable battery list B. Thereby, in the second embodiment, it is possible to easily change a removable battery 510 with which rental (replacement) can be performed at the battery replacement device 100A and the order thereof, i.e., a method of renting out the removable battery 510, only by setting a rule for the operation server 200A to determine a removable battery 510 with which rental (replacement) can be performed at the battery replacement device 100A and the order thereof in the operation server 200A. Thereby, in the second embodiment, as in the conventional shared battery management system, it is possible to arbitrarily change the logic when the battery replacement device 100A performs a procedure for replacing the removable battery 510 at any timing without changing the software itself incorporated in the battery supply device. In other words, in the second embodiment, it is possible to manage a removable battery 510 with which rental (replacement) is performed at the battery replacement device 100A and the order thereof according to the rentable battery list B created by the operation server 200A. Also, in the second embodiment, it is possible to similarly easily change a removable battery 510 with which rental (replacement) is performed at the battery replacement device 100A and the order thereof, i.e., a method of renting out the removable battery 510, even if the logic when the battery replacement device 100A performs the procedure for replacing the removable battery 510 is set in the operation server 200A. Moreover, in the second embodiment, the operation server 200A creates the rentable battery list B reflecting a current power storage state in each removable battery 510 that is stored and charged for each battery replacement device 100A. Thus, in the second embodiment, the logic when the battery replacement device 100A performs the procedure for replacing the removable battery 510 is made different by setting a different rule in the operation server 200A for each battery replacement device 100A constituting the shared battery management system 10A. Therefore, in the second embodiment, it is possible to easily change a method of renting out the removable battery 510 on the basis of thinking, an intention, or the like when the management or operation for the removable batteries 510 is performed by the manager of the shared battery management system 10A or the operator of the battery sharing service adopting the shared battery management system 10A.

Moreover, in the second embodiment, the battery replacement device 100A can independently perform a procedure for replacing a used battery 510u desired to be replaced by the user of the electric motorcycle 50 with a stored removable battery 510 on the basis of the stored rentable battery list B. Thus, in the second embodiment, the battery replacement device 100A can continue to perform a procedure for replacing removable batteries 510 until rental (replacement) of all removable batteries recorded in the rentable battery list B is completed even if the state of communication (an environment of communication) via the network NW between the battery replacement device 100A and the operation server 200A deteriorates. Thereby, in the second embodiment, it is possible to continue to provide the battery sharing service to the user of the electric motorcycle 50 without stopping or suspending a procedure for replacing a removable battery 510 due to an influence of deterioration of a communication state (a communication environment) until the battery replacement device 100A completes rental (replacement) of removable batteries 510, which are as many as the number of removable batteries 510 recorded in the rentable battery list B.

Accordingly, in the second embodiment, the flexibility of the battery sharing service to be provided can be improved.

Also, an example in which the battery replacement device 100A and the operation server 200A constituting the shared battery management system 10A communicate with each other via the network NW, which is a communication network for wireless communication, has been described in the second embodiment. However, the communication between the battery replacement device 100A and the operation server 200A in the shared battery management system 10A is not limited to wireless communication and communication between the battery replacement device 100A and the operation server 200A in the shared battery management system 10A may be wired communication, i.e., the network NW may be a communication network for wired communication. Also, even if the communication between the battery replacement device 100A and the operation server 200A in the shared battery management system 10A is wired communication, the wired communication may be interrupted or stable wired communication may not be able to be performed, for example, when the maintenance of the operation server 200A is performed, or the like. However, even if the communication between the battery replacement device 100A and the operation server 200A is wired communication in the shared battery management system 10A, it is possible to similarly consider the above-described case and obtain a similar effect by replacing the network NW with wired communication. Accordingly, a detailed description of the procedure for replacing the removable battery 510 in the shared battery management system 10A when the communication between the battery replacement device 100A and the operation server 200A is wired communication will be omitted.

Also, an example in which one used battery 510u is brought in by the user of the electric motorcycle 50 and replaced at the battery replacement device 100A has been described in the second embodiment. However, the number of removable batteries 510 that are mounted for the electric motorcycle 50 to travel is not limited to one. That is, a case in which the electric motorcycle 50 is an electric vehicle that travels with electric power supplied from a plurality of removable batteries 510 is also conceivable. However, even if the electric motorcycle 50 is an electric vehicle that travels in a state in which a plurality of removable batteries 510 are mounted thereon, a procedure for replacing the removable batteries 510 is conceivable as described above. For example, when the electric motorcycle 50 is an electric vehicle that travels with electric power supplied from two removable batteries 510, the user of the electric motorcycle 50 performs the operation of steps S510 and S810 shown in FIG. 14 on each removable battery 510, i.e., performs the operation twice, and the operation is the iteration of the same operation. Accordingly, a detailed description of the procedure for replacing the removable battery 510 in the electric vehicle that travels with the electric power supplied from the plurality of removable batteries 510 will be omitted.

In the above-described embodiment, a case in which an electric vehicle, which is an electric power device used by the user who uses the battery sharing service, is the electric motorcycle 50, which is a saddle-riding type electric vehicle, has been described. However, the electric power device used by the user who uses the battery sharing service is not limited to the saddle-riding type electric vehicle as shown in the above-described embodiment. For example, the electric power device in the above-described embodiment includes all vehicle-type movable objects, each of which travels using an electric motor driven with electric power supplied from the removable battery, such as a three-wheeled vehicle (including a front two-wheeled and rear one-wheeled vehicle in addition to a front one-wheeled and rear two-wheeled vehicle), a four-wheeled vehicle, and an assisted bicycle as well as a saddle-type two-wheeled vehicle. Instead of these vehicle-type movable objects, the "electric power device" may be a portable power charging/supplying device carried by a person or a vehicle described in Japanese Unexamined Patent Application, First Publication No. 2019-068552. Also, the "electric power device" may be a movable robot, an autonomous traveling device, an electric bicycle, an autonomous traveling vehicle, another electric vehicle, a drone flying object, or another electric movable device (electric mobility).

Also, the various above-described functions or processes in the power storage device management system may be performed by recording a program for implementing the functions or the processes of the storage device (for example, the battery replacement device 100) or the server (for example, the operation server 200) that is a component of the power storage device management system (for example, the shared battery management system 10) according to the present invention on a computer-readable recording medium and causing a computer system to read and execute the program recorded on the recording medium. Also, the "computer system" used here is assumed to include an operating system (OS) and hardware such as peripheral devices. Also, the "computer system" is assumed to include a homepage providing environment (or displaying environment) when a World Wide Web (WWW) system is used.

Also, the "computer-readable recording medium" refers to a storage device, including a flexible disk, a magneto-optical disc, a ROM, a writable non-volatile writable memory such as a flash memory, a portable medium such as a compact disc (CD)-ROM, and a hard disk embedded in the computer system.

Further, the "computer-readable recording medium" is assumed to include a computer-readable recording medium for retaining the program for a predetermined time period as in a volatile memory (a dynamic random-access memory (DRAM)) inside the computer system including a server and a client when the program is transmitted via a network such as the Internet or a communication circuit such as a telephone circuit. Also, the above-described program may be transmitted from a computer system storing the program in a storage device or the like via a transmission medium or transmitted to another computer system by transmission waves in a transmission medium. Here, the "transmission medium" for transmitting the program refers to a medium having a function of transmitting information as in a network (a communication network) such as the Internet or a communication circuit (a communication line) such as a telephone circuit. Also, the above-described program may be a program for implementing some of the above-described functions. Further, the above-described program may be a program capable of implementing the above-described function in combination with a program already recorded on the computer system, i.e., a so-called differential file (differential program).

Although modes for carrying out the present invention have been described above using the embodiments, the present invention is not limited to the embodiments and various modifications and replacements can be applied without departing from the spirit and scope of the present invention.

The above-described embodiments can be expressed as follows.

(1) According to an aspect of the embodiment, there is provided a shared battery management system (for example, the shared battery management system 10) for managing replacement of removable batteries (for example, the removable batteries 510) that are removably mounted on an electric vehicle (for example, the electric motorcycle 50) and shared by a plurality of electric vehicles, the shared battery system including: a battery replacement device (for example, the battery replacement device 100) having a plurality of battery slots (for example, the battery slots 120) provided to accommodate the removable batteries and configured to store and charge one or more removable batteries; and an operation serer (for example, the operation server 200) configured to manage an available battery list (for example, the available battery list L) recording identification information (for example, battery IDs) of a plurality of removable batteries with which replacement can be performed at the battery replacement device, wherein the battery replacement device is configured to acquire the available battery list via a communication network (for example, the network NW) at predetermined time intervals (for example, every three hours, every day, or the like), store the acquired available battery list, and perform a procedure for replacing a used battery (for example, the used battery 510$u$) which is the removable battery running out of power due to the use in the electric vehicle with a charged battery (for example, the charged battery 510$c$) that is the removable battery whose charging is completed and which is stored on the basis of the identification information included in the stored available battery list.

(2) In the shared battery management system according to the aspect (1), the battery replacement device is configured to ask the operation server about whether or not the available battery list has been updated via the communication network at predetermined time intervals, acquire the available battery list via the communication network only when the available battery list has been updated, and store the acquired available battery list.

(3) In the shared battery management system according to the aspect (2), the battery replacement device includes a replacement device storage (for example, the replacement device storage 130) configured to store the acquired available battery list; and a replacement device controller (for example, the replacement device controller 140) configured to acquire the identification information of the used battery when the used battery has been accommodated in any battery slot, combine the acquired identification information with the identification information included in the available battery list stored in the replacement device storage device, and determine whether or not the used battery is the removable battery capable of being replaced.

(4) In the shared battery management system of the aspect (3), the replacement device controller is configured to determine the used battery accommodated in the battery slot as the removable battery that cannot be replaced when the acquired identification information is not included in the available battery list to provide a notification indicating that replacement is not possible (for example, through the display 110), is configured to determine that the used battery accommodated in the battery slot is the removable battery capable of being replaced when the acquired identification information is included in the available battery list, select the charged battery for replacement from among the charged batteries whose charging is completed and which are stored in different battery slots, and provide a notification of the battery slot where the selected charged battery is accommodated (for example, through the display 110).

(5) In the shared battery management system of the aspect (4), the replacement device controller is configured to start charging of the used battery after the selected charged battery is extracted from the battery slot where the selected charged battery is accommodated.

(6) In the shared battery management system according to the aspect (5), the replacement device controller further includes a charging controller (for example, the charging controller 141) configured to control a charger for charging the used battery.

(7) According to another aspect of the embodiment, there is provided a shared battery management system (for example, the shared battery management system 10A) for managing replacement of removable batteries (for example, the removable batteries 510) that are removably mounted on an electric vehicle (for example, the electric motorcycle 50) and shared by a plurality of electric vehicles, the shared battery system including: a battery replacement device (for example, the battery replacement device 100A) having a plurality of battery slots (for example, the battery slots 120) provided to accommodate the removable batteries and configured to store and charge one or more removable batteries; and an operation server (for example, the operation server 200A) configured to create a rentable battery list (for example, the rentable battery list B) recording a plurality of removable batteries capable of being rented out at the battery replacement device and the order in which the removable batteries are rented, wherein the battery replacement device is configured to acquire the rentable battery list via a communication network (for example, the network NW) periodically at predetermined time intervals (for example, every five minutes), store the acquired rentable battery list, perform a procedure for replacing a used battery (for example, the used battery 510u) which is the removable battery running out of power due to the use in the electric vehicle with a charged battery (for example, the charged battery 510c) which is the removable battery capable of being rented out included in the rentable battery list in accordance with the order in which the removable batteries are rented indicated in the stored rentable battery list.

(8) In the shared battery management system according to the aspect (7), the battery replacement device is configured to delete information of the charged battery with which replacement has been performed from the rentable battery list after the replacement of the used battery with the charged battery included in the rentable battery list is completed.

(9) In the shared battery management system according to the aspect (7) or (8), the battery replacement device transmits a battery state list (for example, the battery state list S) recording states of the stored removable batteries to the operation server via the communication network periodically at predetermined time intervals and the operation server is configured to determine the removable batteries capable of being rented out at the battery replacement device and the order in which the removable batteries are rented out on the basis of information indicating the state of each removable battery included in the transmitted battery state list and creates the rentable battery list.

(10) In the shared battery management system according to the aspect (9), the operation server is configured to determine the removable batteries capable of being rented out at the battery replacement device and the order in which the removable batteries are rented out in logic according to a rule for determining the removable batteries capable of being rented out and the order in which the removable batteries are rented out preset in correspondence with the battery replacement device.

(11) In the shared battery management system according to the aspect (9), the battery replacement device includes a replacement device controller (for example, the replacement device controller 140A) configured to acquire battery state information indicating states of the stored removable batteries, select the charged battery to be used instead of the used battery in the order indicated in the rentable battery list when the used battery has been accommodated in any battery slot, delete information of the selected charged battery after the replacement of the used battery with the selected charged battery is completed, and update the rentable battery list; a replacement device communicator (for example, the replacement device communicator 150A) configured to transmit the battery state information as the battery state list to the operation server and acquire the rentable battery list from the operation server; and a replacement device storage (for example, the replacement device storage 130A) configured to store the acquired rentable battery list.

(12) In the shared battery management system according to the aspect (11), the replacement device controller is configured to start charging of the used battery after the selected charged battery is extracted from the battery slot where the selected charged battery is accommodated.

(13) In the shared battery management system according to the aspect (12), the replacement device controller further includes a charging controller (for example, the charging controller 141A) configured to control a charger for charging the used battery.

(14) In the shared battery management system according to any one of aspects (9) to (13), the battery state list is configured to record at least identification information (for example, a battery ID) of each removable battery that is stored, information of a charging count, and information of a deterioration state, and information of a charge rate.

According to the above-described aspects (1) to (3), the battery replacement device is configured to previously acquire the available battery list recording identification information of the removable batteries that are shared from the operation server via the communication network and store the acquired available battery list. The battery replacement device is configured to determine whether or not the used battery is the removable battery capable of being replaced by collating the identification information of the used battery, which is the removable battery desired to be replaced, with the identification information included in the stored available battery list. Thereby, in the shared battery management system, the battery replacement device can independently perform a procedure for replacing the removable battery even if the communication network between the battery replacement device and the operation server cannot be used. Thereby, the shared battery management system can continue to provide the battery sharing service without being affected by the communication environment between the battery replacement device and the operation server.

Also, according to the above-described aspect (4), the replacement device controller provided in the battery replacement device provides a notification of a result of determining whether or not the used battery is a removable battery capable of being replaced. Thereby, the shared battery management system can allow the user who receive the battery sharing service to know whether or not the used battery is a removable battery that is shared. In the shared battery management system, it is possible to prevent a removable battery that is not shared from being mixed in.

Also, according to the above-described aspects (5) and (6), in the battery replacement device, the charging of the used battery is started after the charged battery whose charging is completed and which is stored is extracted from the battery slot, i.e., after the replacement of the removable battery is completed. Thereby, in the shared battery management system, charging of the used battery can be started at any timing.

According to the above-described aspect (7), the battery replacement device is configured to previously acquire a rentable battery list recording a removable battery with which rental (replacement) can be performed and the order in which rental (replacement) is performed with the removable battery from the operation server via the communication network and stores the rentable battery list. The battery replacement device is configured to select a removable battery to be used instead of the used battery, which is a removable battery desired to be replaced, in accordance with the order indicated in the rentable battery list and performs a replacement procedure with the selected removable battery. Thereby, in the shared battery management system, the battery replacement device can independently perform the procedure for replacing the removable battery even if the communication network between the battery replacement device and the operation server cannot be used. Thereby, the shared battery management system can continue to provide the battery sharing service without being affected by the environment of communication between the battery replacement device and the operation server.

Also, according to the above-described aspect (8), the battery replacement device is configured to delete information of the removable battery with which rental (replacement) has been performed from the rentable battery list after the replacement procedure is completed. Thereby, in the shared battery management system, the battery replacement device can rent out (replace) as many removable batteries as the number of removable batteries included in the rentable battery list. Incidentally, the battery replacement device cannot acquire a new rentable battery list when the communication network associated with the operation server remains unavailable for a long time. However, the battery replacement device can rent out (replace) removable batteries, which are as many as the number of removable batteries included in the rentable battery list, i.e., while the removable batteries are recorded in the rentable battery list. Thereby, in the shared battery management system, it is possible to allow a finite number of rentals (replacements) of removable batteries in the battery replacement device without immediately stopping rental (replacement) in a situation in which the communication network between the battery replacement device and the operation server is not available. In other words, in the shared battery management system, it is possible to prevent the battery replacement device from endlessly renting out (replacing) the removable batteries.

Also, according to the above-described aspect (9), the battery replacement device is configured to transmit a battery state list recording states of the stored removable batteries to the operation server periodically at predetermined time intervals. The operation server is configured to determine a removable battery with which rental (replacement) can be performed at the battery replacement device and the order thereof on the basis of the information of each removable battery included in the battery state list and creates the rentable battery list. Thereby, in the shared battery management system, the list of rentable batteries acquired by the battery replacement device from the operation server is updated to the latest state reflecting the current state of each removable battery. In other words, in the shared battery management system, the operation server can manage the removable batteries which are rented out (replaced) at the battery replacement device by creating the rentable battery list.

Also, according to the above-described aspect (10), the operation server is configured to determine a removable battery with which rental (replacement) can be performed at the battery replacement device and the order thereof in the logic when the replacement procedure is performed according to a preset rule for determining a removable battery with which rental (replacement) can be performed at the battery replacement device and the order thereof. At this time, in the shared battery management system, the rule for determining a removable battery with which rental (replacement) can be performed at the battery replacement device and the order thereof is set. Thereby, in the shared battery management system, the logic when a procedure for replacing the removable battery is performed can differ according to each battery replacement device. Thereby, in the shared battery management system, it is possible to perform the rental of the removable battery suitable for thinking (suitable for an intention) of the manager of the shared battery management system or the operator of the battery sharing service adopting the shared battery management system.

Also, according to the above-described aspect (11), it is possible to implement a function of the battery replacement device that is configured to acquire the battery state information indicating the states of the removable batteries that are stored, transmit the acquired battery state information as the battery state list, store the rentable battery list acquired from the operation server, selects the removable battery to be used instead of the used battery in the order indicated in the stored rentable battery list, and perform the replacement procedure. Also, it is possible to implement the function of a battery replacement device that updates the rentable battery list by deleting the removable battery with which rental (replacement) has been performed from the rentable battery list according to the replacement procedure.

Also, according to the above-described aspects (12) and (13), in the battery replacement device, the charging of the used battery is started after the charged battery with which rental (replacement) is performed is extracted from the battery slot, i.e., after the replacement of the removable battery is completed. Thereby, in the shared battery management system, charging of the used battery can be started at any timing.

Also, according to the above-described aspect (14), the identification information of the removable battery, the charging count, the deterioration state, and the charge rate (a proportion at which charging has been completed) are stored in the battery state list transmitted by the battery replacement device to the operation server. Thereby, in the shared battery management system, it is possible to prevent the removable battery that has deteriorated at a limit level or more from being rented out (replaced). Thereby, in the shared battery management system, it is possible to facilitate the work of replacing the removable battery that has deteriorated at the limit level or more in the maintenance of the battery sharing service. Also, in the shared battery management system, a removable battery having a charge rate of a predetermined proportion or more can be included in removable batteries with which rental (replacement) can be performed. Thereby, the shared battery management system can provide a flexible removable battery rental (replacement) method according to thinking or an intention of the manager of the shared battery management system or the operator of the battery sharing service adopting the shared battery management system.

REFERENCE SIGNS LIST 10, 10A Shared battery management system (power storage device management system)
100, 100A Battery replacement device (storage device)
101 Housing
110 Display
120, 120-1, 120-2, 120-3, 120-4, 120-5, 120-6, 120-7, 120-8 Battery slot (accommodator)
120H, 120-1H Battery accommodator
120L, 120-1L Opening/closing lid
120T Connector
120C Charger
130, 130A Replacement device storage (second storage unit)
140, 140A Replacement device controller (determiner, provider, deleter, responder)
141, 141A Charging controller (charger)
142 Measurement sensor
143, 143A Information acquirer (state acquirer)
144, 144A Processor (determiner)
150, 150A Replacement device communicator (transmitter, first transmitter)
200, 200A Operation server (server device)
210, 210A Server storage (first storage unit)
220, 220A Server controller (deleter, decider)
221 Information acquirer
222, 222A List processor 230, 230A Server communicator (second transmitter)
50 Electric motorcycle (electric power device)
510 Removable battery (power storage device)
510u Used battery
510c Charged battery
511 Power storage
512 Measurement sensor
513, 513A BMU
514, 514A Storage
515, 515A Connector
NW Network
L Available battery list (storage identification information)
S Battery state list (state information, storage information)
B Rentable battery list (storage identification information, provision information)

What is claimed is:

1. A power storage device management system comprising:
   a storage device configured to store a plurality of power storage devices each being removably mountable on an electric power device using electric power; and
   a server device communicatively connected to the storage device,
   wherein the storage device comprises:
   an acquirer configured to acquire, when a first power storage device of the plurality of power storage devices is received from a first user, first identification information of the first power storage device; and
   a first transmitter configured to transmit the first identification information to the server device,
   wherein the server device comprises:
   a first storage unit storing storage identification information that includes a plurality of pieces of identification information of one or more sharable power storage devices of the plurality of power storage devices, the one or more sharable power storage devices being allowed to be shared by a plurality of users; and
   a determiner configured to determine, based on the first identification information and the storage identification information, whether or not the first identification information is included in the storage identification information,
   wherein the storage identification information comprehensively includes the plurality of pieces of identification information of the one or more sharable power storage devices allowed to be shared by a plurality of users.

2. The power storage device management system according to claim 1,
   wherein the server device further comprises a second transmitter configured to transmit to the storage device, a result of the determination by the determiner, and
   wherein the storage device further comprises an accommodator configured to, based on the result of the determination, store the first power storage device.

3. The power storage device management system according to claim 1,
   wherein the determiner is configured to determine whether or not the first identification information is included in the storage identification information, based on the storage identification information stored in the first storage unit before the first transmitter transmits the first identification information.

4. The power storage device management system according to claim 1,
   wherein the server device further comprises a deleter configured to delete identification information of a specific power storage device from the storage identification information.

5. The power storage device management system according to claim 1,
   wherein the server device further comprises a decider configured to decide, based on the first identification information, an order in which one or more power storage devices stored in the storage device are provided to the plurality of users.

6. The power storage device management system according to claim 5,
   wherein the decider is configured to decide, in logic according to a preset rule corresponding to the storage device, the order and which power storage devices stored in the storage device are providable to the plurality of users.

7. The power storage device management system according to claim 5,
   wherein the storage device further comprises a state acquirer configured to acquire state information of each of the plurality of power storage devices,
   wherein the first transmitter is configured to transmit the state information to the server device, and
   wherein the decider is configured to decide the order based on the state information.

8. The power storage device management system according to claim 7,
   wherein the state information includes at least one of
   first information indicating a number of times each of the plurality of power storage devices have been charged,
   second information indicating a deterioration state of each of the plurality of power storage devices, and
   third information indicating a charge rate of each of the plurality of power storage devices.

9. The power storage device management system according to claim 1,
   wherein the determiner is configured to determine that it is not allowed to store the first power storage device, in a first case that the first identification information is not included in the storage identification information, and
   wherein the determiner is configured to determine that it is allowed to store the first power storage device, in a second case that the first identification information is included in the storage identification information.

10. The power storage device management system according to claim 9,
    wherein the storage device further comprises a provider configured to, after the determiner determines that it is allowed to store the first power storage device, provide the first user with a second power storage device of the plurality of power storage devices, in exchange for the first power storage device.

11. The power storage device management system according to claim 9,
    wherein the storage device further comprises a responder configured to, in a case that the determiner determines that it is not allowed to store the first power storage device,
    prohibit providing the first user with a second power storage device of the plurality of power storage devices, in exchange for the first power storage device received, or
    notify the first user that it is not allowed to store the first power storage device.

12. The power storage device management system according to claim 9,
wherein the storage device further comprises a charger configured to charge the first power storage device after the determiner determines that it is allowed to store the first power storage device.

13. The power storage device management system according to claim 12,
wherein the charger is configured to start charging the first power storage device after a second power storage device of the plurality of power storage devices is provided to the first user.

14. The power storage device management system according to claim 12,
wherein the charger is configured to start charging the first power storage device when a quantity of charged power storage devices becomes less than a predetermined value.

15. The power storage device management system according to claim 7,
wherein the state acquirer is configured to update the state information at a predetermined time interval,
wherein the first transmitter is configured to transmit the updated state information to the server device, and
wherein the decider is configured to update the order when the updated state information is received.

16. A server device communicatively connected to a storage device configured to store a plurality of power storage devices each being removably mountable on an electric power device using electric power, the server device comprising:
a first storage unit storing storage identification information that includes a plurality of pieces of identification information of one or more sharable power storage devices of the plurality of power storage devices, the one or more sharable power storage devices being allowed to be shared by a plurality of users;
a receiver configured to receive from the storage device, first identification information of a first power storage device of the plurality of power storage devices, the first identification information being acquired by the storage device when the first power storage device is received from a first user; and
a determiner configured to determine, based on the first identification information and the storage identification information, whether or not the first identification information is included in the storage identification information,
wherein the storage identification information comprehensively includes the plurality of pieces of identification information of the one or more sharable power storage devices allowed to be shared by a plurality of users.

17. A power storage device management method comprising:
when a storage device configured to store a plurality of power storage devices receives a first power storage device of the plurality of power storage devices from a first user, acquiring first identification information of the first power storage device, each of the plurality of power storage devices being removably mountable on an electric power device using electric power; and
determining whether or not the first identification information is included in storage identification information that includes a plurality of pieces of identification information of one or more sharable power storage devices of the plurality of power storage devices, the one or more sharable power storage devices being allowed to be shared by a plurality of users,
wherein the storage identification information comprehensively includes the plurality of pieces of identification information of the one or more sharable power storage devices allowed to be shared by a plurality of users.

18. A non-transitory computer-readable storage medium storing instructions executable by a computer to:
when a storage device configured to store a plurality of power storage devices receives a first power storage device of the plurality of power storage devices from a first user, acquire first identification information of the first power storage device, each of the plurality of power storage devices being removably mountable on an electric power device using electric power; and
determine whether or not the first identification information is included in storage identification information that includes a plurality of pieces of identification information of one or more sharable power storage devices of the plurality of power storage devices, the one or more sharable power storage devices being allowed to be shared by a plurality of users,
wherein the storage identification information comprehensively includes the plurality of pieces of identification information of the one or more sharable power storage devices allowed to be shared by a plurality of users.

* * * * *